(12) United States Patent
Mizutani et al.

(10) Patent No.: US 10,994,798 B2
(45) Date of Patent: May 4, 2021

(54) OPERATING DEVICE AND BASE MEMBER

(71) Applicant: SHIMANO INC., Sakai (JP)

(72) Inventors: Hayata Mizutani, Sakai (JP); Yusuke Nishikawa, Sakai (JP); Natsuki Noma, Sakai (JP)

(73) Assignee: SHIMANO INC., Sakai (JP)

( * ) Notice: Subject to any disclaimer, the term of this patent is extended or adjusted under 35 U.S.C. 154(b) by 57 days.

(21) Appl. No.: 16/427,259

(22) Filed: May 30, 2019

(65) Prior Publication Data

US 2020/0070929 A1 Mar. 5, 2020

Related U.S. Application Data

(63) Continuation-in-part of application No. 16/118,380, filed on Aug. 30, 2018.

(51) Int. Cl.
*B62M 25/04* (2006.01)
*B62K 21/12* (2006.01)
(Continued)

(52) U.S. Cl.
CPC ............ *B62K 21/125* (2013.01); *B62K 21/26* (2013.01); *B62K 23/06* (2013.01); *B62L 3/02* (2013.01);
(Continued)

(58) Field of Classification Search
CPC ........ B62K 23/06; B62K 23/02; B62M 25/08; B62M 25/04; B62M 25/02
See application file for complete search history.

(56) References Cited

U.S. PATENT DOCUMENTS 5,159,851 A 11/1992 Rahmes
2005/0016312 A1 1/2005 Dal Pra'
(Continued)

FOREIGN PATENT DOCUMENTS

| CN | 101254750 | 9/2008 |
| DE | 202016003854 U1 | 8/2016 |
| EP | 2100805 B1 | 9/2009 |

OTHER PUBLICATIONS

Office Action issued by the U.S. Patent and Trademark Office for the U.S. Appl. No. 16/118,380, dated Jun. 24, 2020.
(Continued)

*Primary Examiner* — Richard W Ridley
*Assistant Examiner* — Brian J McGovern
(74) *Attorney, Agent, or Firm* — Mori & Ward, LLP

(57) ABSTRACT

An operating device comprises a base member, an operating member, a user operating portion, and a restriction member. The base member includes a first end portion, a second end portion, and a grip portion. The first end portion is configured to be coupled to a handlebar. The second end portion is opposite to the first end portion. The grip portion is provided between the first end portion and the second end portion. The operating member is pivotally coupled to the base member about a pivot axis. The user operating portion is configured to receive a user input and provided at the second end portion of the base member. The restriction member is at least partly provided, as viewed along the pivot axis, between the user operating portion and the first end portion of the base member to restrict unintentional access to the user operating portion.

26 Claims, 61 Drawing Sheets

(51) Int. Cl.
  *B62K 23/06* (2006.01)
  *B62L 3/02* (2006.01)
  *B62M 25/08* (2006.01)
  *B62K 21/26* (2006.01)

(52) U.S. Cl.
  CPC ............ *B62L 3/023* (2013.01); *B62M 25/04* (2013.01); *B62M 25/08* (2013.01)

(56) References Cited

U.S. PATENT DOCUMENTS

| | | |
|---|---|---|
| 2005/0126331 A1 | 6/2005 | Dal Pra |
| 2005/0211014 A1* | 9/2005 | Fujii ...................... B62K 23/04 74/625 |
| 2008/0210043 A1 | 9/2008 | De Perini |
| 2008/0210045 A1 | 9/2008 | De Perini et al. |
| 2009/0235772 A1* | 9/2009 | Naka ...................... B62M 25/08 74/502.2 |
| 2010/0294068 A1* | 11/2010 | Fujii ...................... B62M 25/08 74/473.13 |
| 2013/0255239 A1 | 10/2013 | Miki |
| 2014/0165763 A1* | 6/2014 | Harris .................... B62K 23/06 74/473.12 |
| 2014/0174244 A1 | 6/2014 | Watarai et al. |
| 2016/0129966 A1 | 5/2016 | Meggiolan et al. |
| 2016/0264213 A1 | 9/2016 | Swanson et al. |
| 2016/0327070 A1* | 11/2016 | Fujiwara ................ B62M 25/04 |
| 2017/0015377 A1* | 1/2017 | Feuerstein ............. B62K 23/02 |
| 2017/0217534 A1 | 8/2017 | Nishikawa et al. |
| 2018/0043956 A1 | 2/2018 | Feuerstein |
| 2019/0217827 A1* | 7/2019 | Vandermolen ......... B62M 25/04 |
| 2020/0070931 A1* | 3/2020 | Nishikawa ............. B62K 23/06 |

OTHER PUBLICATIONS

Office Action with Form PTO-892 Notice of References Cited issued by the U.S. Patent and Trademark Office for the U.S. Appl. No. 16/118,380 dated Dec. 27, 2019.

Office Action issued by the United States Patent and Trademark Office for the parent U.S. Appl. No. 16/118,380, dated Sep. 24, 2020.

Office Action with Form PTO-892 Notice of References Cited issued by the U.S. Patent and Trademark Office for the parent U.S. Appl. No. 16/118,380, dated Dec. 21, 2020.

* cited by examiner

OPERATING DEVICE AND BASE MEMBER

CROSS-REFERENCE TO RELATED APPLICATIONS

The present application is a continuation-in-part application of the U.S. patent application Ser. No. 16/118,380 filed Aug. 30, 2018. The contents of this application are incorporated herein by reference in their entirety.

BACKGROUND OF THE INVENTION

Field of the Invention

The present invention relates to an operating device and a base member.

Discussion of the Background

A human-powered vehicle includes an operating device configured to operate an operated component of the human-powered vehicle.

SUMMARY OF THE INVENTION

In accordance with a first aspect of the present invention, an operating device comprises a base member, an operating member, a user operating portion, and a restriction member. The base member includes a first end portion, a second end portion, and a grip portion. The first end portion is configured to be coupled to a handlebar. The second end portion is opposite to the first end portion. The grip portion is provided between the first end portion and the second end portion. The operating member is pivotally coupled to the base member about a pivot axis. The user operating portion is configured to receive a user input and provided at the second end portion of the base member. The restriction member is at least partly provided, as viewed along the pivot axis, between the user operating portion and the first end portion of the base member to restrict unintentional access to the user operating portion.

With the operating device according to the first aspect, the restriction member can reduce unintentional access to the user operating portion, reducing the user's unintentional operation of the user operating portion.

In accordance with a second aspect of the present invention, the operating device according to the first aspect is configured so that the user operating portion is movable relative to the base member in an operation direction and protrudes relative to a reference plane in the operation direction. The restriction member protrudes relative to the reference plane in the operation direction.

With the operating device according to the second aspect, the restriction member can effectively reduce the user's unintentional operation of the user operating portion.

In accordance with a third aspect of the present invention, the operating device according to the second aspect is configured so that the user operating portion has a first length defined from the reference plane in the operation direction. The restriction member has a second length defined from the reference plane in the operation direction. The first length is larger than the second length.

With the operating device according to the third aspect, the restriction member can reliably reduce the user's unintentional operation of the user operating portion.

In accordance with a fourth aspect of the present invention, the operating device according to the third aspect is configured so that the user operating portion is movable relative to the reference plane in the operation direction by an operation stroke. The operation stroke is equal to or larger than a difference between the first length and the second length.

With the operating device according to the fourth aspect, the restriction member can more reliably reduce the user's unintentional operation of the user operating portion.

In accordance with a fifth aspect of the present invention, the operating device according to any one of the first to fourth aspects is configured so that the restriction member is a separate member from the base member.

With the operating device according to the fifth aspect, it is possible to improve flexibility of the design of the restriction member.

In accordance with a sixth aspect of the present invention, the operating device according to any one of the first to fifth aspects is configured so that the restriction member is detachably attached to the base member.

With the operating device according to the sixth aspect, it is possible to replace the restriction member with another restriction member.

In accordance with a seventh aspect of the present invention, the operating device according to any one of the first to sixth aspects is configured so that the base member includes a base body and a grip cover configured to be attached to the base body to at least partly cover the base body. The grip cover is configured to at least partly cover the restriction member in a state where the grip cover is attached to the base body.

With the operating device according to the seventh aspect, it is possible to protect the restriction member with the grip cover.

In accordance with an eighth aspect of the present invention, the operating device according to the seventh aspect is configured so that the restriction member is a separate member from the grip cover.

With the operating device according to the eighth aspect, it is possible to save the manufacturing cost of the restriction member.

In accordance with a ninth aspect of the present invention, the operating device according to the seventh or eighth aspect is configured so that the base body includes an accommodation recess provided at the second end portion. The electrical switch is provided in the accommodation recess.

With the operating device according to the ninth aspect, it is possible to reliably attach the electrical switch to the base body.

In accordance with a tenth aspect of the present invention, the operating device according to the ninth aspect is configured so that the restriction member is provided in the accommodation recess.

With the operating device according to the tenth aspect, it is possible to reliably attach the restriction member to the base body.

In accordance with an eleventh aspect of the present invention, the operating device according to any one of the first to tenth aspects further comprises an electrical switch including the user operating portion and a switch base attached to the base member. The switch base defines the reference plane.

With the operating device according to the eleventh aspect, it is possible to reliably define the reference plane.

In accordance with a twelfth aspect of the present invention, the operating device according to the eleventh aspect is configured so that the user operating portion is movable relative to the switch base in an operation direction. The restriction member protrudes relative to the switch base in the operation direction.

With the operating device according to the twelfth aspect, it is possible to reliably reduce the user's unintentional operation of the user operating member.

In accordance with a thirteenth aspect of the present invention, the operating device according to the eleventh or twelfth aspect is configured so that the restriction member is a separate member from the switch base.

With the operating device according to the thirteenth aspect, it is possible to improve the flexibility of the design of the restricting member.

In accordance with a fourteenth aspect of the present invention, the operating device according to any one of the first to thirteenth aspects is configured so that the restriction member includes an opening. The user operating portion is provided in the opening.

With the operating device according to the fourteenth aspect, the restricting member can effectively reduce the user's unintentional operation of the user operating member.

In accordance with a fifteenth aspect of the present invention, the operating device according to any one of the first to fourteenth aspects is configured so that the restriction member includes a restriction body provided, as viewed along the pivot axis, between the user operating portion and the first end portion of the base member and attached to the base member.

With the operating device according to the fifteenth aspect, the restricting member can effectively reduce the user's unintentional operation of the user operating member.

In accordance with a sixteenth aspect of the present invention, the operating device according to the fifteenth aspect is configured so that the second end portion includes a surface provided at an upper side of the second end portion in a mounting state where the base member is mounted to a handlebar. The restriction member includes a first extending portion extending from the restriction body. The first extending portion is provided between the surface of the second end portion and the user operating portion as viewed along the pivot axis.

With the operating device according to the sixteenth aspect, the restricting member can effectively reduce the user's unintentional operation of the user operating member.

In accordance with a seventeenth aspect of the present invention, the operating device according to the sixteenth aspect is configured so that the restriction member includes a second extending portion extending from the restriction body. The user operating portion is provided between the first extending portion and the second extending portion as viewed along the pivot axis.

With the operating device according to the seventeenth aspect, the restricting member can more effectively reduce the user's unintentional operation of the user operating member.

In accordance with an eighteenth aspect of the present invention, the operating device according to any one of the first to seventeenth aspects is configured so that the base member includes a first lateral surface and a second lateral surface provided on a reverse side of the first lateral surface in a pivot axis direction parallel to the pivot axis. The user operating portion and the restriction member are provided closer to one of the first lateral surface and the second lateral surface than to the other of the first lateral surface and the second lateral surface.

With the operating device according to the eighteenth aspect, the restricting member can effectively reduce the user's unintentional operation of the user operating member.

In accordance with a nineteenth aspect of the present invention, the operating device according to any one of the first to eighteenth aspects further comprises an additional user operating portion. The additional user operating portion is configured to receive an additional user input and provided at the second end portion of the base member. The additional user operating portion is spaced apart from the user operating portion. The restriction member is configured to restrict unintentional access to the additional user operating portion.

With the operating device according to the nineteenth aspect, the restricting member can effectively reduce the user's unintentional operation of the user operating member and the additional user operating member.

In accordance with a twentieth aspect of the present invention, the operating device according to the nineteenth aspect is configured so that the user operating portion is movable relative to the base member in an operation direction and protrudes relative to a reference plane in the operation direction. The additional user operating portion is movable relative to the base member in the operation direction and protrudes relative to the reference plane in the operation direction. The restriction member protrudes relative to the reference plane in the operation direction. The user operating portion has a first length defined from the reference plane in the operation direction. The restriction member has a second length defined from the reference plane in the operation direction. The additional user operating portion has a third length defined from the reference plane in the operation direction. At least one of the first length and the third length is larger than the second length.

With the operating device according to the twentieth aspect, the restricting member can effectively reduce the user's unintentional operation of the user operating member and the additional user operating member.

In accordance with a twenty-first aspect of the present invention, the operating device according to the twentieth aspect is configured so that the user operating portion is movable relative to the reference plane in the operation direction by an operation stroke. The additional user operating portion is movable relative to the reference plane in the operation direction by an additional operation stroke. The operation stroke is equal to or larger than a difference between the first length and the second length. The additional operation stroke is equal to or larger than a difference between the second length and the third length.

With the operating device according to the twenty-first aspect, it is possible to the restricting member can effectively reduce the user's unintentional operation of the user operating member and the additional user operating member.

In accordance with a twenty-second aspect of the present invention, an operating device comprises a base member and an operating member. The base member includes a first end portion, a second end portion, and a grip portion. The first end portion is configured to be coupled to a handlebar. The second end portion is opposite to the first end portion. The grip portion is provided between the first end portion and the second end portion. An operating member is pivotally coupled to the base member about a pivot axis. The base member includes a positioning portion provided at the second end portion. The positioning portion includes a positioning recess configured to position a rider's finger.

With the operating device according to the twenty-second aspect, it is possible to reliably position the rider's finger on the base member. This can improve operability of the operating device.

In accordance with a twenty-third aspect of the present invention, the operating device according to the twenty-second aspect is configured so that the base member includes a first lateral surface and a second lateral surface provided on a reverse side of the first lateral surface in a pivot axis direction parallel to the pivot axis. The positioning portion is provided on the first lateral surface.

With the operating device according to the twenty-third aspect, it is possible to reliably position the rider's finger on the first lateral surface.

In accordance with a twenty-fourth aspect of the present invention, the operating device according to the twenty-second or twenty-third aspect is configured so that the positioning portion includes a positioning lateral surface and a wall portion protruding from the positioning lateral surface to provide the positioning recess.

With the operating device according to the twenty-fourth aspect, it is possible to provide the positioning recess with a simple structure.

In accordance with a twenty-fifth aspect of the present invention, the operating device according to any one of the twenty-second to twenty-fourth aspects is configured so that the positioning portion includes an indicator configured to indicate a position of the positioning portion.

With the operating device according to the twenty-fifth aspect, the user can recognize the position of the positioning portion with the indicator.

In accordance with a twenty-sixth aspect of the present invention, the operating device according to the twenty-fifth aspect is configured so that the indicator includes a pattern.

With the operating device according to the twenty-sixth aspect, the user can reliably recognize the position of the positioning portion with the pattern of the indicator.

In accordance with a twenty-seventh aspect of the present invention, a base member for an operating device including an operating member pivotally coupled to the base member about a pivot axis comprises a base body, a grip cover, and a plurality of convex parts. The base body includes a base outer surface. The grip cover is configured to be attached to the base body to at least partly cover the base body in a state where the grip cover is attached to the base body. The grip cover includes a cover inner surface configured to face the base outer surface in a state where the grip cover is attached to the base body. The plurality of convex parts, at least two convex parts of the plurality of convex parts are provided on at least one of the base outer surface and the cover inner surface, the at least two convex parts of the plurality of convex parts being arranged in a predetermined pattern.

With the base member according to the twenty-seventh aspect, it is possible to increase tightness of the grip cover so as to fit the grip cover firmly relative to the base body.

In accordance with a twenty-eighth aspect of the present invention, the base member according to the twenty-seventh aspect is configured so that the plurality of convex parts is spaced apart from each other.

With the base member according to the twenty-eighth aspect, it is possible to save the weight of the base member with increasing tightness of the grip cover.

In accordance with a twenty-ninth aspect of the present invention, the base member according to the twenty-seventh or twenty-eighth aspect is configured so that the grip cover has a thickness defined from the cover inner surface to a cover outer surface. The plurality of convex parts has a height defined from the cover inner surface of the grip cover. The height is equal to or smaller than the thickness of the grip cover.

With the base member according to the twenty-ninth aspect, it is possible to reliably save the weight of the base member with increasing tightness of the grip cover.

In accordance with a thirtieth aspect of the present invention, the base member according to the twenty-ninth aspect is configured so that the height includes a maximum height. The maximum height is equal to or larger than 0.5 mm.

With the base member according to the thirtieth aspect, it is possible to reliably increase tightness of the grip cover so as to fit the grip cover firmly relative to the base body.

In accordance with a thirty-first aspect of the present invention, the base member according to the twenty-ninth or thirtieth aspect is configured so that each of the plurality of convex parts has a curved profile. The height is smaller than a diameter of the curved profile.

With the base member according to the thirty-first aspect, it is possible to easily form the plurality of convex parts.

In accordance with a thirty-second aspect of the present invention, the base member according to any one of the twenty-ninth to thirty-first aspect is configured so that each of the plurality of convex parts includes a curved convex surface.

With the base member according to the thirty-second aspect, it is possible to adopt the plurality of convex parts to a contact part which is in contact with the plurality of convex parts.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
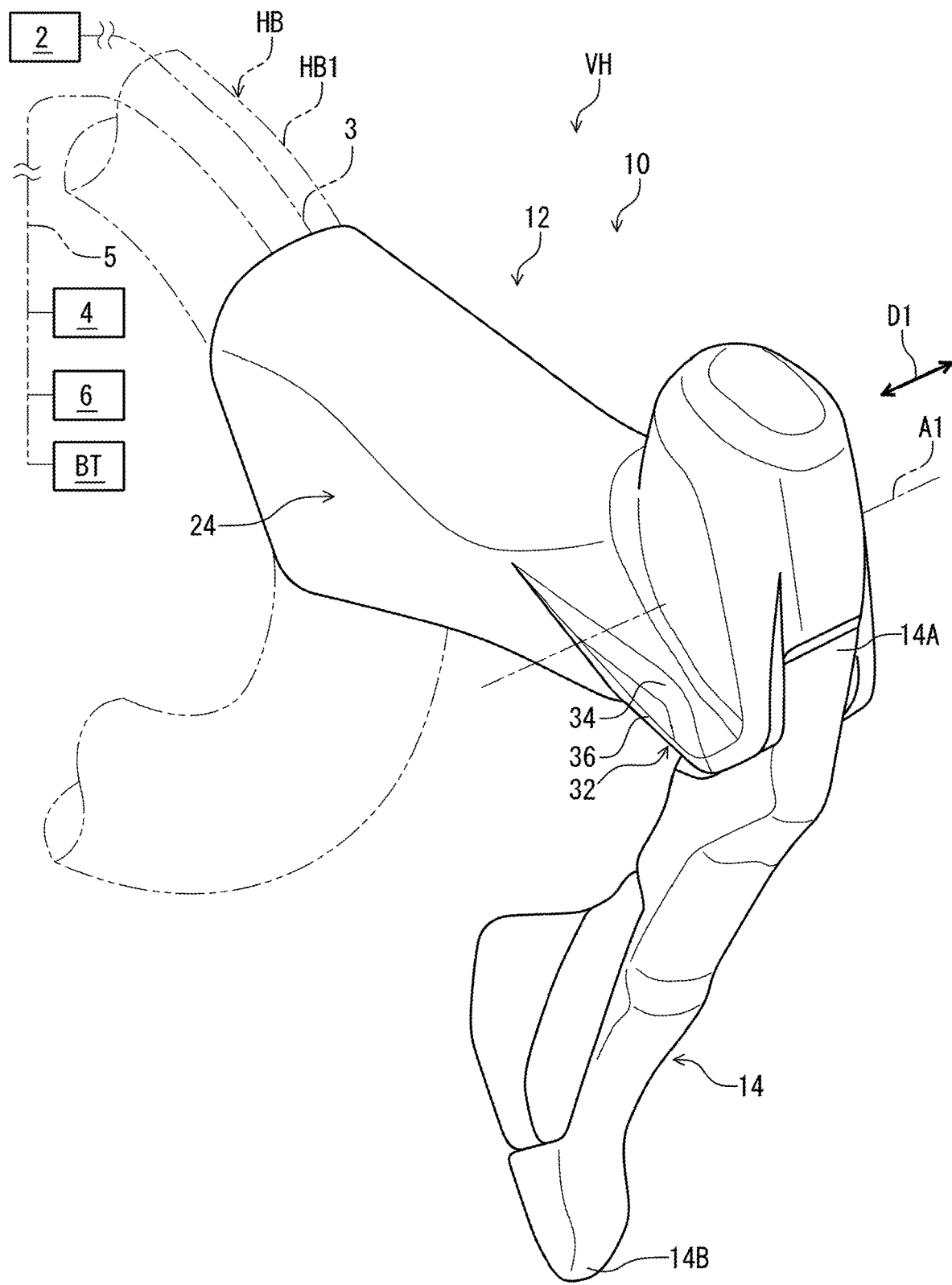
FIG. 1 is a perspective view of an operating device in accordance with a first embodiment.

The embodiment(s) will now be described with reference to the accompanying drawings, wherein like reference numerals designate corresponding or identical elements throughout the various drawings.

First Embodiment

As seen in FIG. 1, an operating device 10 in accordance with a first embodiment is configured to be mounted to a handlebar HB of a human-powered vehicle VH. The operating device 10 is configured to be connected to a hydraulic operated device 2 with a hydraulic hose 3. The operating device 10 is configured to be connected to an electric device 4 with an electric control cable 5. The operating device 10 is configured to be connected to an electric device 6 with the electric control cable 5. In this embodiment, the hydraulic operated device 2 includes a brake caliper. The electric device 4 includes an electric shifting device configured to change a gear position of the human-powered vehicle VH. The electric device 6 includes an additional device (e.g., an adjustable seatpost) other than the electric shifting device. However, the hydraulic operated device 2 is not limited to the brake caliper. The electric device 4 is not limited to the electric shifting device. The electric device 6 is not limited to the adjustable seatpost. In this embodiment, the operating device 10 is a right-hand side operating device. However, the operating device 10 can be a left-hand side operating device.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle of the human-powered vehicle VH (e.g., a bicycle) with facing the handlebar HB. Accordingly, these terms, as utilized to describe the operating device 10, should be interpreted relative to the human-powered vehicle VH (e.g., a bicycle) equipped with the operating device 10 as used in an upright riding position on a horizontal surface.

For example, the human-powered vehicle VH is a vehicle to travel with a motive power including at least a human power of a rider who rides the human-powered vehicle VH. The human-powered vehicle VH has an arbitrary number of wheels. For example, the human-powered vehicle VH has at least one wheel. In this embodiment, the human-powered vehicle VH preferably has a smaller size than that of a four-wheeled automobile. However, the human-powered vehicle VH can have an arbitrary size. For example, the human-powered vehicle VH can have a larger size than that of the four-wheeled automobile. Examples of the human-powered vehicle VH include a bicycle, a tricycle, and a kick scooter. In this embodiment, the human-powered vehicle VH is a bicycle. An electric assisting system including an electric motor can be applied to the human-powered vehicle VH (e.g., the bicycle) to assist muscular motive power of the rider. Namely, the human-powered vehicle VH can be an E-bike.

The operating device 10 comprises a base member 12 and an operating member 14. The operating member 14 is pivotally coupled to the base member 12 about a pivot axis A1. The base member 12 is configured to be mounted to one of a dropdown portion and a bar end portion of a handlebar. In this embodiment, the base member 12 is configured to be mounted to a dropdown portion HB1 of the handlebar HB. However, the base member 12 can be configured to be mounted to a bar end portion of a handlebar.

The operating member 14 includes a proximal end 14A and a distal end 14B opposite to the proximal end 14A. The operating member 14 is pivotally coupled to the base member 12 at the proximal end 14A about the pivot axis A1. The operating member 14 extends from the proximal end 14A to the distal end 14B. The distal end 14B constitutes a free end of the operating member 14. A pivot axis direction D1 is parallel to the pivot axis A1.

Figure 2:
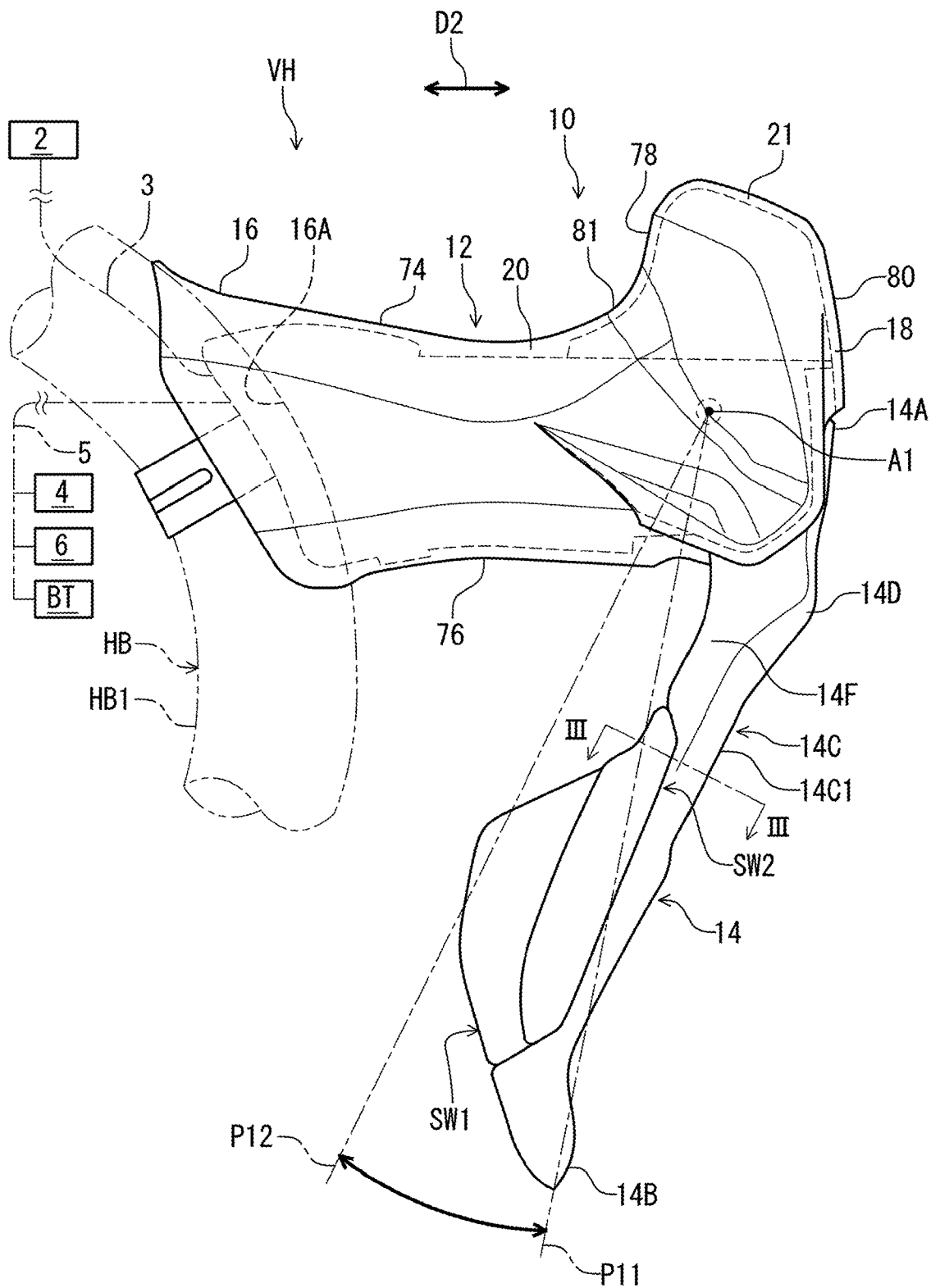
FIG. 2 is a side elevational view of the operating device illustrated in FIG. 1.

As seen in FIG. 2, the operating member 14 includes a lever recess 14C provided between the proximal end 14A and the distal end 14B to receive a rider's finger (digit). The operating member 14 includes a projection 14D provided between the proximal end 14A and the lever recess 14C. In this embodiment, the operating member 14 includes a contact surface 14C1 provided in the lever recess 14C to be contactable with the rider's finger (digit). The contact surface 14C1 has a substantially linear outline as viewed along the pivot axis A1.

Figure 3:
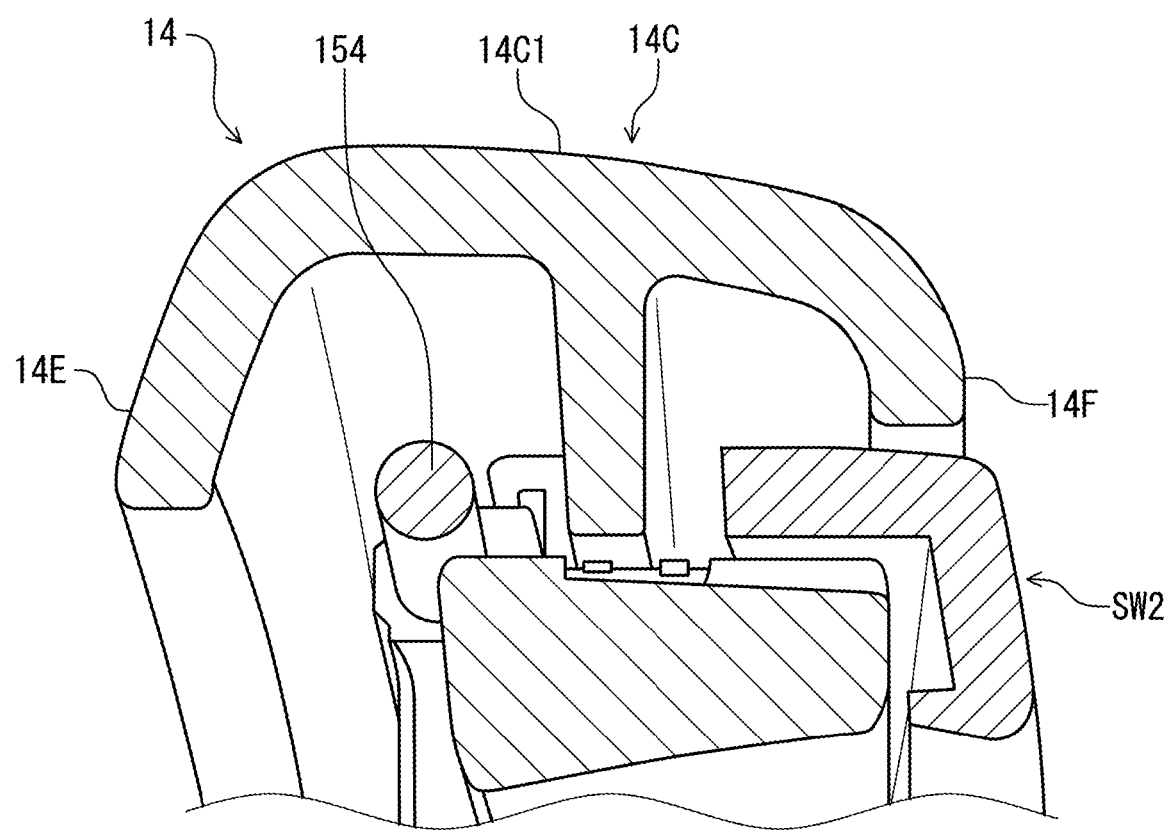
FIG. 3 is a cross-sectional view of the operating device taken along line III-III of FIG. 2.

As seen in FIG. 3, the contact surface 14C1 has a curved convex outline in a cross-sectional view. Namely, the contact surface 14C1 includes a curved convex surface. However, the contact surface 14C1 can include a flat surface or other type of surface instead of or in addition to the curved surface.

The operating member 14 can at least partly have a surface treatment to suppress the slip of the rider's finger relative to the operating member 14. Examples of such surface treatment include an anti-skid coating (e.g., rubber coating or rubber-like coating) and a roughness treatment (e.g., shot blasting). Such surface treatment can be provided on the contact surface 14C1 or other surfaces of the operating member 14.

As seen in FIG. 2, the operating member 14 is pivotable relative to the base member 12 about the pivot axis A1 from a rest position P11 to an operated position P12. In the present application, the term "rest position" as used herein refers to a position at which a movable part such as the operating member 14 remains stationary in a state where the movable part is not operated by the user. The term "operated position" as used herein refers to a position at which the movable part has been operated by the user to perform the operation of the hydraulic operated device 2.

The base member 12 includes a first end portion 16, a second end portion 18, and a grip portion 20. The first end portion 16 is configured to be coupled to the handlebar HB. The first end portion 16 includes a handlebar contact surface 16A configured to be in contact with the handlebar HB in a state where the first end portion 16 is coupled to the handlebar HB. The second end portion 18 is opposite to the first end portion 16. The grip portion 20 is provided between the first end portion 16 and the second end portion 18. The base member 12 extends between the first end portion 16 and the second end portion 18 in a longitudinal direction D2 perpendicular to the pivot axis A1. In this embodiment, the base member 12 includes a pommel portion 21. The pommel portion 21 is provided at the second end portion 18. The pommel portion 21 forwardly upwardly extends from the second end portion 18 in a mounting state where the base member 12 is mounted to the handlebar HB. The pommel portion 21 can be omitted from the base member 12.

Figure 4:
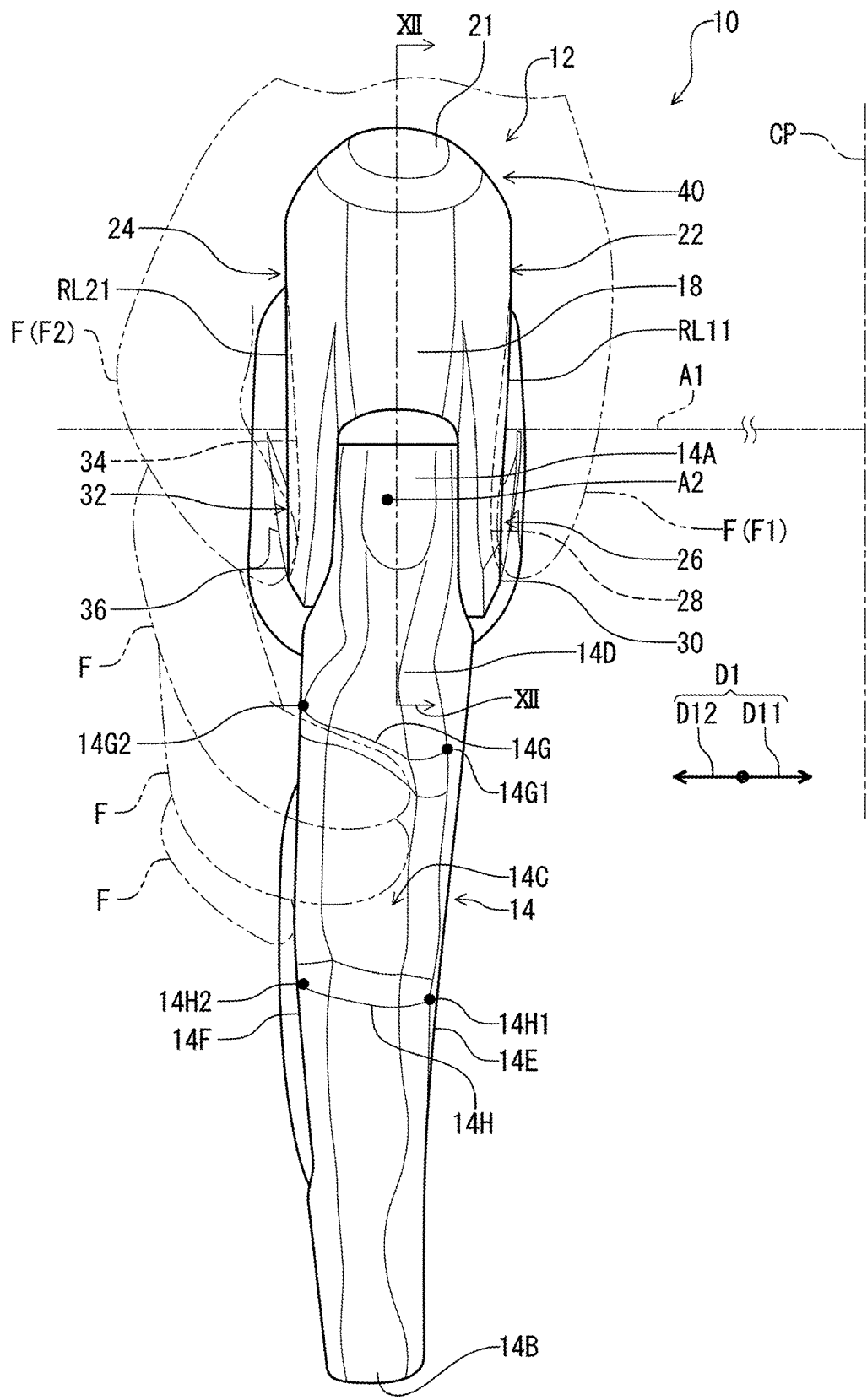
FIG. 4 is a front view of the operating device illustrated in FIG. 1.

As seen in FIG. 4, the base member 12 includes a first lateral surface 22 and a second lateral surface 24. The second lateral surface 24 is provided on a reverse side of the first lateral surface 22 in the pivot axis direction D1 parallel to the pivot axis A1. The first lateral surface 22 faces in the pivot axis direction D1. The second lateral surface 24 faces in the pivot axis direction D1.

In this embodiment, the first lateral surface 22 faces in a first pivot axis direction D11 defined parallel to the pivot axis direction D1. The second lateral surface 24 faces in a second pivot axis direction D12 defined parallel to the pivot axis direction D1. The second pivot axis direction D12 is an opposite direction of the first pivot axis direction D11. The first lateral surface 22 faces a vehicle-center plane CP of the human-powered vehicle VH in a mounting state where the operating device 10 is mounted to the handlebar HB (FIG. 1). The vehicle-center plane CP is perpendicular to the pivot axis A1 in the mounting state. The first lateral surface 22 is provided closer to the vehicle-center plane CP than the second lateral surface 24 in the pivot axis direction D1 in the mounting state.

Figure 5:
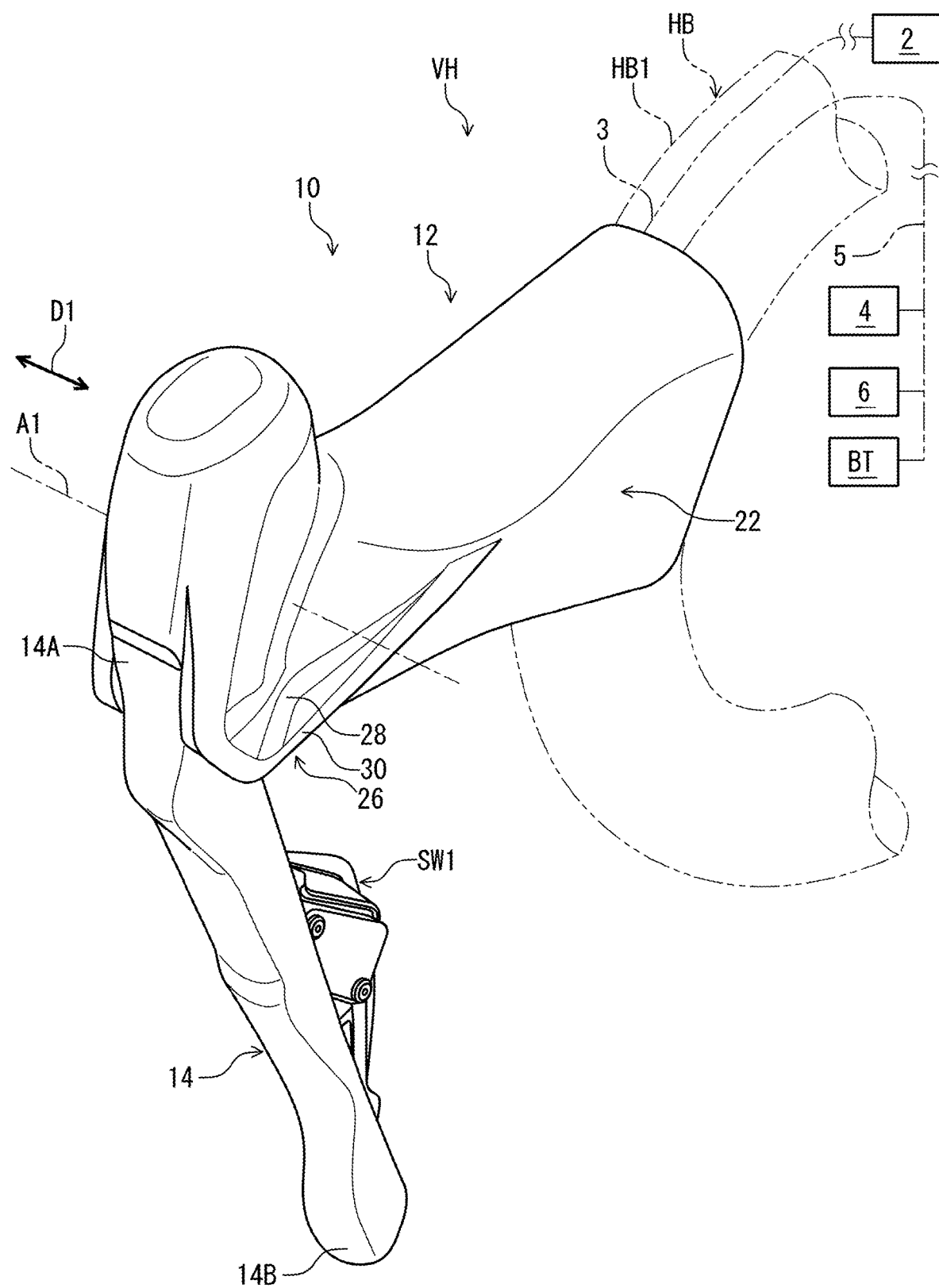
FIG. 5 is another perspective view of the operating device illustrated in FIG. 1.

As seen in FIG. 5, the base member 12 includes a first positioning portion 26. The first positioning portion 26 can also be referred to as a first holding portion 26. The first positioning (holding) portion 26 is provided on the first lateral surface 22. The first positioning portion 26 is configured to position a rider's finger F (FIG. 4) (at the first lateral surface 22).

As seen in FIG. 4, the rider's finger F includes a thumb F1 of the rider. The first positioning portion 26 is configured to position the thumb F1 of the rider. However, the first positioning portion 26 can be configured to position a finger other than the thumb F1. In this embodiment, the rider's finger F can also be referred to as a rider's digit F.

In this embodiment, the first positioning portion 26 includes a first recess 28. The first recess 28 is configured to position the rider's finger F. The first recess 28 is configured to position the thumb F1 of the rider. However, the first recess 28 can be configured to position a finger other than the thumb F1.

The lever recess 14C is provided between the proximal end 14A and the distal end 14B to receive at least one rider's finger F. The operating member 14 includes a first side surface 14E and a second side surface 14F. The first side surface 14E faces in the pivot axis direction D1. The second side surface 14F faces in the pivot axis direction D1. The second side surface 14F is provided on a reverse side of the first side surface 14E in the pivot axis direction D1. The first side surface 14E is provided closer to the first lateral surface 22 than the second side surface 14F in the pivot axis direction D1. The second side surface 14F is provided closer to the second lateral surface 24 than the first side surface 14E in the pivot axis direction D1. The lever recess 14C extends from the first side surface 14E to the second side surface 14F in the pivot axis direction D1.

The lever recess 14C includes a first recess end line 14G and a second recess end line 14H. The first recess end line 14G is provided between the proximal end 14A and the second recess end line 14H. The second recess end line 14H is provided between the distal end 14B and the first recess end line 14G.

The first recess end line 14G includes a first end point 14G1 and a first additional end point 14G2. The first recess end line 14G extends from the first end point 14G1 to the first additional end point 14G2. The first end point 14G1 is closer to the first side surface 14E than the first additional end point 14G2 in the pivot axis direction D1. The first recess end line 14G is inclined relative to the pivot axis direction D1 such that the first additional end point 14G2 is closer to the proximal end 14A than the first end point 14G1. However, the first recess end line 14G can be substantially parallel to the pivot axis direction D1, and a distance from the first additional end point 14G2 to the proximal end 14A can be equal to a distance from the first end point 14G1 to the proximal end 14A.

The second recess end line 14H includes a second end point 14H1 and a second additional end point 14H2. The second recess end line 14H extends from the second end point 14H1 to the second additional end point 14H2. The second end point 14H1 is closer to the first side surface 14E than the second additional end point 14H2 in the pivot axis direction D1. The second recess end line 14H is inclined relative to the pivot axis direction D1 such that the second additional end point 14H2 is closer to the proximal end 14A than the second end point 14H1. However, the second recess end line 14H can be substantially parallel to the pivot axis direction D1, and a distance from the second additional end point 14H2 to the proximal end 14A can be equal to a distance from the second end point 14H1 to the proximal end 14A.

Figure 6:
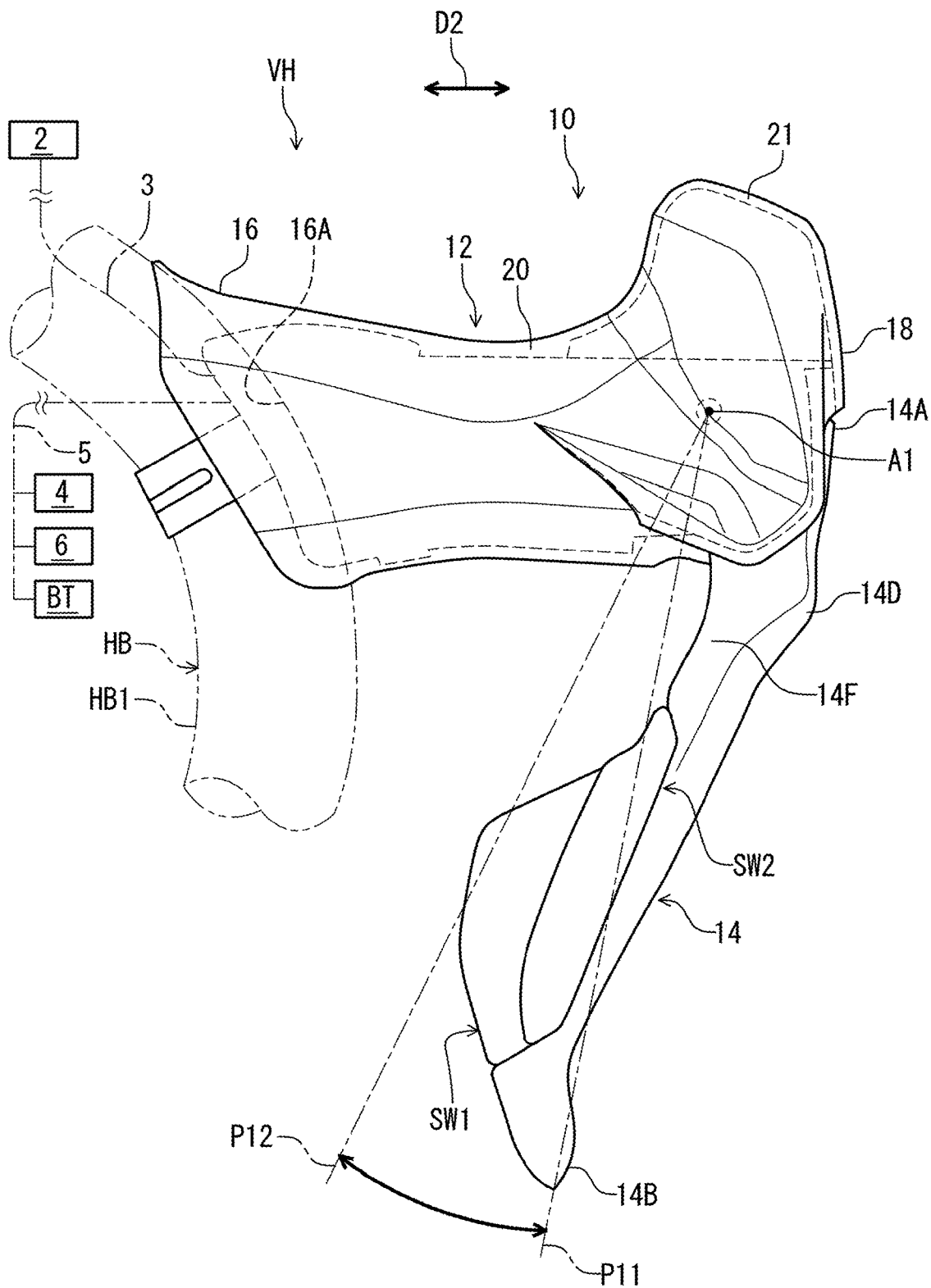
FIG. 6 is a side elevational view of the operating device in accordance with a modification of the first embodiment.
Figure 7:
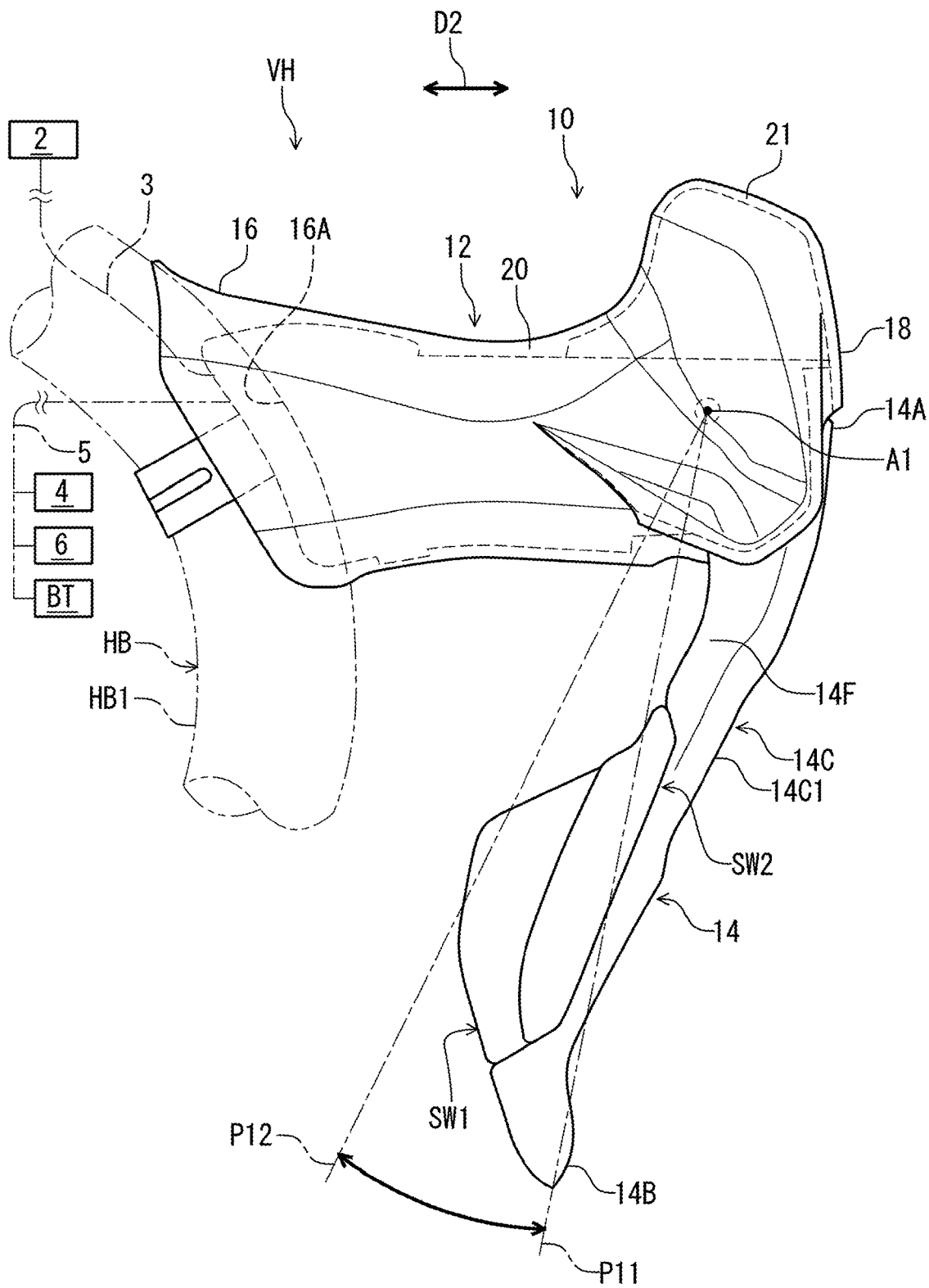
FIG. 7 is a side elevational view of the operating device in accordance with another modification of the first embodiment.
Figure 8:
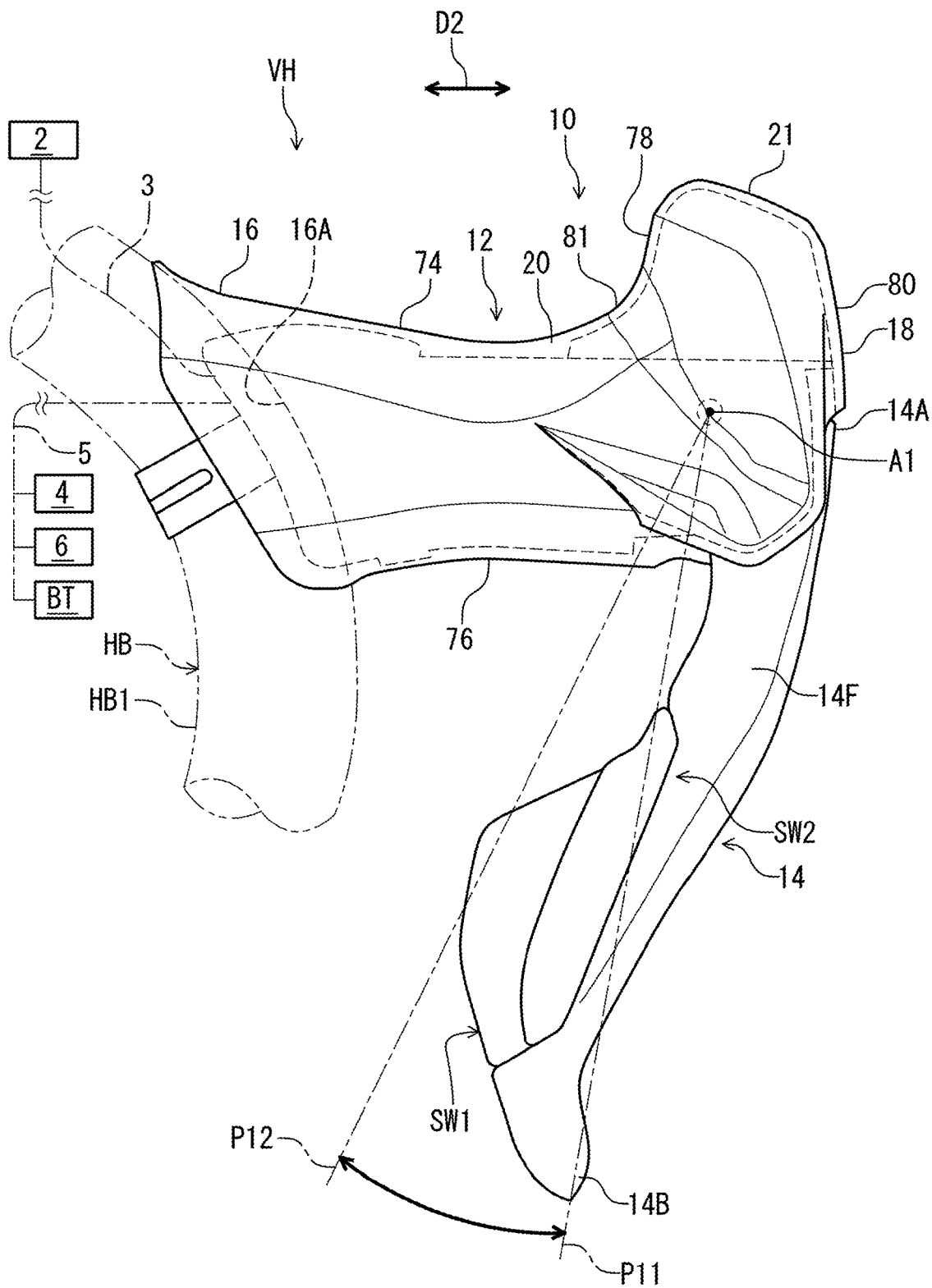
FIG. 8 is a side elevational view of the operating device in accordance with another modification of the first embodiment.

In this embodiment, as seen in FIG. 2, the operating member 14 includes the lever recess 14C and the projection 14D. As seen in FIG. 6, however, the lever recess 14C can be omitted from the operating member 14. As seen in FIG. 7, the projection 14D can be omitted from the operating member 14. As seen in FIG. 8, both the lever recess 14C and the projection 14D can be omitted from the operating member 14.

As seen in FIG. 5, the base member 12 includes a first lateral protuberance 30. The first lateral protuberance 30 is provided on the first lateral surface 22 to define the first positioning portion 26 at least partly. In this embodiment, the first lateral protuberance 30 is provided on the first lateral surface 22 to define the first positioning portion 26 entirely. However, the first lateral protuberance 30 can be provided on the first lateral surface 22 to define the first positioning portion 26 partly.

As seen in FIG. 1, the base member 12 further includes a second positioning portion 32. The second positioning portion 32 is provided on the second lateral surface 24. The second positioning portion 32 is configured to position a rider's another finger F (FIG. 4).

As seen in FIG. 4, the rider's another finger F includes an index finger F2 of the rider. The second positioning portion 32 is configured to position the index finger F2 of the rider. However, the second positioning portion 32 can be configured to position a finger other than the index finger F2.

In this embodiment, the second positioning portion 32 includes a second recess 34. The second recess 34 is configured to position the rider's another finger F. The second recess 34 is configured to position the index finger F2 of the rider. However, the second recess 34 can be configured to position a finger other than the index finger F2.

As seen in FIG. 1, the base member 12 includes a second lateral protuberance 36. The second lateral protuberance 36 is provided on the second lateral surface 24 to define the second positioning portion 32 at least partly. In this embodiment, the second lateral protuberance 36 is provided on the second lateral surface 24 to define the second positioning portion 32 entirely. However, the second lateral protuberance 36 can be provided on the second lateral surface 24 to define the second positioning portion 32 partly.

As seen in FIG. 4, the first lateral surface 22 has a first ridge line RL11 as viewed in the longitudinal direction D2 (FIG. 2). The second lateral surface 24 has a second ridge line RL21 as viewed in the longitudinal direction D2. The first recess 28 is recessed from the first ridge line RL11 of the first lateral surface 22 in the pivot axis direction D1 as viewed in the longitudinal direction D2. The second recess 34 is recessed from the second ridge line RL21 of the second lateral surface 24 in the pivot axis direction D1 as viewed in the longitudinal direction D2.

Figure 10:
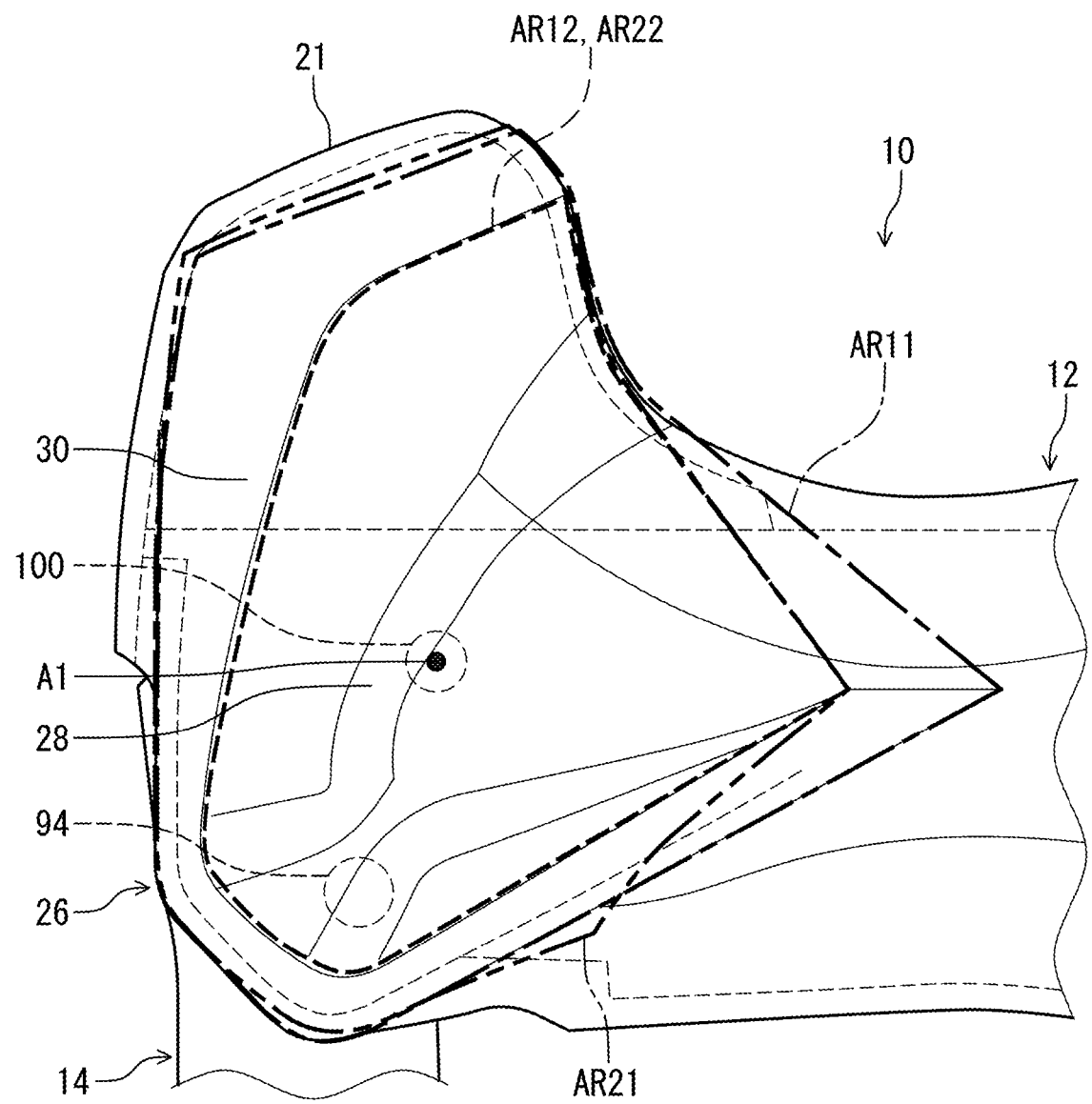
FIG. 10 is a partial enlarged side elevational view of the operating device illustrated in FIG. 1.
Figure 11:
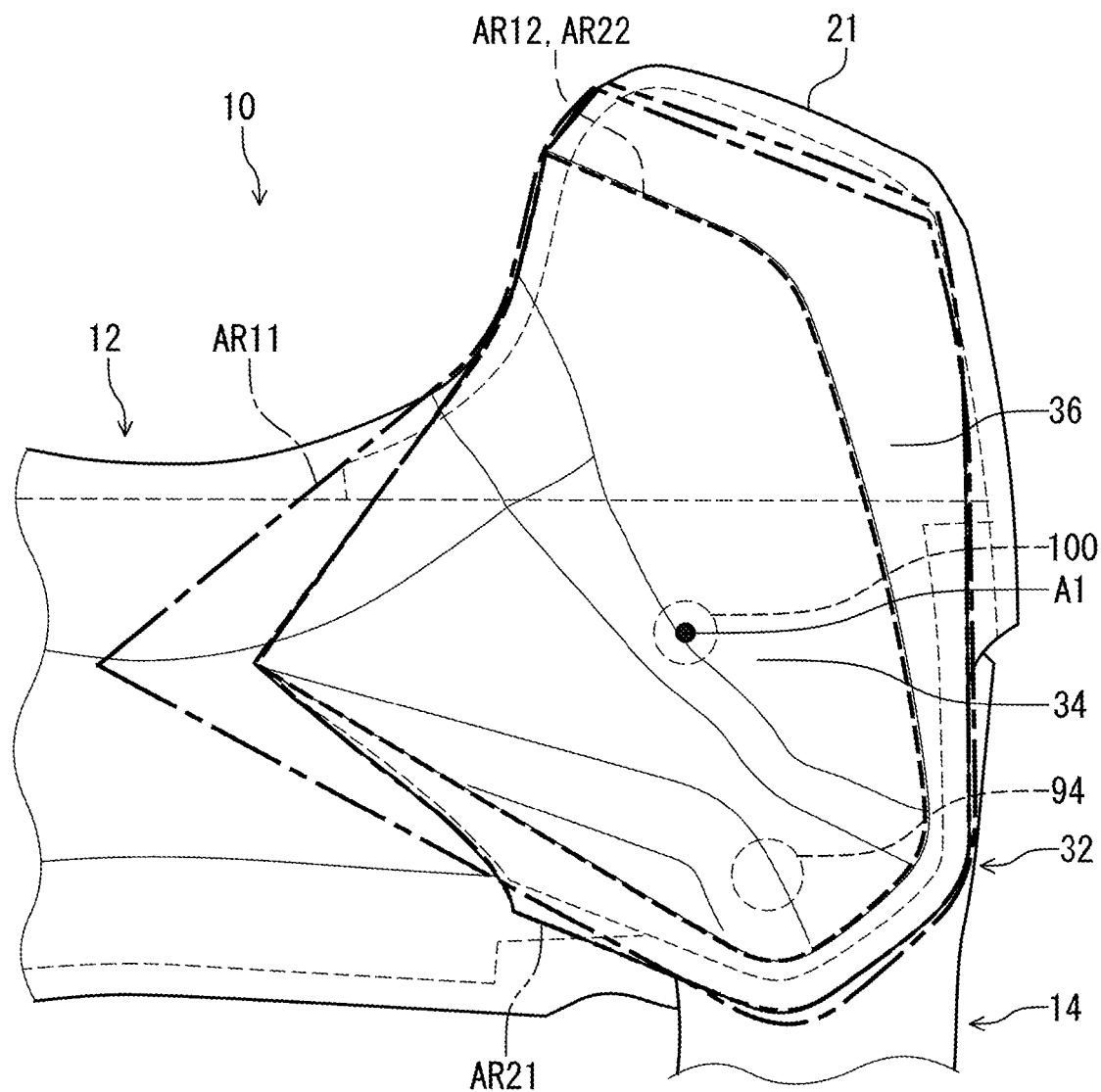
FIG. 11 is another partial enlarged side elevational view of the operating device illustrated in FIG. 1.

As seen in FIG. 10, the first positioning portion 26 has a first area AR11 as viewed along the pivot axis A1. The first area AR11 is indicated with a chain line. As seen in FIG. 11, the second positioning portion 32 has a second area AR21 as viewed along the pivot axis A1. The second area AR21 is indicated with a chain double-dashed line. As seen in FIGS. 10 and 11, the first area AR11 of the first positioning portion 26 at least partly overlaps with the second area AR21 of the second positioning portion 32 as viewed along the pivot axis A1. In this embodiment, the first area AR11 of the first positioning portion 26 partly overlaps with the second area AR21 of the second positioning portion as viewed along the pivot axis A1. However, the first area AR11 of the first positioning portion 26 can entirely overlap with the second area AR21 of the second positioning portion as viewed along the pivot axis A1.

As seen in FIG. 10, the first recess 28 has a first recess area AR12 as viewed along the pivot axis A1. The first recess area AR12 is indicated with a dot-line. As seen in FIG. 11, the second recess 34 has a second recess area AR22 as viewed along the pivot axis A1. The second recess area AR22 is indicated with a dot-line. As seen in FIGS. 10 and 11, the first recess area AR12 of the first recess 28 at least partly overlaps with the second recess area AR22 of the second recess 34 as viewed along the pivot axis A1. In this embodiment, the first recess area AR12 of the first recess 28 entirely overlaps with the second recess area AR22 of the second positioning portion as viewed along the pivot axis A1. However, the first recess area AR12 of the first recess 28 can partly overlap with the second recess area AR22 of the second positioning portion as viewed along the pivot axis A1.

Figure 12:
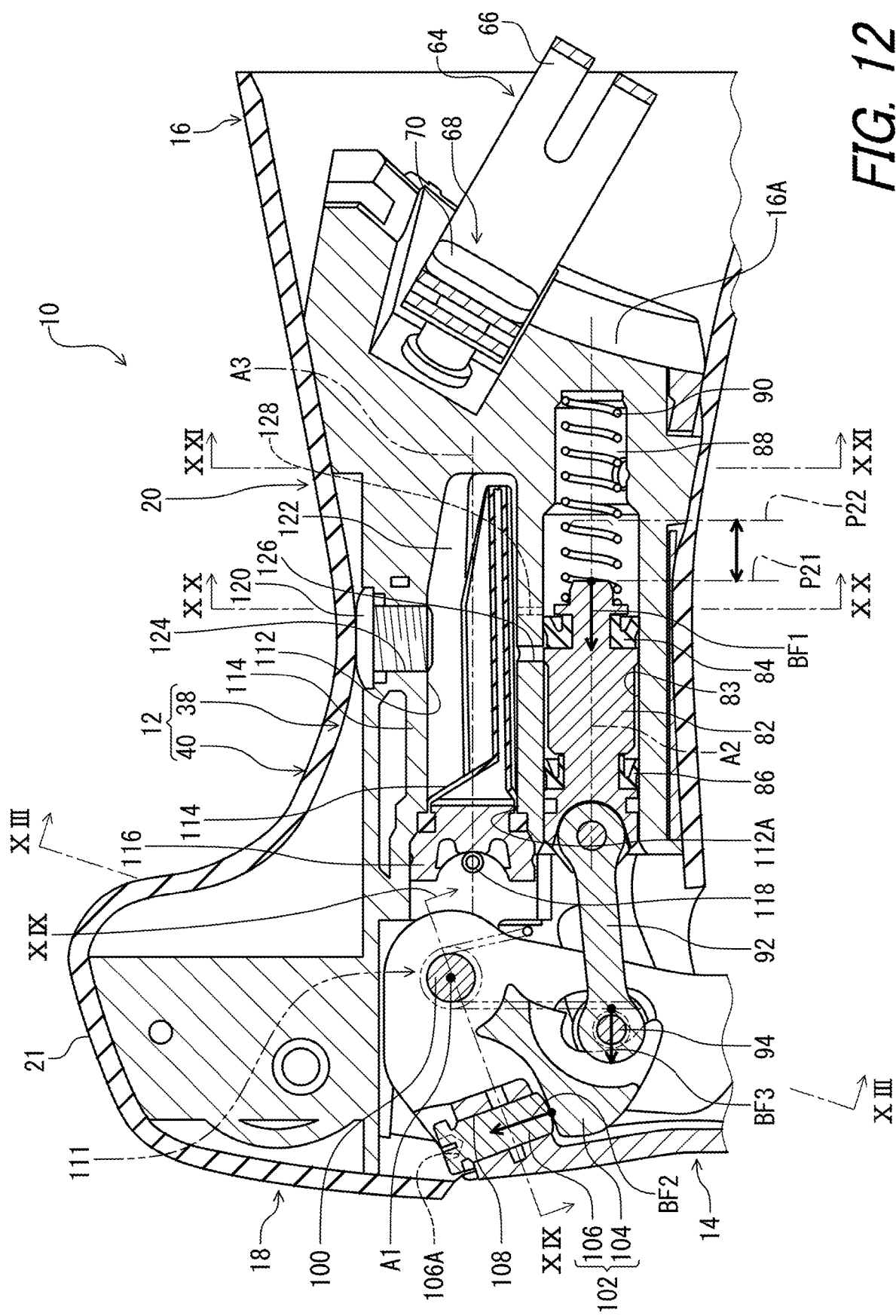
FIG. 12 is a cross-sectional view of the operating device taken along line XII-XII of FIG. 4.

As seen in FIG. 12, the base member 12 includes a base body 38 and a grip cover 40. The grip cover 40 is attached to the base body 38 to at least partly cover the base body 38. In this embodiment, the grip cover 40 is attached to the base body 38 to entirely cover the base body 38. The grip cover 40 is detachably attached to the base body 38. However, the grip cover 40 can be attached to the base body 38 to partly cover the base body 38. The grip cover 40 can also be referred to as a cover member 40.

As seen in FIG. 4, the grip cover 40 (cover member) for the operating device 10 including the operating member 14 pivotally arranged about the pivot axis A1 comprises the first lateral surface 22, the second lateral surface 24, and the first positioning portion 26. Namely, the grip cover 40 includes the first lateral surface 22 and the first positioning portion 26. The grip cover 40 includes the second lateral surface 24 and the second positioning portion 32. However, the grip cover 40 can be omitted from the base member 12. In such embodiments, the base body 38 can include the first lateral surface 22 and the first positioning portion 26. The base body 38 includes the second lateral surface 24 and the second positioning portion 32.

Figure 13:
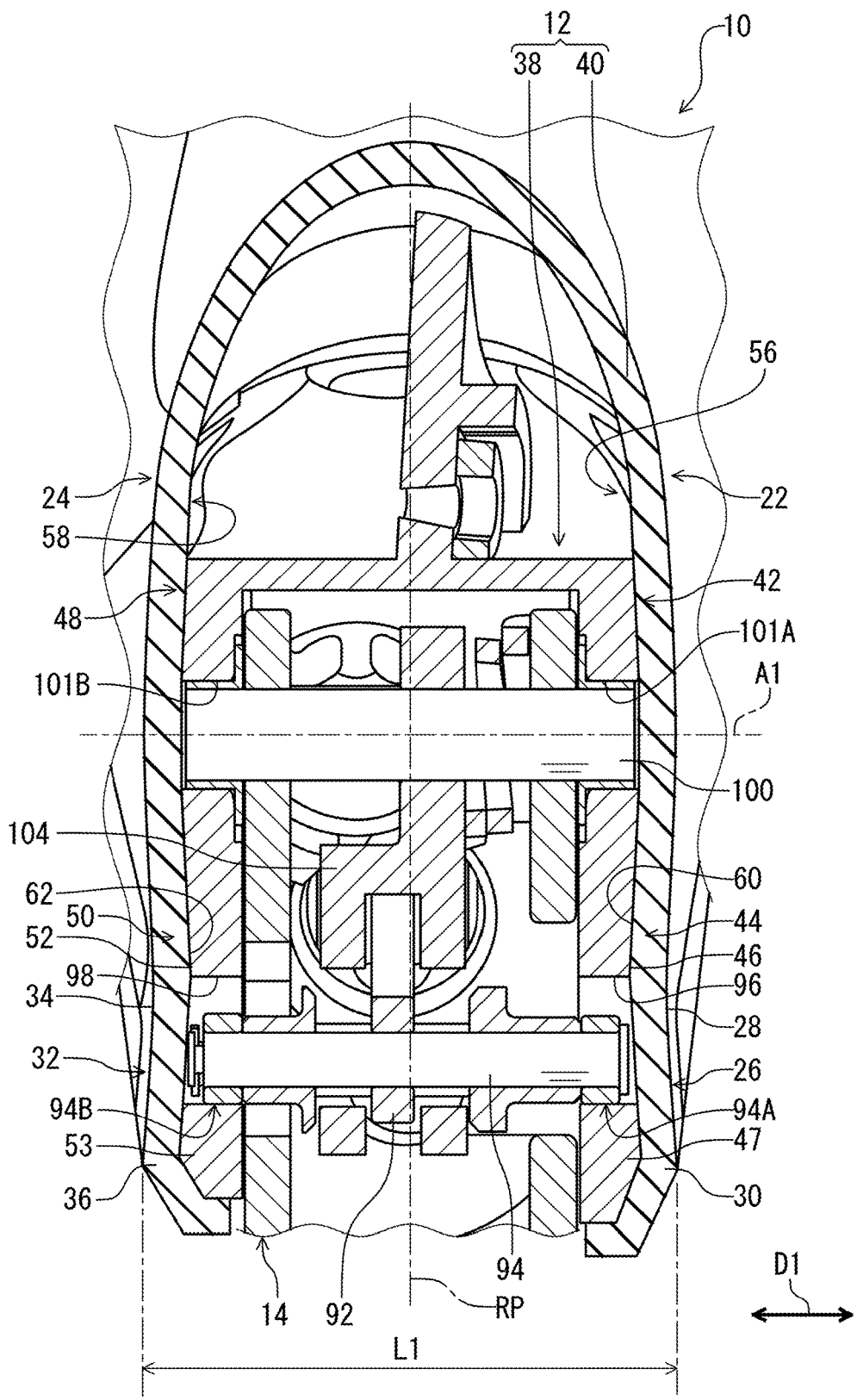
FIG. 13 is a cross-sectional view of the operating device taken along line XIII-XIII of FIG. 12.

As seen in FIG. 13, the second positioning portion 32 is asymmetric to the first positioning portion 26 relative to a reference plane RP perpendicular to the pivot axis A1. However, the second positioning portion 32 can be symmetric to the first positioning portion 26 relative to the reference plane RP. The reference plane RP is defined to bisect a distance L1 between the first positioning portion 26 and the second positioning portion 32 in the pivot axis direction D1.

The base body 38 includes a first additional lateral surface 42 and a first additional positioning portion 44. The first additional lateral surface 42 is at least partly covered with the grip cover 40. The first additional positioning portion 44 is provided on the first additional lateral surface 42. The first additional positioning portion 44 includes a first additional recess 46. The first additional positioning portion 44 includes a first additional lateral protuberance 47. The first additional lateral protuberance 47 is provided on the first additional lateral surface 42 to define the first additional recess 46 at least partly. In this embodiment, the first additional lateral surface 42 is entirely covered with the grip cover 40. The first additional lateral protuberance 47 is provided on the first additional lateral surface 42 to define the first additional recess 46 entirely. However, the first additional lateral surface 42 can be partly covered with the grip cover 40. The first additional lateral protuberance 47 can be provided on the first additional lateral surface 42 to define the first additional recess 46 partly.

The base body 38 includes a second additional lateral surface 48. The base body 38 includes a second additional positioning portion 50. The second additional lateral surface 48 is at least partly covered with the grip cover 40. The second additional positioning portion 50 is provided on the second additional lateral surface 48. The second additional positioning portion 50 includes a second additional recess 52. The second additional positioning portion 50 includes a second additional lateral protuberance 53. The second additional lateral protuberance 53 is provided on the second additional lateral surface 48 to define the second additional recess 52 at least partly. In this embodiment, the second additional lateral surface 48 is entirely covered with the grip cover 40. The second additional lateral protuberance 53 is provided on the second additional lateral surface 48 to define the second additional recess 52 entirely. However, the second additional lateral surface 48 can be partly covered with the grip cover 40. The second additional lateral protuberance 53 can be provided on the second additional lateral surface 48 to define the second additional recess 52 partly.

The grip cover 40 includes a first inner surface 56 and a second inner surface 58. The first inner surface 56 is provided on a reverse side of the first lateral surface 22 in the pivot axis direction D1. The first inner surface 56 faces the first additional lateral surface 42 in a state where the grip cover 40 is attached to the base body 38. The second inner surface 58 is provided on a reverse side of the second lateral surface 24 in the pivot axis direction D1. The second inner surface 58 is spaced apart from the first inner surface 56 in the pivot axis direction D1. The second inner surface 58 faces the second additional lateral surface 48 in the state where the grip cover 40 is attached to the base body 38. In this embodiment, the first inner surface 56 is in contact with the first additional lateral surface 42 in the state where the grip cover 40 is attached to the base body 38. The second inner surface 58 is in contact with the second additional lateral surface 48 in the state where the grip cover 40 is attached to the base body 38.

The grip cover 40 includes a first inner protuberance 60. The first inner protuberance 60 is provided on the first inner surface 56. The first inner protuberance 60 is provided in the first additional positioning portion 44 in the state where the grip cover 40 is attached to the base body 38. The first inner protuberance 60 is provided in the first additional recess 46 in the state where the grip cover 40 is attached to the base body 38. The first inner protuberance 60 has a shape complementary with the first additional recess 46.

The grip cover 40 includes a second inner protuberance 62. The second inner protuberance 62 is provided on the second inner surface 58. The second inner protuberance 62 is provided in the second additional positioning portion 50 in the state where the grip cover 40 is attached to the base body 38. The second inner protuberance 62 is provided in the second additional recess 52 in the state where the grip cover 40 is attached to the base body 38. The second inner protuberance 62 has a shape complementary with the second additional recess 52.

Figure 14:
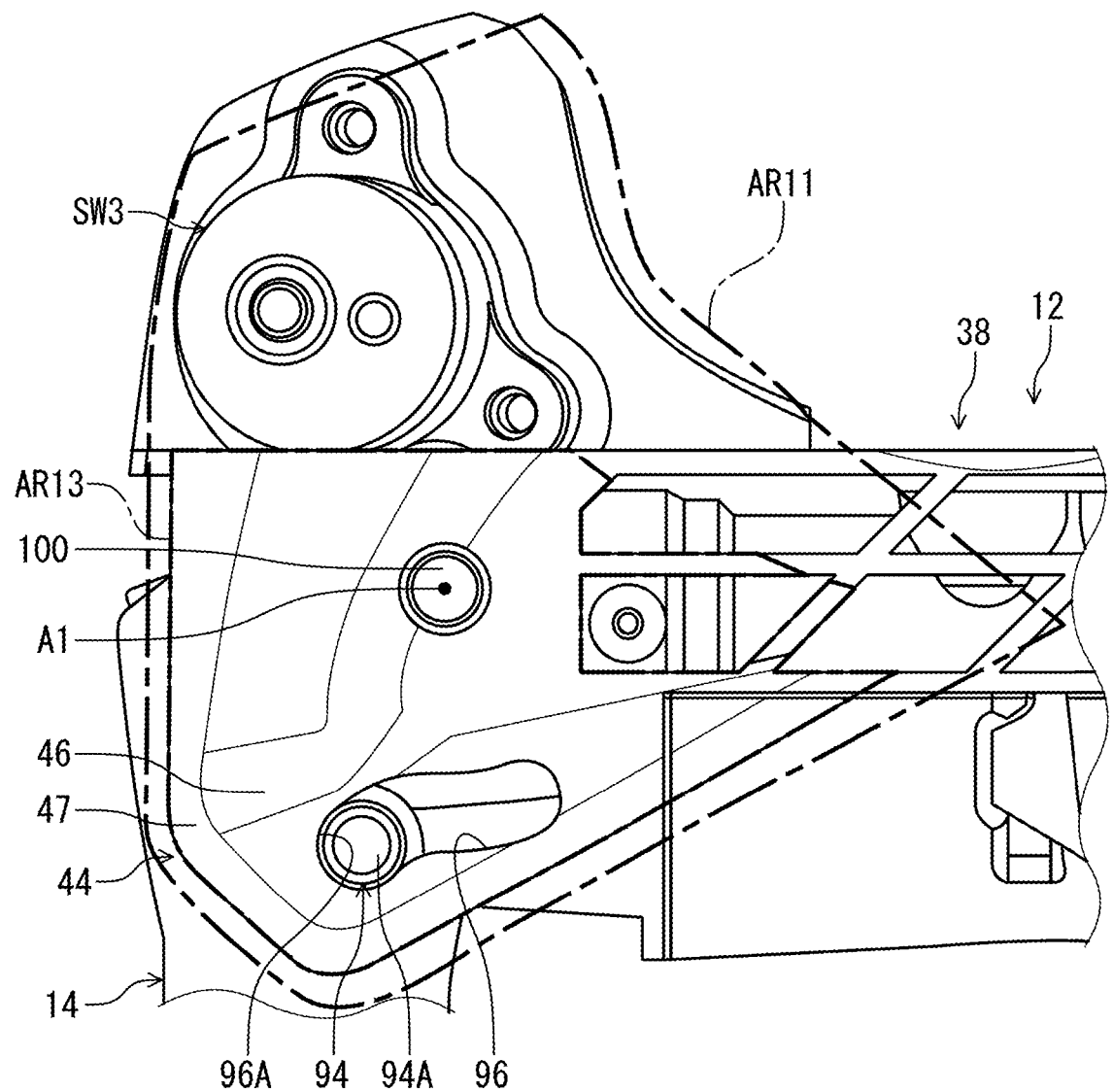
FIG. 14 is a partial enlarged side elevational view of the operating device illustrated in FIG. 1, with a grip cover omitted.

As seen in FIG. 14, the first additional positioning portion 44 has a first additional area AR13 as viewed along the pivot axis A1. The first additional area AR13 is indicated with a chain line different from the chain line of the first area AR11. The first area AR11 of the first positioning portion 26 at least partly overlaps with the first additional area AR13 of the first additional positioning portion 44 as viewed along the pivot axis A1. In this embodiment, the first area AR11 of the first positioning portion 26 partly overlaps with the first additional area AR13 of the first additional portion as viewed along the pivot axis A1. However, the first area AR11 of the first positioning portion 26 can entirely overlap with the first additional area AR13 of the first additional positioning portion 44 as viewed along the pivot axis A1.

Figure 15:
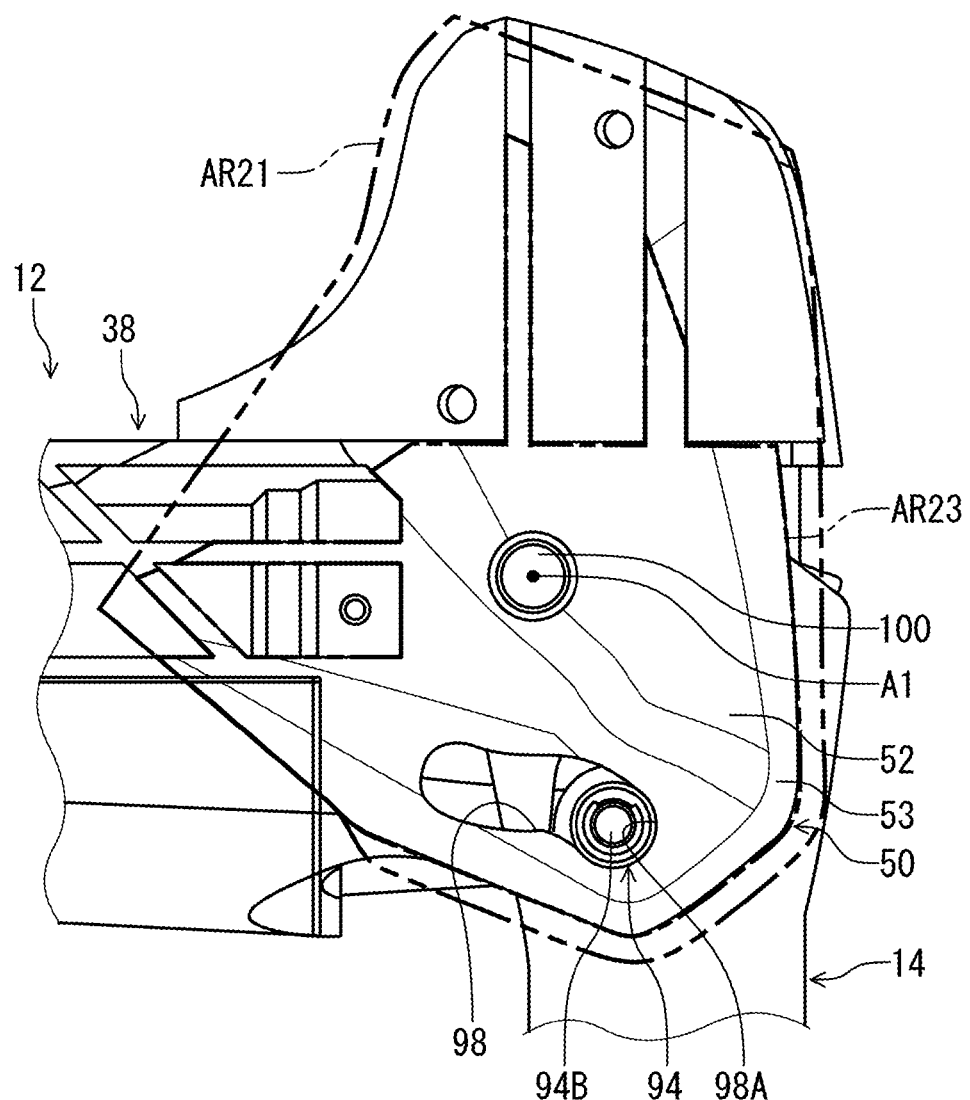
FIG. 15 is another partial enlarged side elevational view of the operating device illustrated in FIG. 1, with the grip cover omitted.

As seen in FIG. 15, the second additional positioning portion 50 has a second additional area AR23 as viewed along the pivot axis A1. The second additional area AR23 is indicated with a chain double-dashed line different from the chain double-dashed line of the second area AR21. The second area AR21 of the second positioning portion 32 at least partly overlaps with the second additional area AR23 of the second additional positioning portion 50 as viewed along the pivot axis A1. In this embodiment, the second area AR21 of the second positioning portion 32 partly overlaps with the second additional area AR23 of the second additional positioning portion 50 as viewed along the pivot axis A1. However, the second area AR21 of the second positioning portion 32 can entirely overlap with the second additional area AR23 of the second additional positioning portion 50 as viewed along the pivot axis A1.

Figure 16:
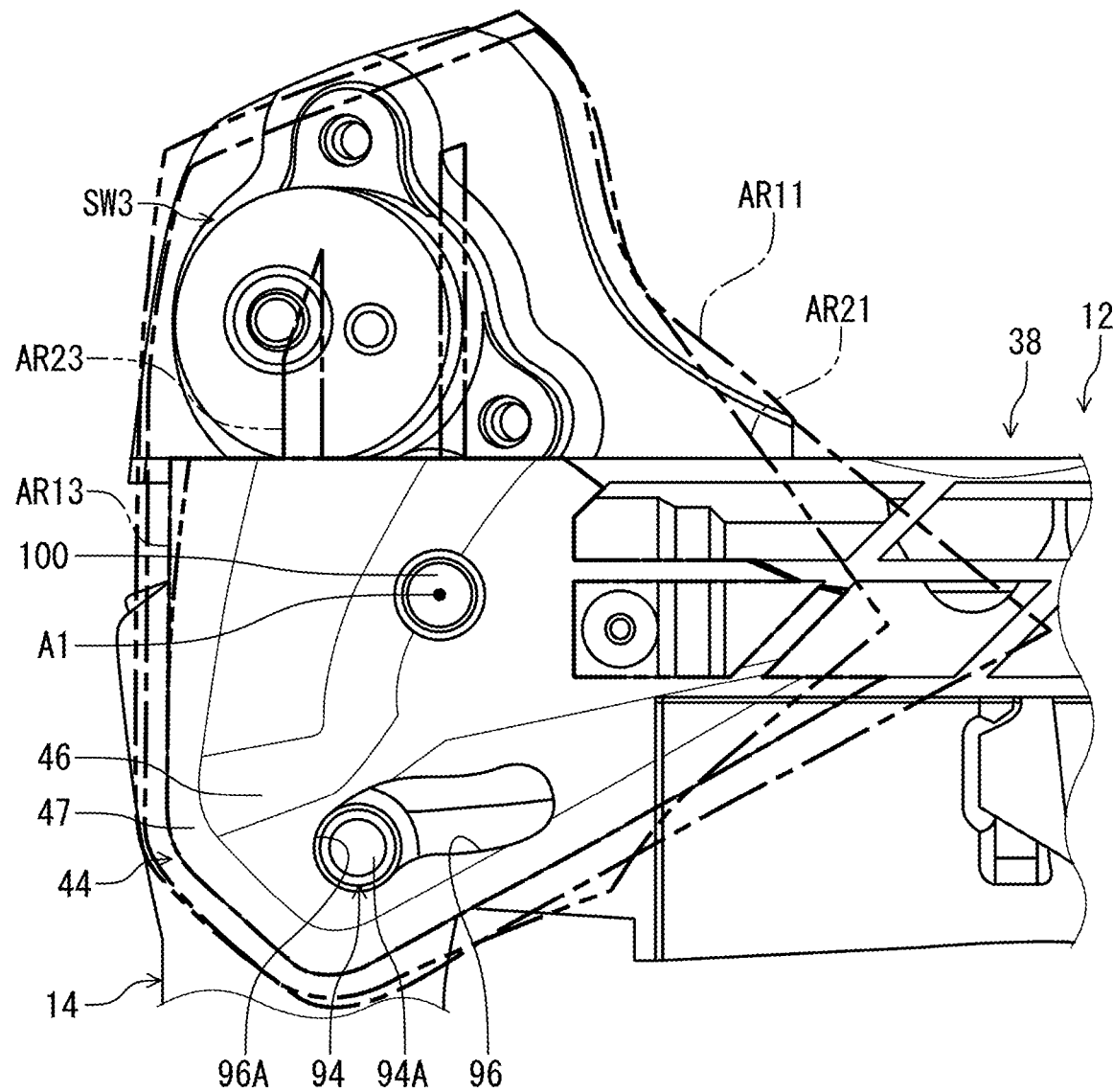
FIG. 16 is another partial enlarged side elevational view of the operating device illustrated in FIG. 1, with the grip cover omitted.

As seen in FIG. 16, the first area AR11 at least partly overlaps with the first additional area AR13, the second area AR21, and the second additional area AR23 as viewed along the pivot axis A1. In this embodiment, the first area AR11 partly overlaps with the first additional area AR13, the second area AR21, and the second additional area AR23 as viewed along the pivot axis A1. However, the first area AR11 can entirely overlap with the first additional area AR13, the second area AR21, and the second additional area AR23 as viewed along the pivot axis A1.

Figure 17:
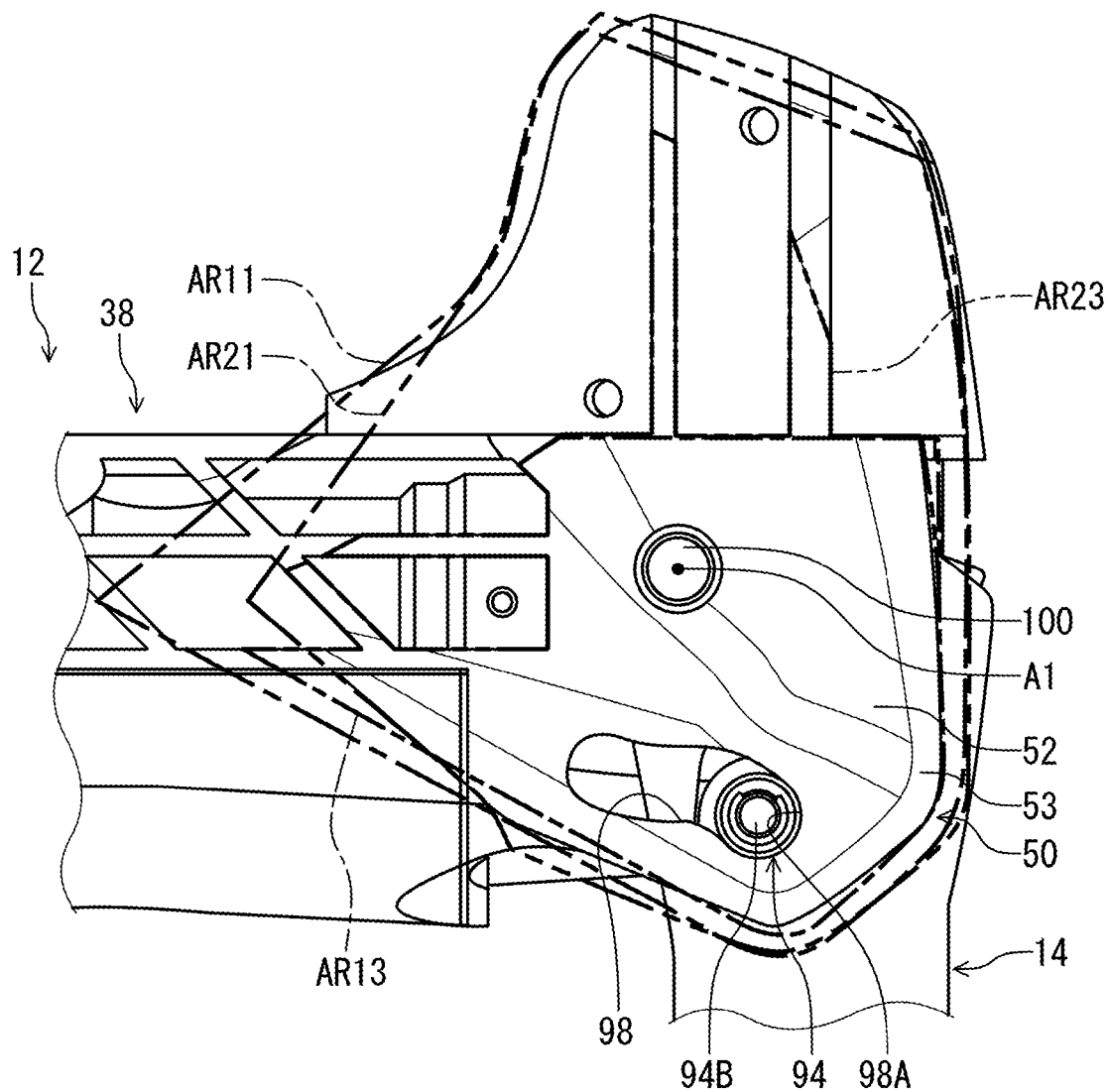
FIG. 17 is another partial enlarged side elevational view of the operating device illustrated in FIG. 1, with the grip cover omitted.

As seen in FIG. 17, the second area AR21 at least partly overlaps with the first area AR11, the first additional area AR13, and the second additional area AR23 as viewed along the pivot axis A1. In this embodiment, the second area AR21 partly overlaps with the first area AR11, the first additional area AR13, and the second additional area AR23 as viewed along the pivot axis A1. However, the second area AR21 can entirely overlap with the first area AR11, the first additional area AR13, and the second additional area AR23 as viewed along the pivot axis A1.

As seen in FIG. 12, the operating device 10 comprises a mounting member 64. The mounting member 64 is configured to couple the base member 12 to the handlebar FIB. In this embodiment, the mounting member 64 is attached to the base body 38 of the base member 12. The mounting member 64 includes a clamp band 66 and a tightening structure 68. The tightening structure 68 is coupled to the clamp band 66 to tighten the clamp band 66.

Figure 18:
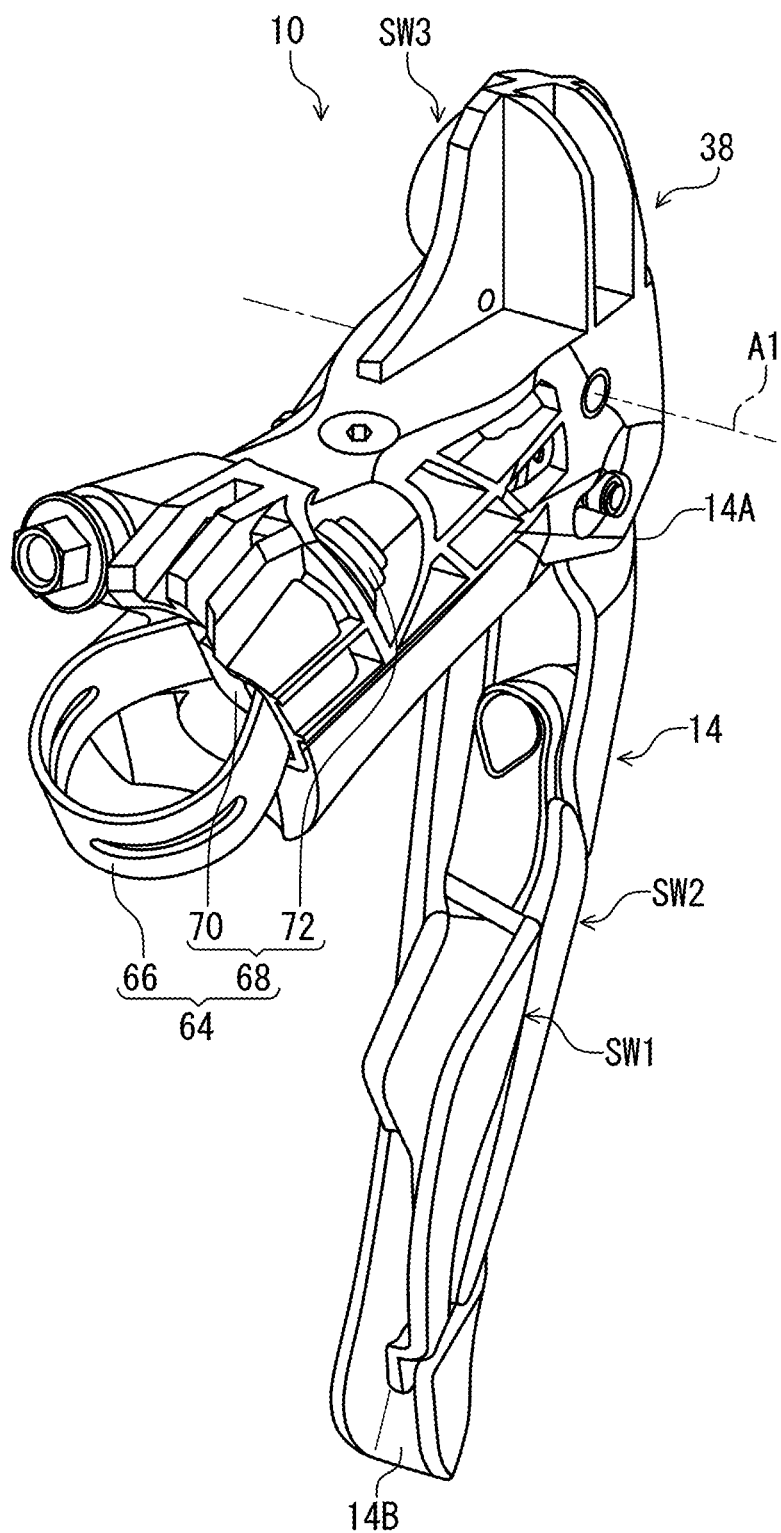
FIG. 18 is another perspective view of the operating device illustrated in FIG. 1, with the grip cover omitted.

As seen in FIG. 18, the tightening structure 68 includes a clamp bolt 70 and a clamp nut 72. The clamp bolt 70 is coupled to the clamp band 66. The clamp nut 72 is threadedly engaged with the clamp bolt 70.

Figure 9:
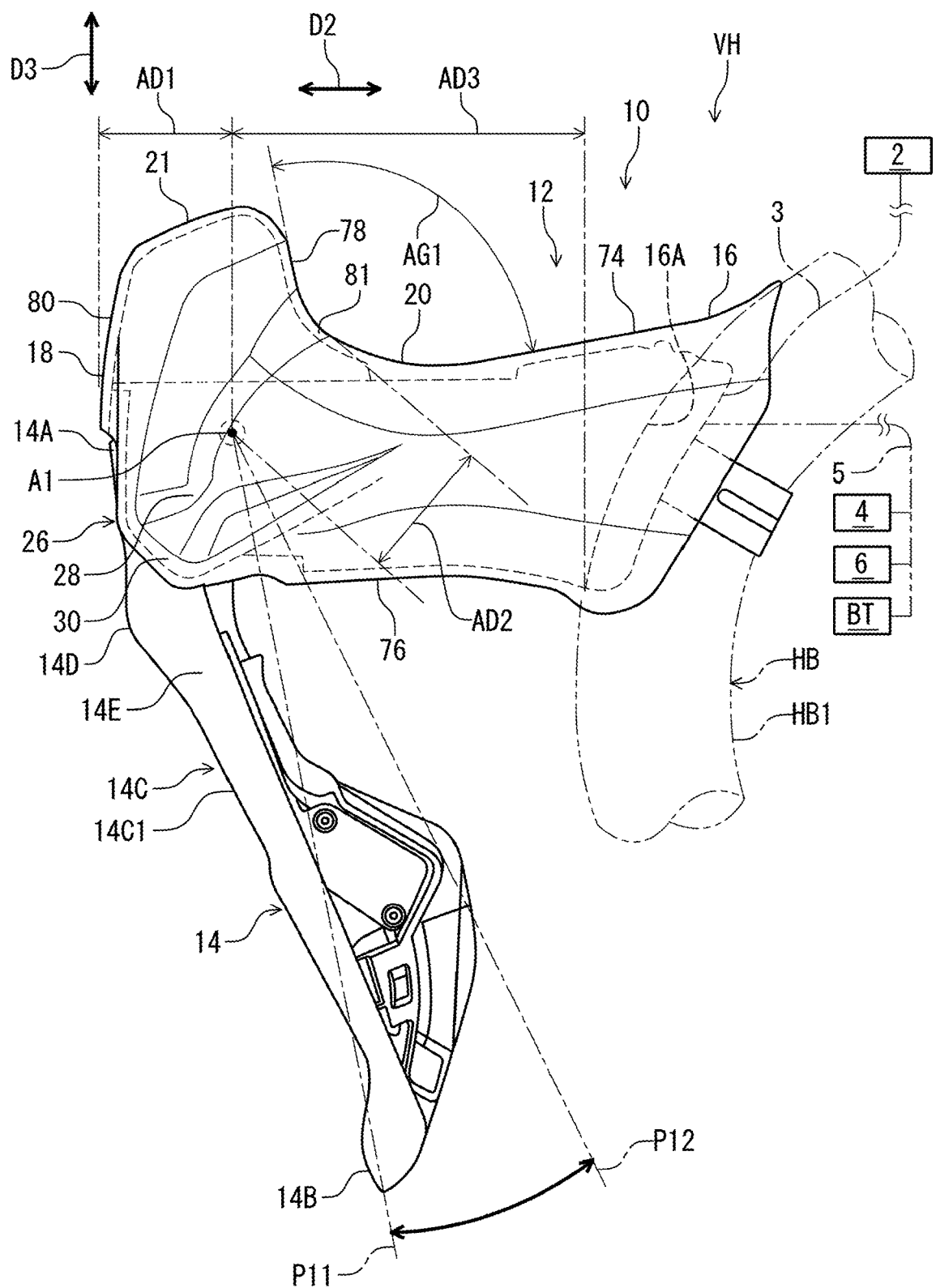
FIG. 9 is another side elevational view of the operating device illustrated in FIG. 1.

As seen in FIG. 9, the base member 12 includes a reference surface 74. The reference surface 74 is configured to face upwardly in a mounting state where the first end portion 16 is coupled to the handlebar HB. The pommel portion 21 extends upwardly from the second end portion 18 in the mounting state. The pommel portion 21 is at least partly provided above the reference surface 74 in the mounting state. In this embodiment, the pommel portion 21 is partly provided above the reference surface 74 in the mounting state. However, the pommel portion 21 can be entirely provided above the reference surface 74 in the mounting surface.

The base member 12 includes a reverse surface 76. The reverse surface 76 is provided on a reverse side of the reference surface 74. The first positioning portion 26 is provided between the pommel portion 21 and the reverse surface 76 as viewed along the pivot axis A1. The reverse surface 76 is provided below the reference surface 74 in the mounting state.

The pommel portion 21 includes a first surface 78 and a second surface 80 provided farther from the first end portion 16 than the first surface 78. The base member 12 includes a curved surface 81 provided between the first surface 78 and the reference surface 74. A first angle AG1 is defined between the first surface 78 and the reference surface 74 and is equal to or smaller than 110 degrees. The first angle AG1 is equal to or smaller than 100 degrees. The first angle AG1 is equal to or larger than 70 degrees. The first angle AG1 is equal to or larger than 80 degrees. In this embodiment, the first angle AG1 is 92 degrees. However, the first angle AG1 is not limited to this embodiment and the above ranges.

A first axis distance AD1 is defined between the pivot axis A1 and the second end portion 18 in the longitudinal direction D2. The first axis distance AD1 is a maximum distance between the pivot axis A1 and the second end portion 18 in the longitudinal direction D2. The first axis distance AD1 ranges from 20 mm to 25 mm. In this embodiment, the first axis distance AD1 is 22.9 mm. However, the first axis distance AD1 is not limited to this embodiment and the above range.

A second axis distance AD2 is defined between the pivot axis A1 and the curved surface 81. The second axis distance AD2 is a minimum distance between the pivot axis A1 and the curved surface 81. The second axis distance AD2 ranges from 20 mm to 28 mm. In this embodiment, the second axis distance AD2 is 24.4 mm. However, the second axis distance AD2 is not limited to this embodiment and the above range.

A third axis distance AD3 is defined between the pivot axis A1 and the handlebar contact surface 16A of the first end portion 16 in the longitudinal direction D2. The third axis distance AD3 is a minimum distance between the pivot axis A1 and the handlebar contact surface 16A of the first end portion 16 in the longitudinal direction D2. The third axis distance AD3 ranges from 57 mm to 69 mm. In this embodiment, the third axis distance AD3 is 63 mm. However, the third axis distance AD3 is not limited to this embodiment and the above range. The third axis distance AD3 is larger than the first axis distance AD1 and the second axis distance AD2. However, the third axis distance AD3 can be equal to or smaller than at least one of the first axis distance AD1 and the second axis distance AD2.

As seen in FIG. 12, the operating device 10 further comprises a piston 82. The base member 12 includes a cylinder bore 83. The cylinder bore 83 has a cylinder center axis A2. The cylinder bore 83 extends along the cylinder center axis A2. The piston 82 is movably provided in the cylinder bore 83. The piston 82 is operatively coupled to the operating member 14 to move relative to the base member 12 in response to a pivotal movement of the operating member 14.

In this embodiment, the piston 82 is coupled to the operating member 14 to be pushed in response to the pivotal movement of the operating member 14 from the rest position P11 toward the operated position P12. However, the piston 82 can be coupled to the operating member 14 to be pulled in response to the pivotal movement of the operating member 14 from the rest position P11 toward the operated position P12.

The piston 82 is movable relative to the base member 12 between an initial position P21 and an actuated position P22. The piston 82 is in the initial position P21 in the rest state where the operating member 14 is in the rest position P11. The piston 82 is in the actuated position P22 in the operated state where the operating member 14 is in the operated position P12.

The operating device 10 comprises a first seal member 84 and a second seal member 86. The first seal member 84 and the second seal member 86 are attached to the piston 82. The piston 82, the first seal member 84, and the cylinder bore 83 define a hydraulic chamber 88.

The operating device 10 comprises a first biasing member 90, a piston rod 92, and a coupling rod 94. The first biasing member 90 is provided in the hydraulic chamber 88 to bias the piston 82 toward the initial position P21. The piston rod 92 couples the piston 82 to the coupling rod 94. The piston rod 92 is pivotally coupled to the piston 82 and is pivotally coupled to the coupling rod 94.

As seen in FIGS. 14 and 15, the base member 12 includes a first guide groove 96 and a second guide groove 98. As seen in FIG. 13, the coupling rod 94 includes a first end 94A and a second end 94B. The coupling rod 94 extends between the first end 94A and the second end 94B. The first end 94A of the coupling rod 94 is movably provided in the first guide groove 96. The second end 94B of the coupling rod 94 is movably provided in the second guide groove 98.

The operating device 10 comprises a pivot pin 100. The base body 38 of the base member 12 includes pivot holes 101A and 101B. The pivot pin 100 defines the pivot axis A1. Both ends of the pivot pin 100 are provided in the pivot holes 101A and 101B. The pivot pin 100 pivotally couples the operating member 14 to the base member 12 about the pivot axis A1.

As seen in FIG. 12, the operating device 10 further comprises an adjustment structure 102 configured to adjust the rest position P11 of the operating member 14 with respect to the base member 12. The adjustment structure 102 operatively couples the operating member 14 to the piston 82. The adjustment structure 102 includes an intermediate member 104 and an adjustment screw 106.

As seen in FIG. 13, the intermediate member 104 is pivotally coupled to the operating member 14 about the pivot axis A1. As seen in FIG. 12, the intermediate member 104 is in contact with the coupling rod 94. The adjustment screw 106 is attached to the operating member 14 to change a relative position between the intermediate member 104 and the operating member 14. The adjustment screw 106 is in contact with the intermediate member 104. The operating member 14 includes a threaded hole 108. The adjustment screw 106 is threadedly engaged in the threaded hole 108 of the operating member 14. The adjustment screw 106 includes a tool engagement hole 106A configured to be engaged with a tool such as a hexagonal wrench.

Figure 19:
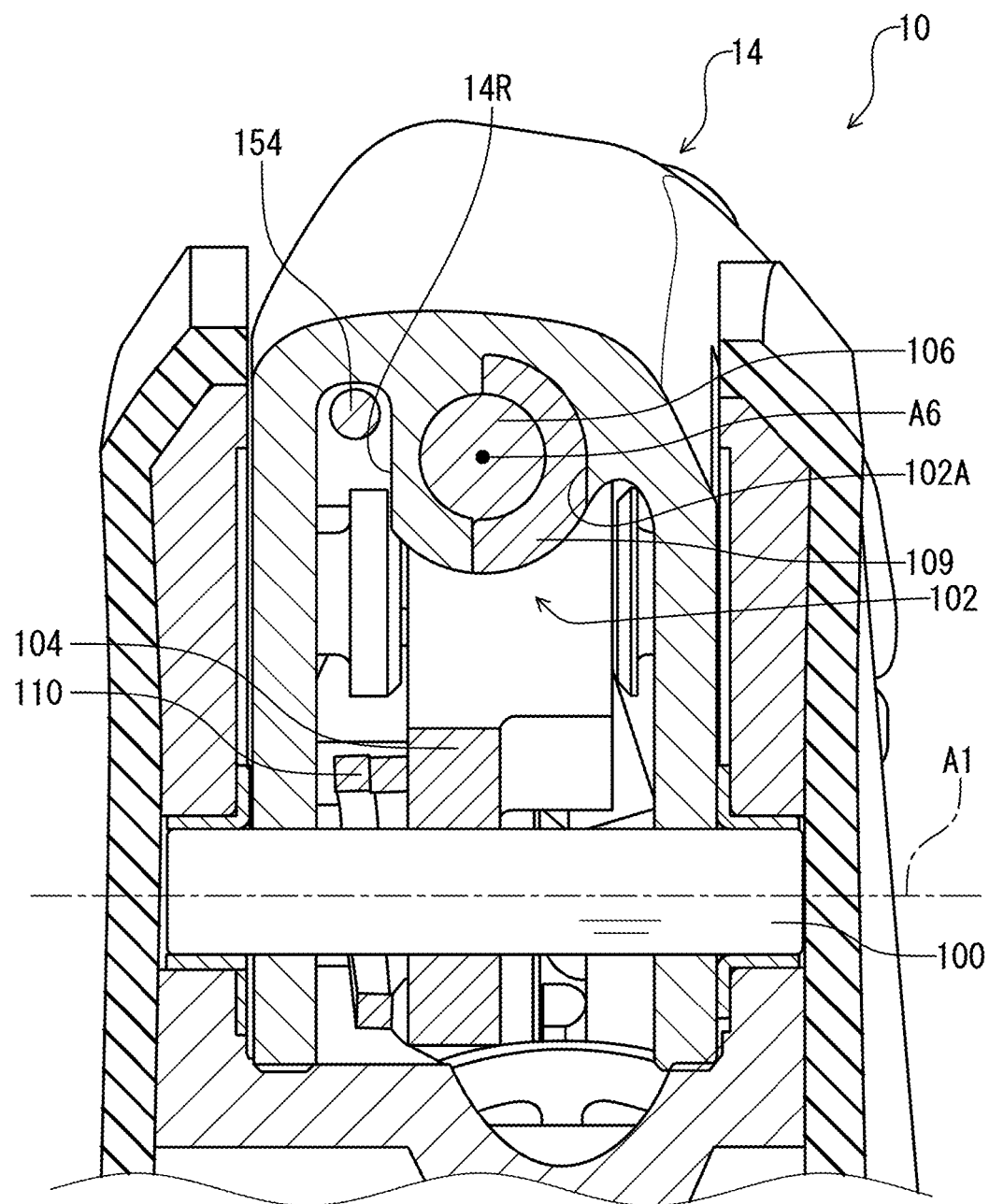
FIG. 19 is a cross-sectional view of the operating device taken along line XIX-XIX of FIG. 12.

As seen in FIG. 19, the adjustment screw 106 has a center axis A6. The adjustment structure 102 includes a half stopper 109. The half stopper 109 is attached to the operating member 14 to prevent the adjustment screw 106 from being unintentionally removed from the operating member 14. The operating member 14 includes a groove 102A. The half stopper 109 is provided in the groove 102A. The operating member 14 includes a cable recess 14R. The cable recess 14R is provided on an opposite side of the half stopper 109 relative to the adjustment screw 106. The control cable 154 (described later) extends through the cable recess 14R.

The operating device 10 includes a second biasing member 110. The second biasing member 110 is attached to the pivot pin 100 to bias the intermediate member 104 toward the adjustment screw 106 relative to the operating member 14. The pivot pin 100 supports the second biasing member 110 relative to the base member 12.

As seen in FIG. 12, the operating device 10 includes a third biasing member 111. The third biasing member 111 is attached to the base member 12 to bias the coupling rod 94 toward the intermediate member 104 relative to the base member 12. The pivot pin 100 supports the third biasing member 111 relative to the base member 12.

As seen in FIG. 14, the first end 94A of the coupling rod 94 is in contact with a first groove end 96A of the first guide groove 96 in a rest state where the piston 82 is in the initial position P21 (FIG. 12). The first biasing member 90 and the third biasing member 111 press the first end 94A of the coupling rod 94 against the first groove end 96A of the first guide groove 96 in the rest state where the piston 82 is in the initial position P21 (FIG. 12).

As seen in FIG. 15, the second end 94B of the coupling rod 94 is in contact with a second groove end 98A of the second guide groove 98 in the rest state where the piston 82 is in the initial position P21 (FIG. 12). The first biasing member 90 and the third biasing member 111 press the second end 94B of the coupling rod 94 against the second groove end 98A of the second guide groove 98 in the rest state where the piston 82 is in the initial position P21 (FIG. 12).

As seen in FIG. 12, the first biasing member 90 applies a first biasing force BF1 to the piston 82. The second biasing member 110 (FIG. 19) applies a second biasing force BF2 to the intermediate member 104. The third biasing member 111 applies a third biasing force BF3 to the coupling rod 94. The first biasing force BF1 is larger than the third biasing force BF3. However, the first biasing force BF1 can be equal to or smaller than the third biasing force BF3.

The base member 12 includes a reservoir bore 112. The reservoir bore 112 has a reservoir center axis A3. The reservoir bore 112 extends along the reservoir center axis A3. In this embodiment, the cylinder center axis A2 extends along the reservoir center axis A3. The cylinder center axis A2 is parallel to the reservoir center axis A3. However, the cylinder center axis A2 can be non-parallel to the reservoir center axis A3.

The operating device 10 comprises a diaphragm 114, a lid 116, a stopper 118, and a reservoir plug 120. The diaphragm 114 is provided in the reservoir bore 112 to close an end opening 112A of the reservoir bore 112. The reservoir bore 112 and the diaphragm 114 define a reservoir chamber 122. The lid 116 is attached to the base member 12 to hold an end of the diaphragm 114 between the lid 116 and the base member 12. The stopper 118 is secured to the base member 12 to prevent the lid 116 from being unintentionally removed from the base member 12. The base body 38 of the base member 12 includes a threaded hole 124 connected to the reservoir bore 112. The reservoir plug 120 is threadedly engaged in the threaded hole 124.

The base member 12 includes a plurality of connecting holes 126 and 128 connecting the reservoir bore 112 to the cylinder bore 83. The hydraulic chamber 88 is in fluid communication with the reservoir chamber 122 via the connecting hole 128 in a state where the piston 82 is in the initial position P21. The first seal member 84 blocks the fluid communication between the connecting hole 126 and the hydraulic chamber 88 after the first seal member 84 moves beyond the connecting hole 128 when the piston 82 moves from the initial position P21 toward the actuated position P22.

As seen in FIG. 12, the pivot axis A1 is provided above the cylinder center axis A2 as viewed along the pivot axis A1 in a mounting state where the base member 12 is mounted to the handlebar HB. The pivot axis A1 is provided above the reservoir center axis A3 as viewed along the pivot axis A1 in the mounting state. However, the pivot axis A1 can be provided below the cylinder center axis A2 or in a position which is the same as the position of the cylinder center axis A2 as viewed along the pivot axis A1 in the mounting state. The pivot axis A1 can be provided below the reservoir center axis A3 or in a position which is the same as the position of the reservoir center axis A3 as viewed along the pivot axis A1 in the mounting state.

Figure 20:
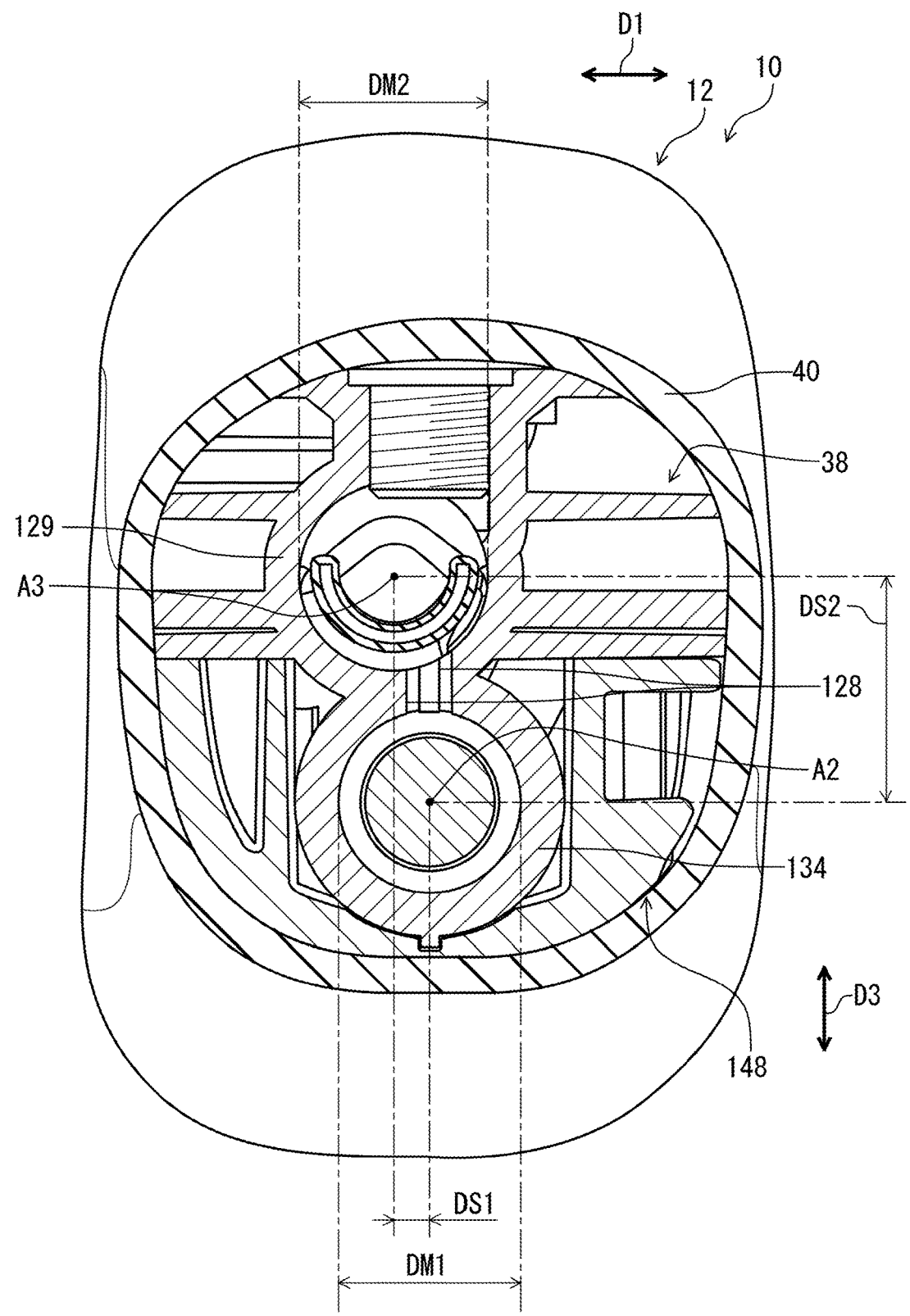
FIG. 20 is a cross-sectional view of the operating device taken along line XX-XX of FIG. 12.

As seen in FIG. 20, the cylinder center axis A2 is offset from the reservoir center axis A3 in the pivot axis direction D1 parallel to the pivot axis A1 (FIG. 12). The cylinder center axis A2 is offset from the reservoir center axis A3 in the perpendicular direction D3 perpendicular to both the pivot axis A1 (FIG. 12) and the cylinder center axis A2. The pivot axis A1 (FIG. 12) is provided above the cylinder center axis A2 and above the reservoir center axis A3 as viewed along the cylinder center axis A2 in the mounting state where the base member 12 is mounted to the handlebar HB. The reservoir center axis A3 is provided above the cylinder center axis A2 as viewed along the cylinder center axis A2 in the mounting state where the base member 12 is mounted to the handlebar HB.

The reservoir bore 112 has a cylindrical shape extending along the reservoir center axis A3. In this embodiment, the base member 12 includes a cylinder 129 having the reservoir bore 112. The reservoir bore 112 has a round cross-section taken along a plane perpendicular to the reservoir center axis A3. However, the cross-sectional shape of the reservoir bore 112 is not limited to this embodiment. The cross-section of the reservoir bore 112 can have other shapes such as a polygonal shape or an elliptical shape. In other words, the cylindrical shape can indicate not only a shape having the round cross-section but also a shape having other cross-section e.g., a polygonal cross-section, an elliptical cross-section and so on as long as the reservoir bore 112 extends along the reservoir center axis A3, in this description.

The cylinder bore 83 has a cylinder maximum inner diameter DM1. The reservoir bore 112 has a reservoir maximum inner diameter DM2. The reservoir maximum inner diameter DM2 is larger than the cylinder maximum inner diameter DM1. A first offset distance DS1 is defined between the cylinder center axis A2 and the reservoir center axis A3 in the pivot axis direction D1. The first offset distance DS1 is smaller than at least one of the cylinder maximum inner diameter DM1 and the reservoir maximum inner diameter DM2. The first offset distance DS1 is smaller than at least one of a half of the cylinder maximum inner diameter DM1 and a half of the reservoir maximum inner diameter DM2.

In this embodiment, the first offset distance DS1 is smaller than both the cylinder maximum inner diameter DM1 and the reservoir maximum inner diameter DM2. The first offset distance DS1 is smaller than both the half of the cylinder maximum inner diameter DM1 and the half of the reservoir maximum inner diameter DM2. However, the reservoir maximum inner diameter DM2 can be equal to or smaller than the cylinder maximum inner diameter DM1. The first offset distance DS1 can be smaller than the cylinder maximum inner diameter DM1 or the reservoir maximum inner diameter DM2. The first offset distance DS1 can be smaller than the half of the cylinder maximum inner diameter DM1 or the half of the reservoir maximum inner diameter DM2. The first offset distance D Si can be equal to or larger than at least one of the cylinder maximum inner diameter DM1 and the reservoir maximum inner diameter DM2. The first offset distance DS1 can be equal to or larger than at least one of a half of the cylinder maximum inner diameter DM1 and a half of the reservoir maximum inner diameter DM2.

A second offset distance DS2 is defined between the cylinder center axis A2 and the reservoir center axis A3 in the perpendicular direction D3 perpendicular to both the pivot axis A1 and the cylinder center axis A2. The first offset distance DS1 is smaller the second offset distance DS2. The second offset distance DS2 is larger than at least one of a half of the cylinder maximum inner diameter DM1 and a half of the reservoir maximum inner diameter DM2. The second offset distance DS2 is larger than at least one of the cylinder maximum inner diameter DM1 and the reservoir maximum inner diameter DM2.

In this embodiment, the second offset distance DS2 is larger than both the half of the cylinder maximum inner diameter DM1 and the half of the reservoir maximum inner diameter DM2. The second offset distance DS2 is larger than both the cylinder maximum inner diameter DM1 and the reservoir maximum inner diameter DM2. However, the first offset distance DS1 can be equal to or larger than the second offset distance DS2. The second offset distance DS2 can be larger than the half of the cylinder maximum inner diameter DM1 or the half of the reservoir maximum inner diameter DM2. The second offset distance DS2 can be larger than the cylinder maximum inner diameter DM1 or the reservoir maximum inner diameter DM2. The second offset distance DS2 can be equal to or smaller than at least one of the half of the cylinder maximum inner diameter DM1 and the half of the reservoir maximum inner diameter DM2. The second offset distance DS2 can be equal to or smaller than at least one of the cylinder maximum inner diameter DM1 and the reservoir maximum inner diameter DM2.

For example, each of the cylinder maximum inner diameter DM1 and the reservoir maximum inner diameter DM2 ranges from 5 mm to 15 mm. In this embodiment, the cylinder maximum inner diameter DM1 is 10 mm. The reservoir maximum inner diameter DM2 is 10.4 mm. However, each of the cylinder maximum inner diameter DM1 and the reservoir maximum inner diameter DM2 is not limited to this embodiment and the above range.

For example, the first offset distance DS1 ranges from 1 mm to 15 mm. The first offset distance DS1 preferably ranges from 1 mm to 5 mm. The second offset distance DS2 ranges from 3 mm to 25 mm. The second offset distance DS2 preferably ranges from 6 m to 18 mm. In this embodiment, the first offset distance DS1 is 2 mm, and the second offset distance DS2 is 12.6 mm. However, each of the first offset distance DS1 and the second offset distance DS2 is not this embodiment and the above ranges.

Figure 21:
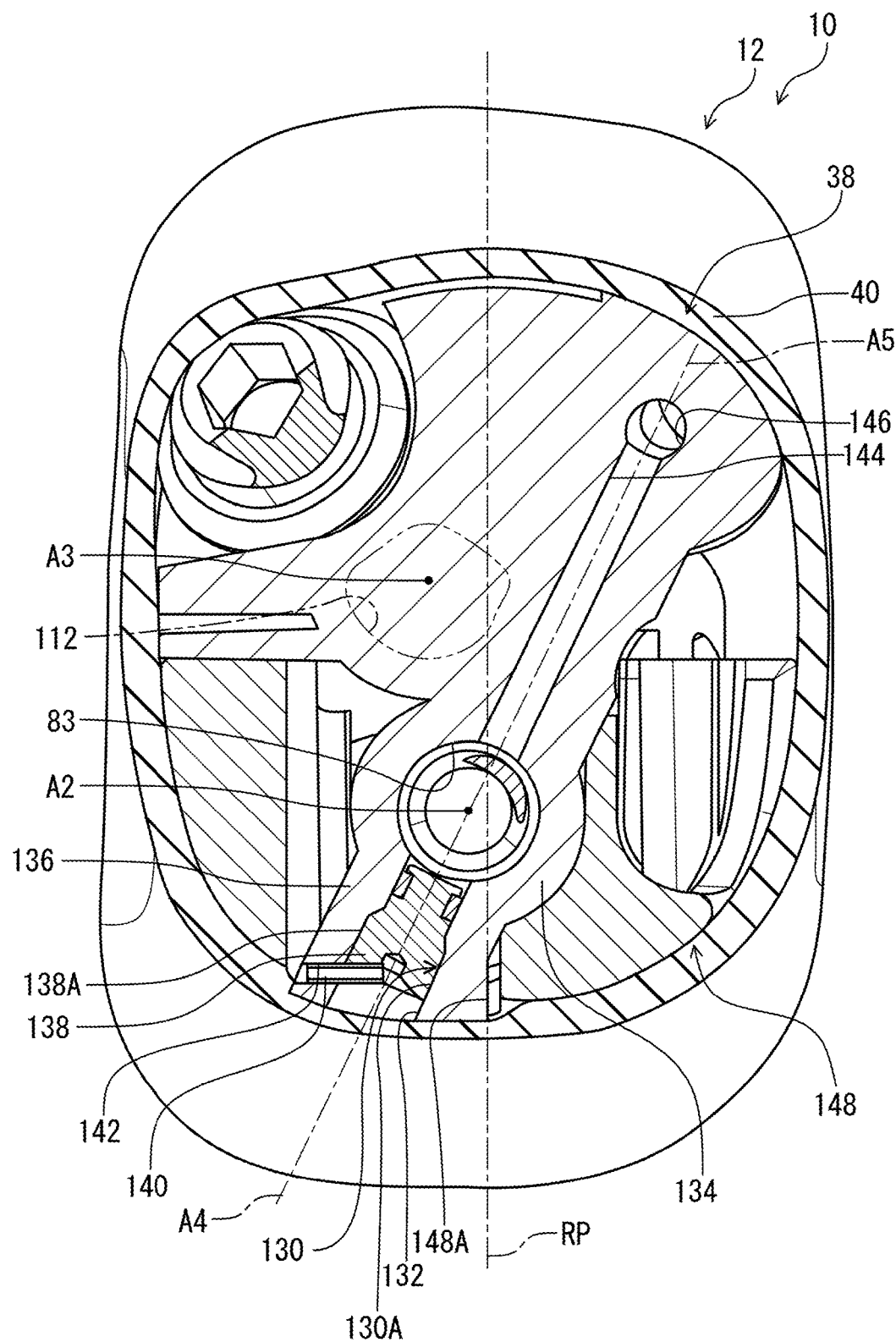
FIG. 21 is a cross-sectional view of the operating device taken along line XXI-XXI of FIG. 12.

As seen in FIG. 21, the base member 12 includes a hole 130 extending from the cylinder bore 83 to an end opening 132. The end opening 132 is provided below the cylinder center axis A2 in a mounting state where the base member 12 is mounted to the handlebar HB. The hole 130 has a hole center axis A4 inclined relative to the reference plane RP perpendicular to the pivot axis A1 (FIG. 13) as viewed along the cylinder center axis A2. The hole center axis A4 intersects with the cylinder center axis A2. However, the hole center axis A4 can be offset from the cylinder center axis A2. The base body 38 includes a tubular part 134 and an additional tubular part 136. The tubular part 134 includes the cylinder bore 83. The additional tubular part 136 includes the hole 130 and the end opening 132. The additional tubular part 136 extends from the tubular part 134 along the hole center axis A4.

The operating device 10 further comprises a plug 138 provided in the hole 130 to close the hole 130. The plug 138 is provided between the cylinder bore 83 and the end opening 132. The plug 138 is provided below the cylinder center axis A2 in the mounting state. The hole 130 includes a threaded hole 130A. The plug 138 includes an externally threaded part 138A threadedly engaged in the threaded hole 130A. The operating device 10 further comprises a stop pin 140 attached to the base member 12. The plug 138 is provided between the cylinder bore 83 and the stop pin 140. The plug 138 is attached to the additional tubular part 136. The base member 12 includes an attachment hole 142. The stop pin 140 is provided in the attachment hole 142. The hole 130, the plug 138, and the stop pin 140 can be omitted from the operating device 10.

The base member 12 includes an additional hole 144 extending from the cylinder bore 83 toward an opposite side of the hole 130. The additional hole 144 has an additional-hole center axis A5 coaxial with the hole center axis A4. The base member 12 includes an output passageway 146. The output passageway 146 is configured to be in fluid communication with the hydraulic operated device 2. The additional hole 144 connects the cylinder bore 83 to the output passageway 146. The additional hole 144 extends from the cylinder bore 83 to avoid the reservoir bore 112 as viewed along the cylinder center axis A2. However, the structure of the additional hole 144 is not limited to this embodiment. The additional hole 144 can be omitted from the base member 12.

Figure 22:
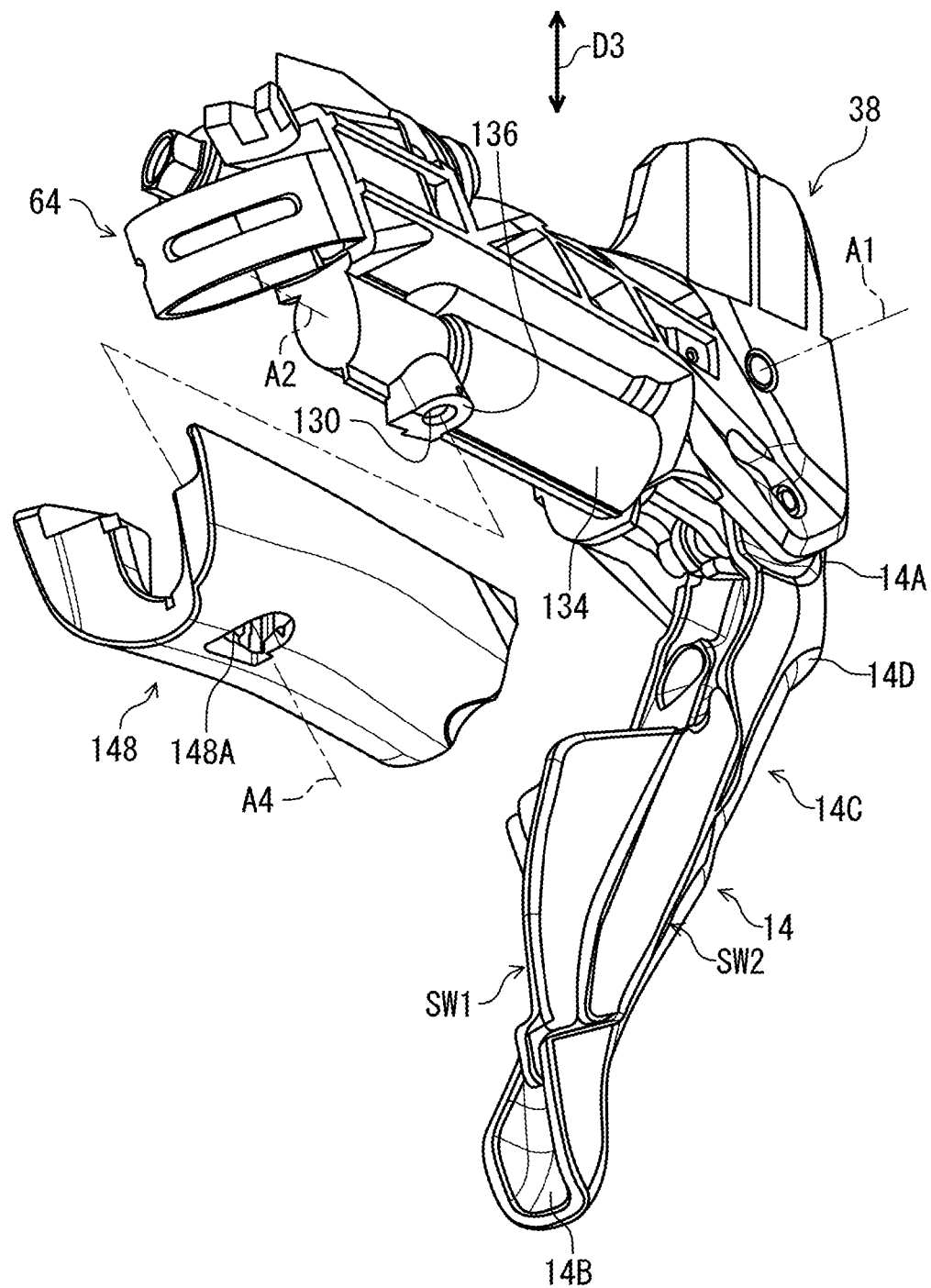
FIG. 22 is an exploded perspective view of the operating device illustrated in FIG. 1, with the grip cover omitted.

As seen in FIG. 22, the base member 12 includes an additional member 148 attached to the base body 38 to at least partly cover the tubular part 134 of the base body 38. The additional member 148 includes an opening 148A. The additional tubular part 136 is provided in the opening 148A in a state where the additional member 148 is attached to the base body 38. The additional member 148 is a separate member from the base body 38 and the grip cover 40. However, the additional member 148 can be integrally provided with one of the base body 38 and the grip cover 40 as a one-piece unitary member. In this embodiment, the additional member 148 is attached to the base body 38 with an adhesive. However, the additional member 148 can be attached to the base body 38 with another attachment structure such as a screw. An exposure percentage of an outer circumferential surface of the tubular part 134 to an entire outer circumferential surface of a completely tubular part ranges from 80% to 95%. In this embodiment, the exposure percentage is 92%. However, the exposure percentage is not limited to this embodiment and the above range.

Figure 23:
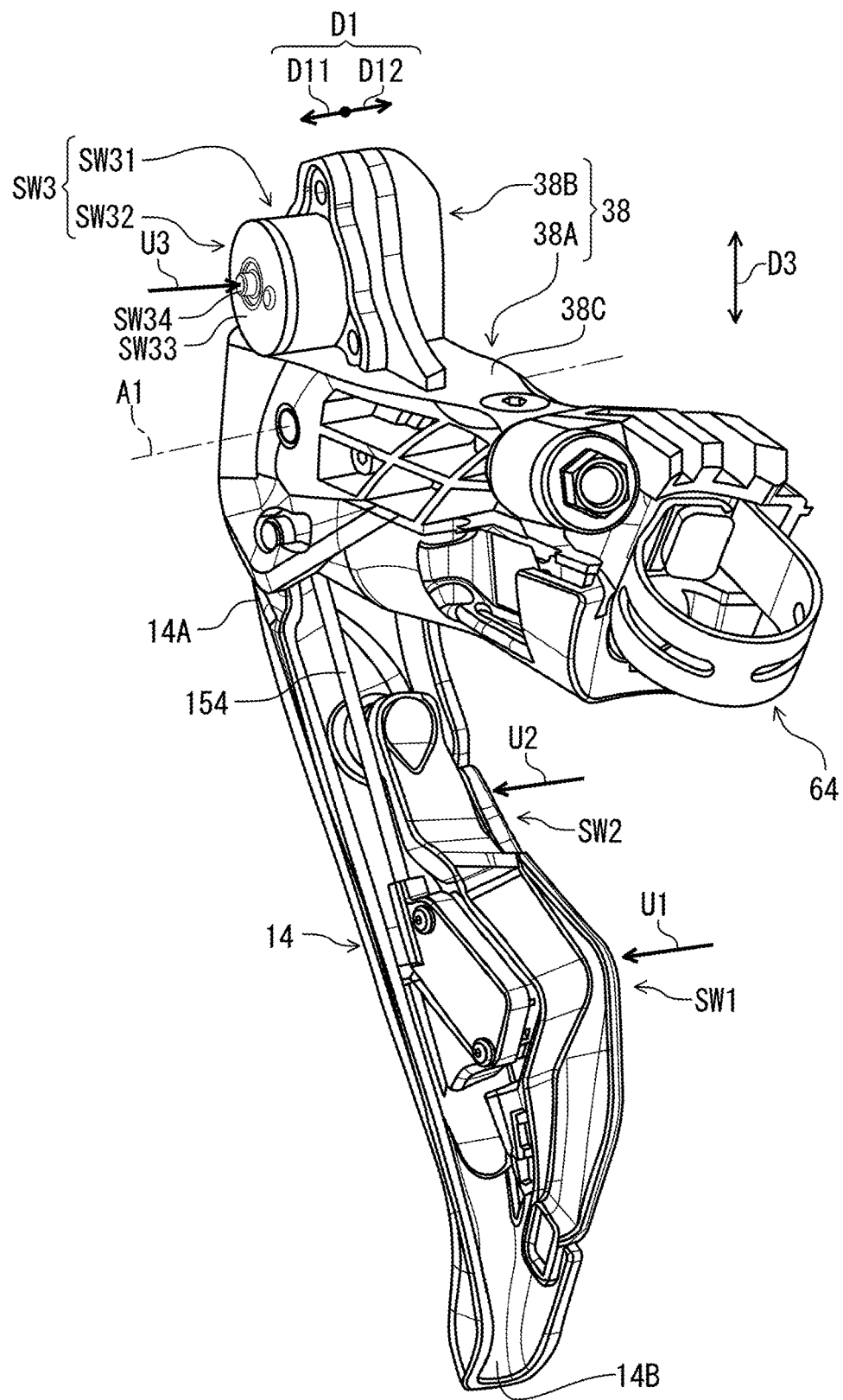
FIG. 23 is another perspective view of the operating device illustrated in FIG. 1, with the grip cover omitted.

As seen in FIG. 23, the operating device 10 further comprises an electrical switch SW1, SW2, and/or SW3 configured to receive a user input. The electrical switch SW1, SW2, and/or SW3 is disposed on at least one of the base member 12 and the operating member 14. In this embodiment, the electrical switch SW1 is provided on the operating member 14. The electrical switch SW2 is provided on the operating member 14. The electrical switch SW3 is provided on the base member 12. Namely, the electrical switches SW1, SW2, and SW3 can be disposed on both the base member 12 and the operating member 14. However, the electrical switch can be disposed on only the base member 12 or only the operating member 14. The electrical switch can be disposed on other members of the operating device 10.

The electrical switch SW1 is configured to receive a user upshift input U1. The electrical switch SW2 is configured to receive a user downshift input U2. The electrical switch SW3 is configured to receive an additional user input U3 other than the user upshift input U1 and the user downshift input U2. However, the electrical switch SW3 can be configured to receive one of the user upshift input U1 and the user downshift input U2.

In this embodiment, the electrical switch SW3 is attached to the pommel portion 21. The base body 38 includes a base part 38A and a pommel frame 38B. The base part 38A includes an upper surface 38C. The upper surface 38C is provided above the pivot axis A1 in the mounting state where the base body 38 is mounted to the handlebar HB. The pommel frame 38B is provided on the upper surface 38C and extends from the upper surface 38C on an opposite side of the pivot axis A1. The electrical switch SW3 is secured to the pommel frame 38B. However, the position of the electrical switch SW3 is not limited to this embodiment.

The electrical switch SW3 includes a switch holder SW31 and a switch unit SW32. The switch holder SW31 is secured to the pommel frame 38B. The switch unit SW32 is secured to the switch holder SW31. The switch unit SW32 includes a base plate SW33 and a user operating portion SW34. The base plate SW33 is attached to the switch holder SW31. The user operating portion SW34 is movably attached to the base plate SW33 to receive the additional user input U3. The user operating portion SW34 faces in the first pivot axis direction D11.

Figure 24:
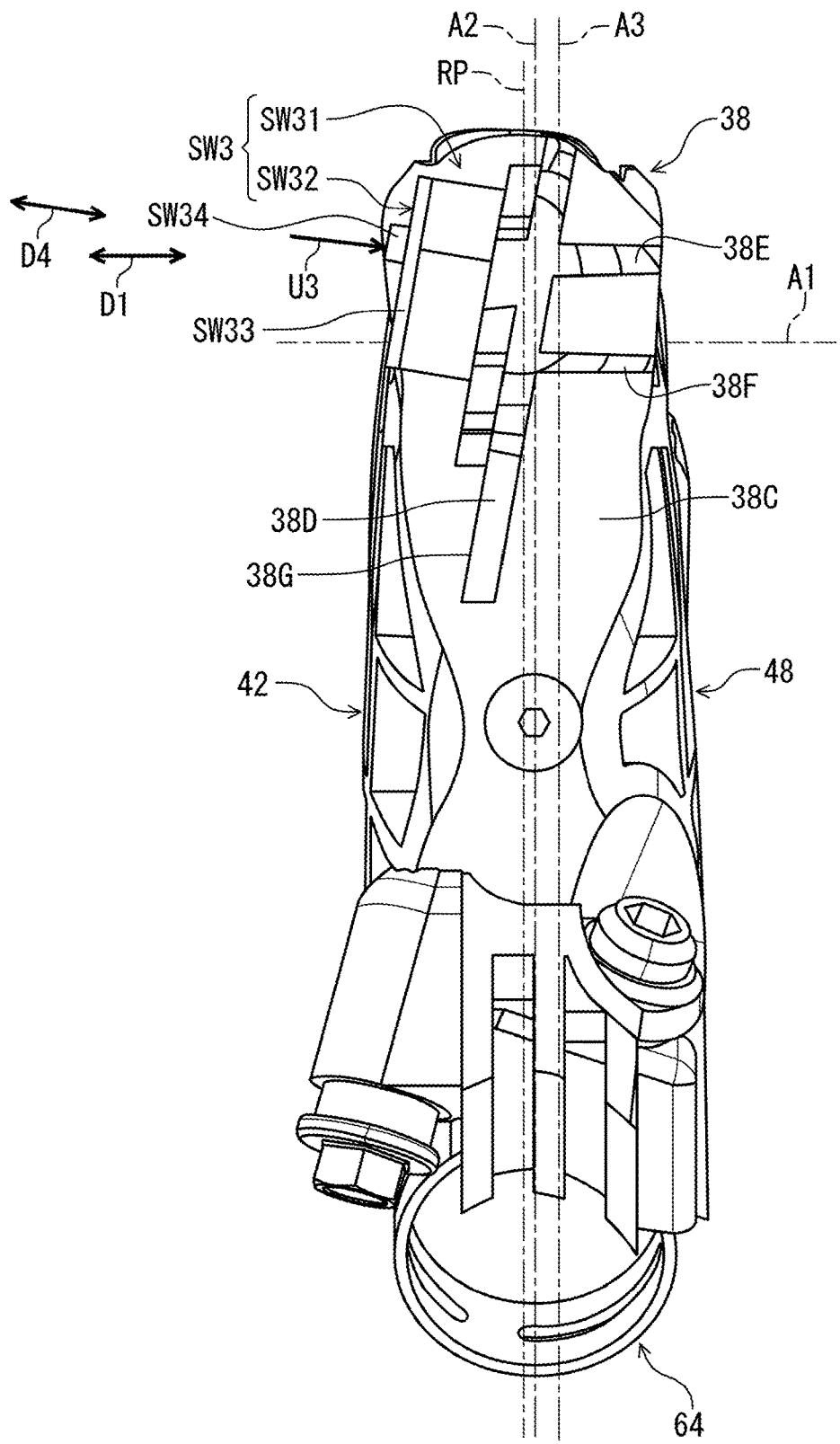
FIG. 24 is a top view of the operating device illustrated in FIG. 1, with the grip cover omitted.

As seen in FIG. 24, the electrical switch SW3 is offset from the reference plane RP in the pivot axis direction D1. Thus, the user can reliably operate the electrical switch SW3. Specifically, the user operating portion SW34 is provided closer to the first additional lateral surface 42 than to the second additional lateral surface 48 in the pivot axis direction D1. The user operating portion SW34 is movable relative to the switch holder SW31 in an operation direction D4. The operation direction D4 is non-perpendicular to the reference plane RP. The operation direction D4 is non-parallel to the reference plane RP. The operation direction D4 is inclined relative to the reference plane RP. The perpendicular direction D3 (FIG. 22) is defined perpendicular to both the pivot axis A1 and the cylinder center axis A2. The operation direction D4 is non-parallel to the cylinder center axis A2 as viewed in the perpendicular direction D3 (FIG. 22). The operation direction D4 is inclined relative to the cylinder center axis A2 as viewed in the perpendicular direction D3 (FIG. 22). However, the operation direction D4 can be perpendicular to the reference plane RP. The operation direction D4 can be parallel to the reference plane RP. The operation direction D4 can be perpendicular to the cylinder center axis A2 as viewed in the perpendicular direction D3 (FIG. 22). The operation direction D4 can be parallel to the cylinder center axis A2 as viewed in the perpendicular direction D3 (FIG. 22).

Figure 25:
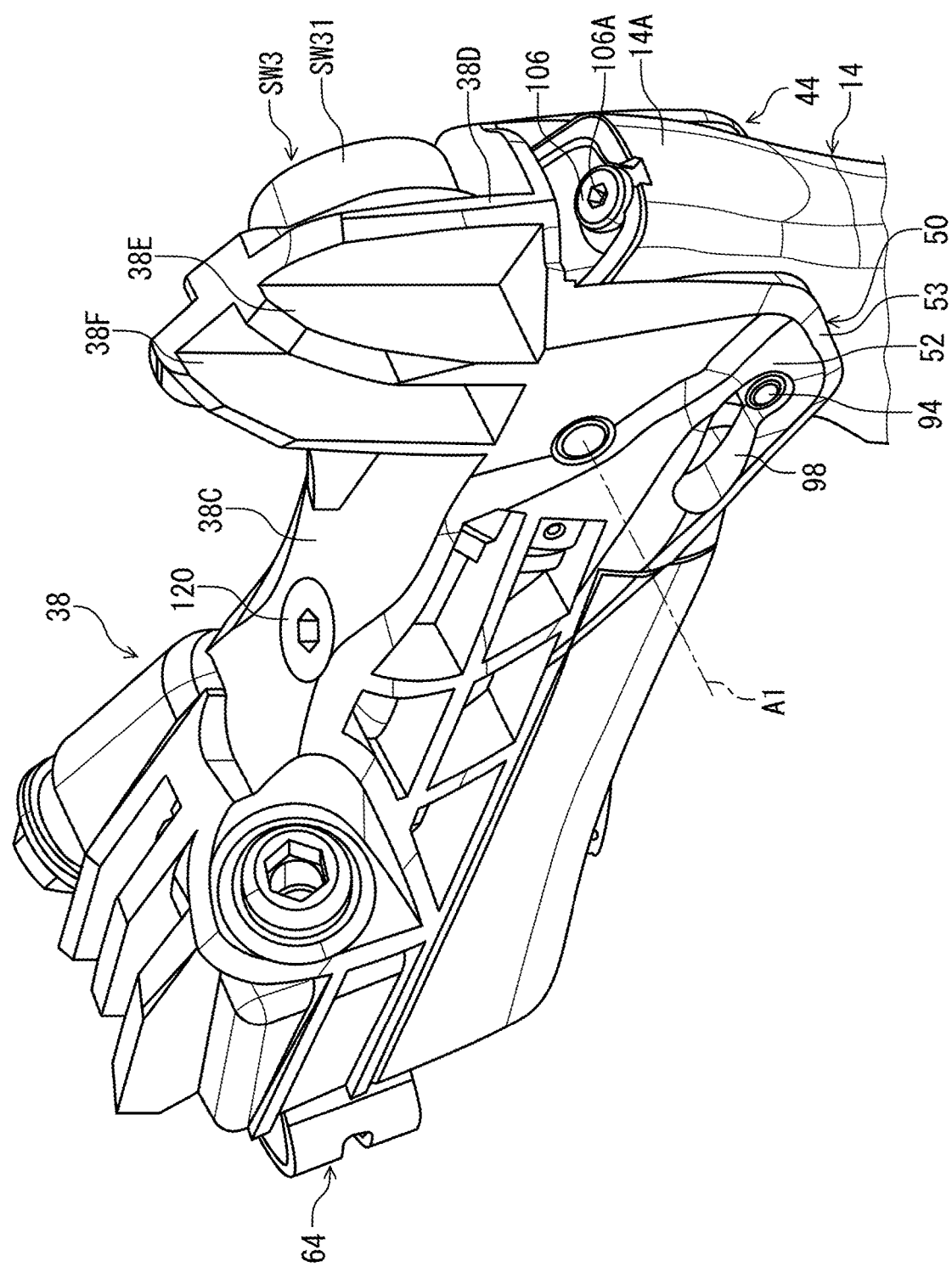
FIG. 25 is a partial perspective view of the operating device illustrated in FIG. 1, with the grip cover omitted.

As seen in FIG. 25, the pommel frame 38B includes a base frame 38D, a first rib 38E, and a second rib 38F. The base frame 38D is provided on the upper surface 38C of the base part 38A and extends from the upper surface 38C. The first rib 38E and the second rib 38F are provided on the upper surface 38C of the base part 38A and extend from the upper surface 38C. The first rib 38E is spaced apart from the second rib 38F.

Figure 26:
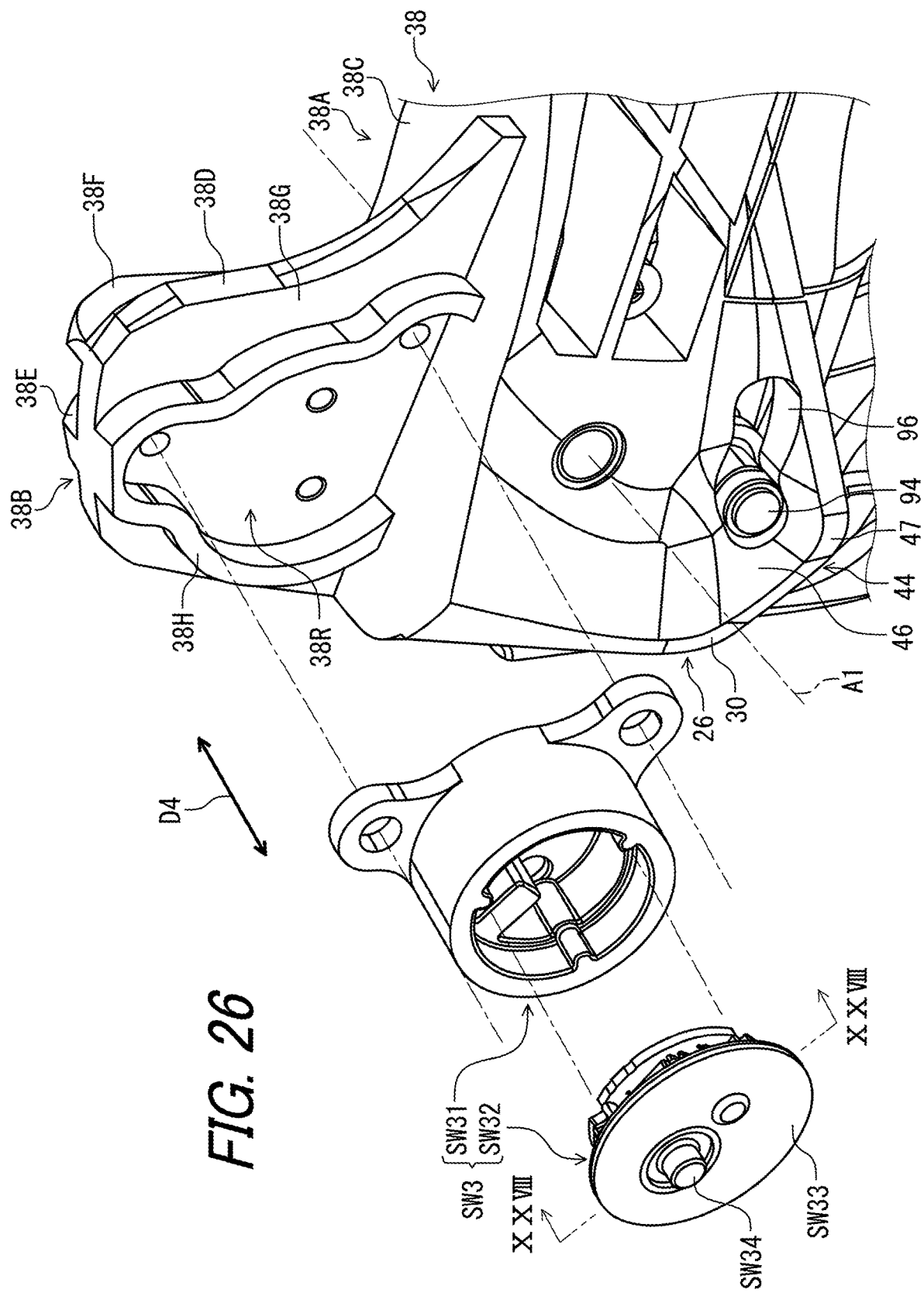
FIG. 26 is an exploded perspective view of the operating device illustrated in FIG. 1, with the grip cover omitted.

As seen in FIG. 26, the base frame 38D has an attachment surface 38G facing the operation direction D4. The pommel frame 38B includes a fourth rib 38H. The fourth rib 38H extends from the attachment surface 38G in the operation direction D4 to provide an attachment recess 38R. The electrical switch SW3 is provided in the attachment recess 38R. In this embodiment, the electrical switch SW3 is attached to the pommel frame 38B detachably without substantial damage. For example, the electrical switch SW3 is attached to the pommel frame 38B with fasteners such as screws. The electrical switch SW3 can be replaced with other components. Examples of the other components include another switch and a unit having substantially the same shape as that of the electrical switch SW3.

As seen in FIG. 24, the attachment surface 38G is non-perpendicular to the cylinder center axis A2 as viewed in the perpendicular direction D3 (FIG. 22). The attachment surface 38G is non-parallel to the cylinder center axis A2 as viewed in the perpendicular direction D3 (FIG. 22). The attachment surface 38G is inclined relative to the cylinder center axis A2 as viewed in the perpendicular direction D3 (FIG. 22). However, the attachment surface 38G can be perpendicular to the cylinder center axis A2 as viewed in the perpendicular direction D3 (FIG. 22). The attachment surface 38G can be parallel to the cylinder center axis A2 as viewed in the perpendicular direction D3 (FIG. 22).

Figure 27:
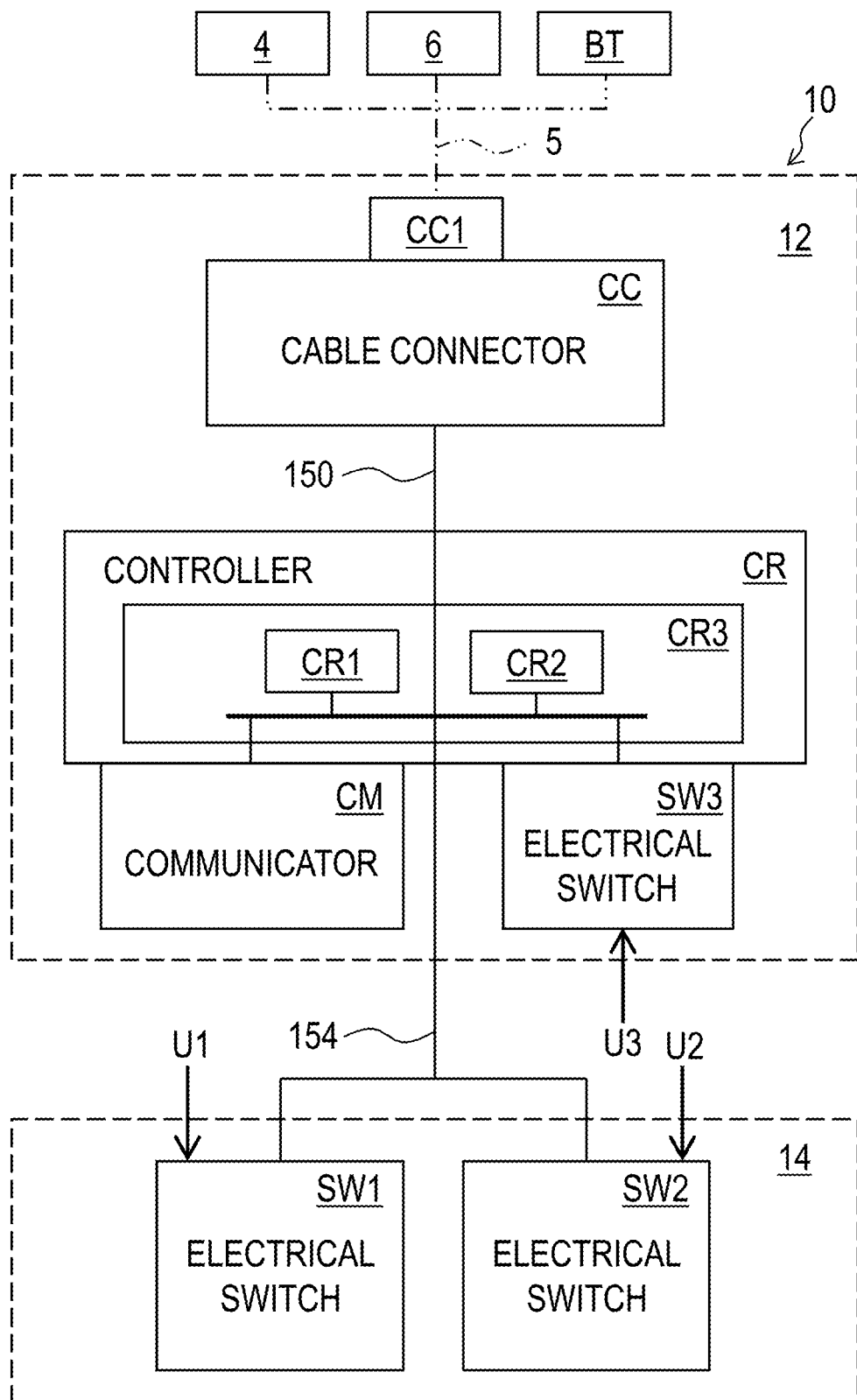
FIG. 27 is a schematic block diaphragm of the operating device illustrated in FIG. 1.

As seen in FIG. 27, the operating device 10 further comprises a controller CR electrically connected to the electrical switch SW3 to generate a control signal based on an operation of the electrical switch SW3. Examples of the control signal include a control signal to control an electric device such as a bicycle seatpost, a bicycle suspension, a bicycle shifting device, a cycle computer, or a smart phone. The controller CR can be omitted from the operating device 10 or provided on a device other than the operating device 10.

The controller CR includes a processor CR1, a memory CR2, and a circuit board CR3. The processor CR1 and the memory CR2 are electrically mounted on the circuit board CR3. The processor CR1 is electrically connected to the memory CR2 with the circuit board CR3. The processor CR1 includes a central processing unit (CPU). The memory CR2 stores programs and other information. The memory CR2 includes a read only memory (ROM) and a random-access memory (RAM). For example, a program stored in the memory CR2 is read into the processor CR1, and thereby an algorithm of the controller CR is performed.

Figure 28:
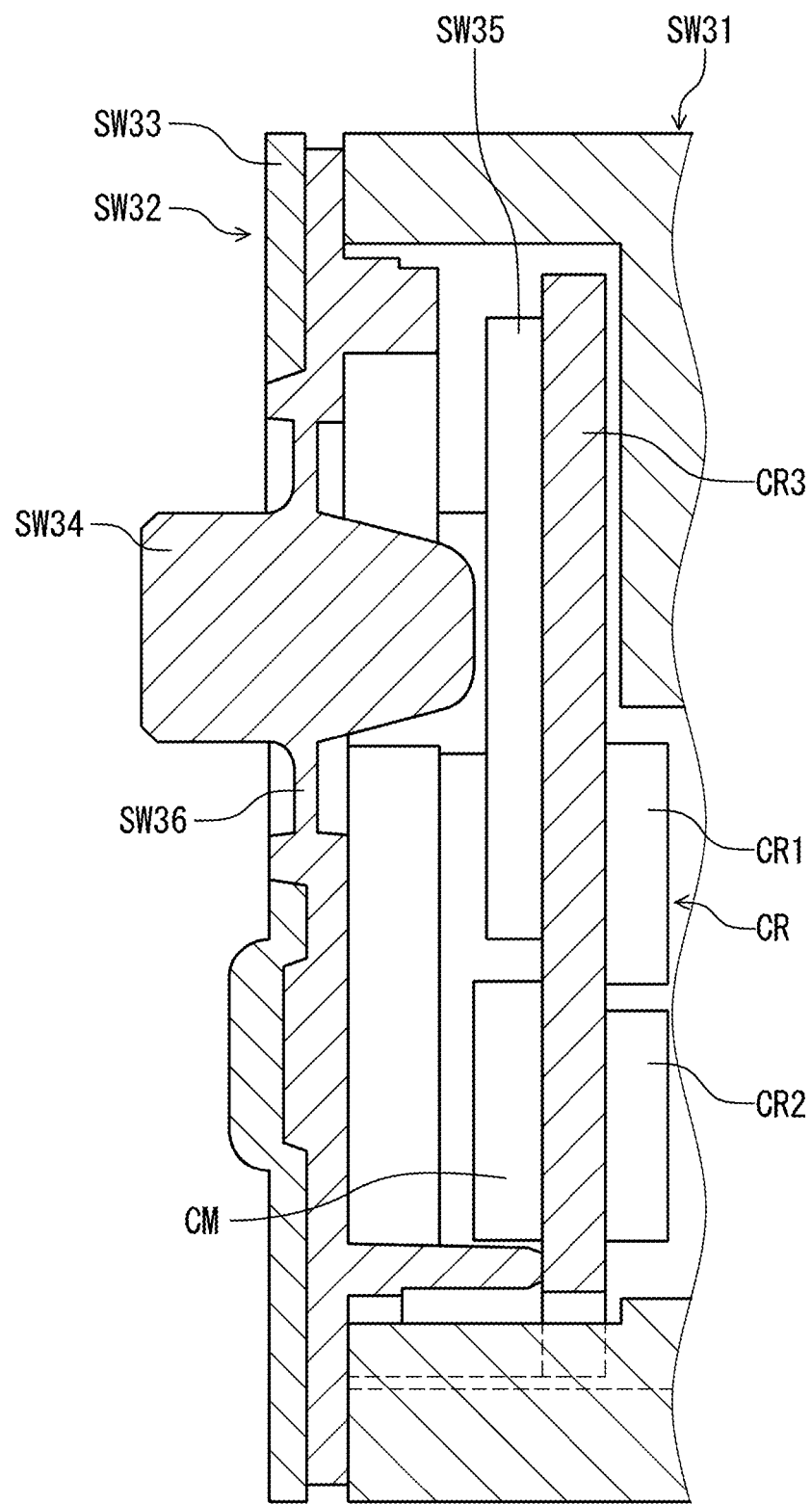
FIG. 28 is a cross-sectional view of the operating device taken along line XXVIII-XXVIII of FIG. 26.

As seen in FIG. 28, the circuit board CR3 is attached to the base plate SW33 of the electrical switch SW3. The controller CR is integrated in the electrical switch SW3. In other words, the electrical switch SW3 is provided on the controller CR. In this embodiment, the switch unit SW32 includes a switch circuit SW35. The switch circuit SW35 is electrically mounted on the circuit board CR3. For example, the switch circuit SW35 includes a normally-open switch. However, the switch circuit SW35 can include other type of switch.

The user operating portion SW34 is contactable with the switch circuit SW35. The switch unit SW32 includes a flexible support SW36. The flexible support SW36 is attached to the base plate SW33 and movably supports the user operating portion SW34 in the operation direction D4 relative to the base plate SW33. In this embodiment, the user operating portion SW34 is integrally provided with the flexible support SW36 as a one-piece unitary member. However, the user operating portion SW34 can be a separate member from the flexible support SW36.

As seen in FIG. 27, the operating device 10 further comprises a cable connector CC provided at one of the base member 12 and the operating member 14. In this embodiment, the cable connector CC is provided at the base member 12. However, the cable connector CC can be provided at the operating member 14. The cable connector CC is electrically connected to the controller CR with a control cable 150. The cable connector CC includes a connection port CC1 (FIG. 29) to detachably receive the electric control cable 5 to electrically connect the electric control cable 5 to the controller CR.

Figure 29:
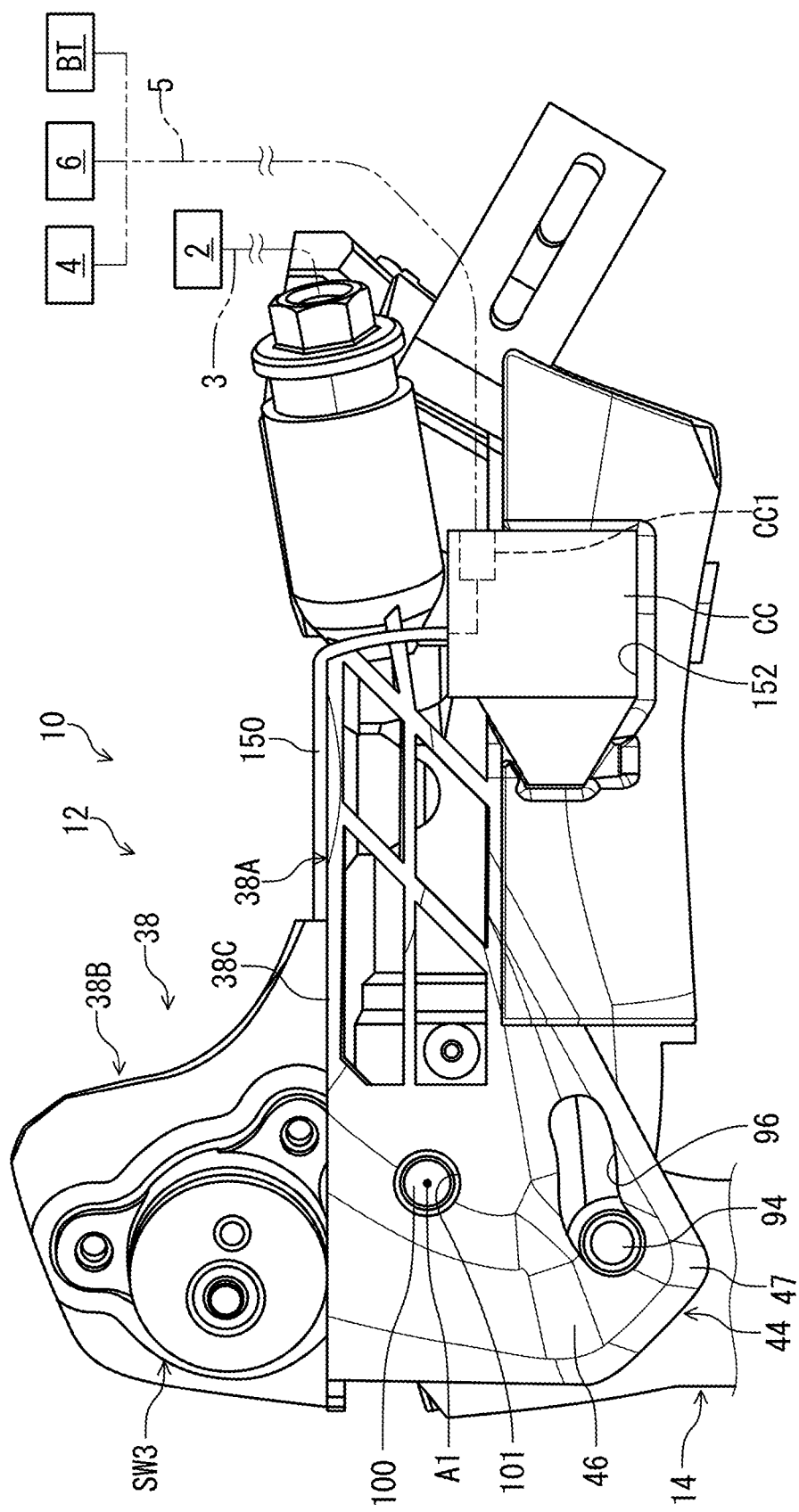
FIG. 29 is a partial side elevational view of the operating device illustrated in FIG. 1, with the grip cover omitted.

As seen in FIG. 29, the base body 38 includes a connector attachment recess 152. The cable connector CC is provided in the connector attachment recess 152. The cable connector CC can be omitted from the operating device 10 or provided at a device other than the operating device 10.

As seen in FIG. 27, the operating device 10 comprises a communicator CM configured to transmit the control signal generated by the controller CR. In this embodiment, the communicator CM is configured to transmit the control signal generated by the controller CR using power line communication technology. However, the communicator CM can be configured to wirelessly transmit the control signal generated by the controller CR. In such an embodiment, the operating device 10 can comprise a power supply mounted in the electrical switch SW1, the electrical switch SW2, the electrical switch SW3, the controller CR, and/or the cable connector CC. Examples of the power supply include a battery and an electricity generation device (e.g., a piezoelectric element).

Power line communication (PLC) carries data on a conductor that is also used simultaneously for electric power transmission or electric power distribution to the electric devices 4 and 6. The communicator CM receives the control signal generated by the controller CR. The communicator CM superimposes the control signal on a power source voltage flowing in the electric control cable 5. The power source voltage is supplies from a power supply BT (e.g., a battery) with the electric control cable 5.

The electrical switches SW1 and SW2 are electrically connected to the controller CR. In this embodiment, the electrical switches SW1 and SW2 are electrically connected to the controller CR with a control cable 154. The controller CR respectively generates an upshift control signal and a downshift control signal based on the user upshift input U1 and the user downshift input U2. The controller CR can be configured to respectively control separate devices in response to control signals generated based on the electrical switches SW1, SW2, and SW3. The controller CR can be configured to control one device in response to control signals generated based on at least two of the electrical switches SW1, SW2, and SW3.

Second Embodiment

An operating device 210 in accordance with a second embodiment will be described below referring to FIGS. 30 and 31. The operating device 210 has the same structure as that of the operating device 10 except for the base body 38. Thus, elements having substantially the same function as those in the first embodiment will be numbered the same here and will not be described and/or illustrated again in detail here for the sake of brevity.

Figure 30:
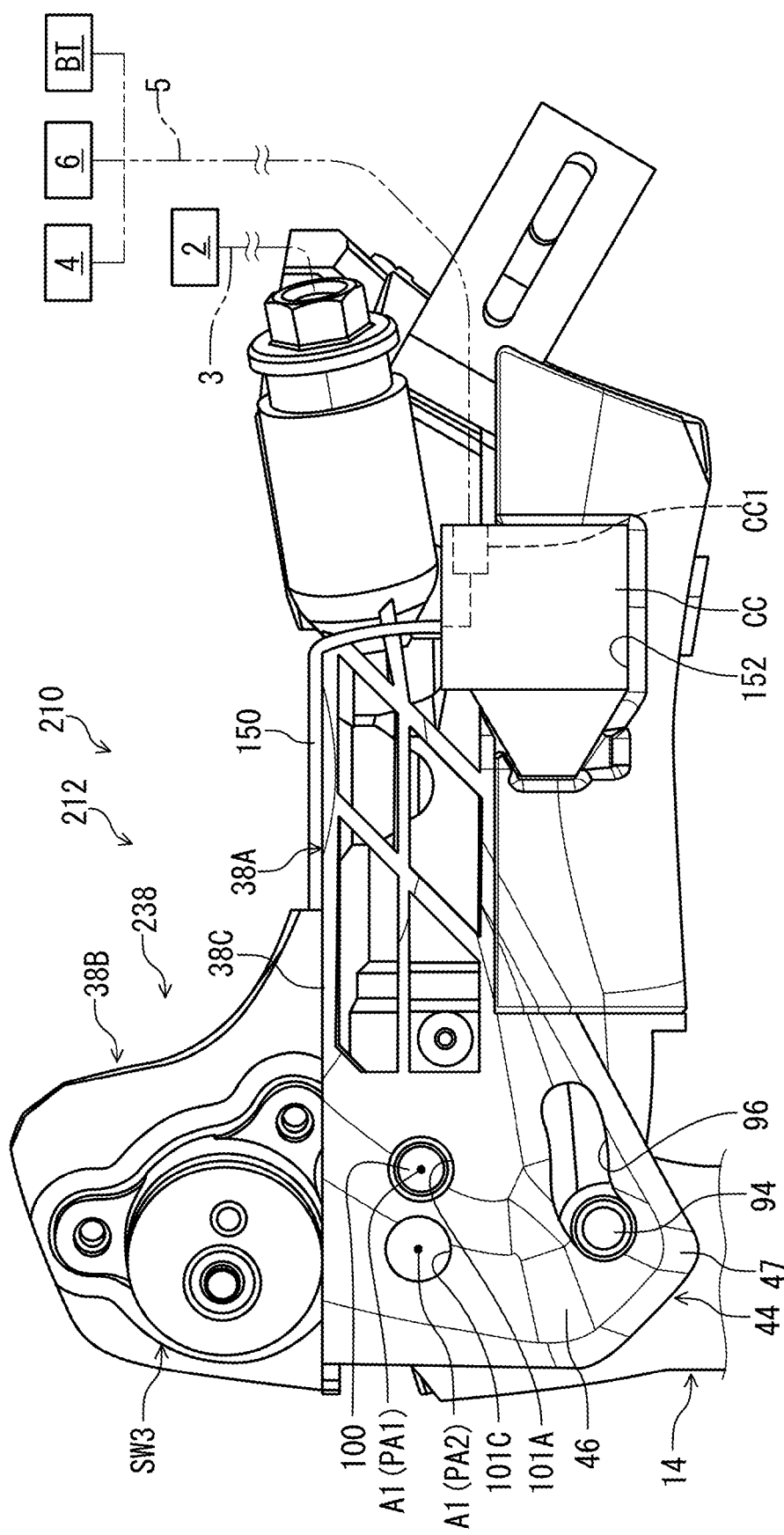
FIG. 30 is a partial side elevational view of an operating device in accordance with a second embodiment, with the grip cover omitted.
Figure 31:
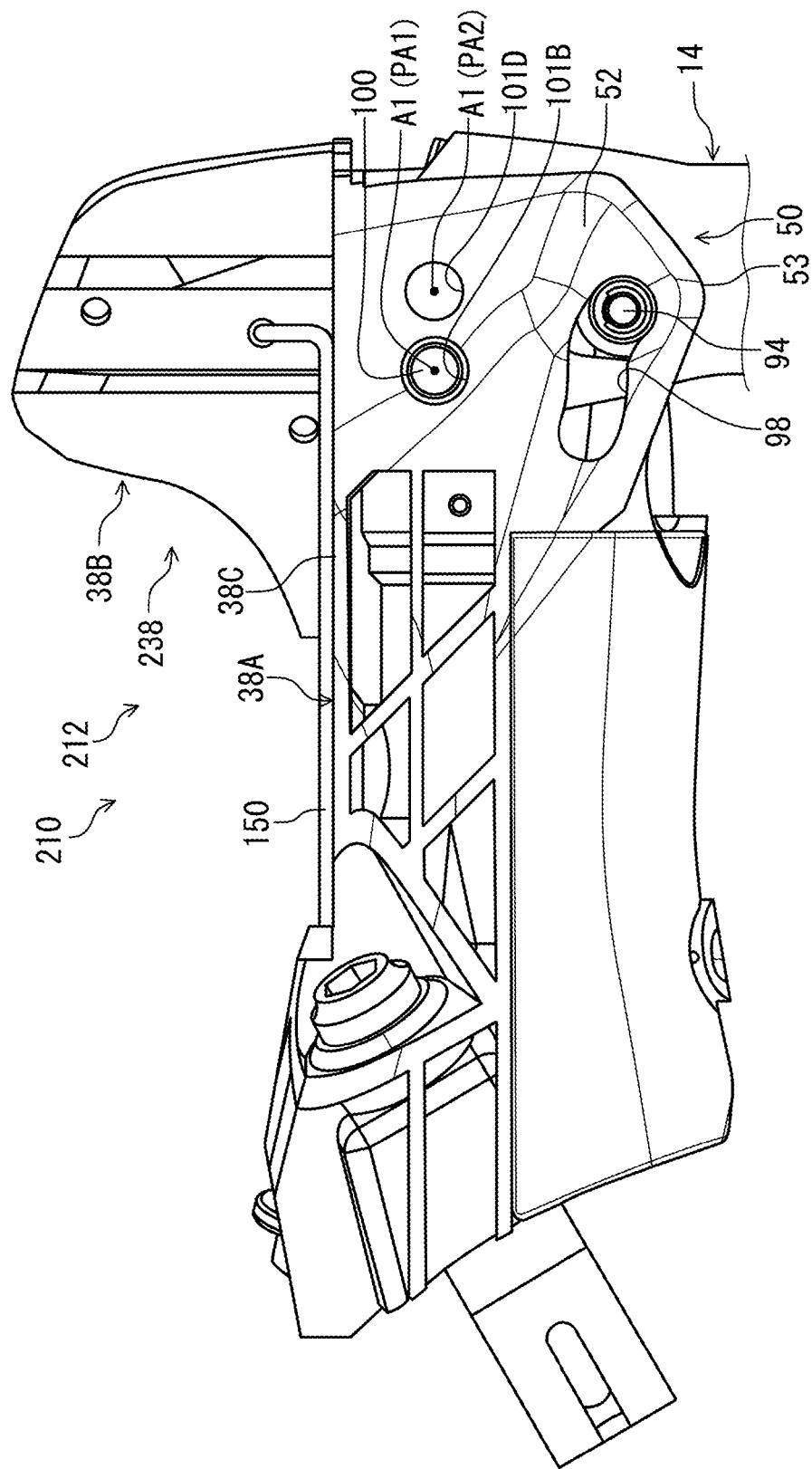
FIG. 31 is another partial side elevational view of the operating device illustrated in FIG. 29, with the grip cover omitted.

As seen in FIGS. 30 and 31, the operating device 210 comprises a base member 212 including a base body 238. The base member 212 has substantially the same structure as that of the base member 12. The base body 238 has substantially the same structure as that of the base body 38. In this embodiment, the position PA1 of the pivot axis A1 can be changed to at least one other positions. For example, the base body 238 includes additional pivot holes 101C and 101D in addition to the pivot holes 101A and 101B. The position PA1 of the pivot axis A1 can be changed to a position PA2 by inserting the pivot pin 100 into the additional pivot holes 101C and 101D. Thus, the base body 238 can be shared with different types of the operating device. Furthermore, the user can change the position of the pivot axis A1 in accordance with the size of the user's hand. The positional relationship between the positions PA1 and PA2 is not limited to this embodiment. For example, the positions PA1 and PA2 can be arranged in the perpendicular direction D3 while the positions PA1 and PA2 are arranged in the longitudinal direction D2 in the second embodiment.

Third Embodiment

Figure 32:
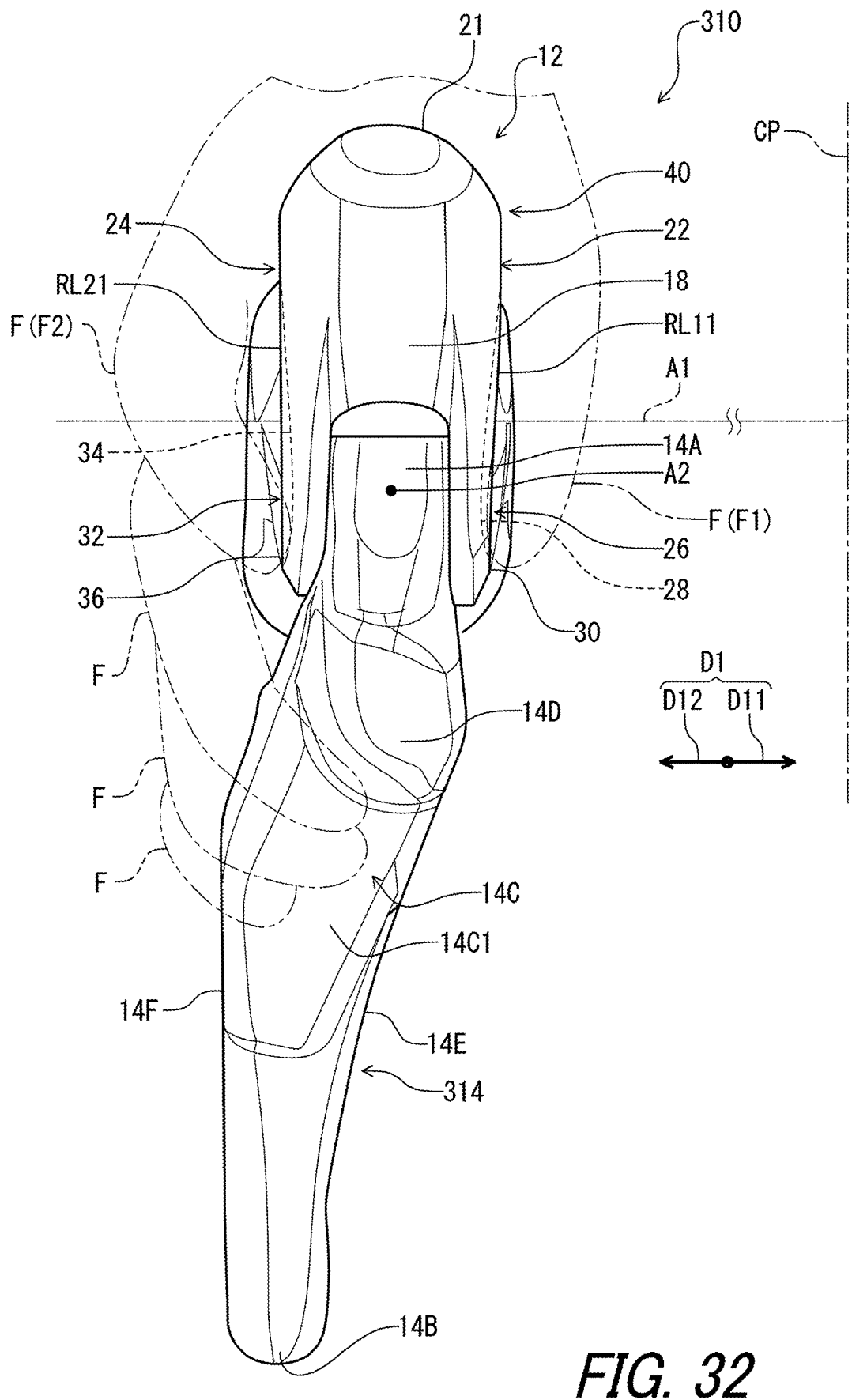
FIG. 32 is a front view of an operating device in accordance with a third embodiment.
Figure 33:
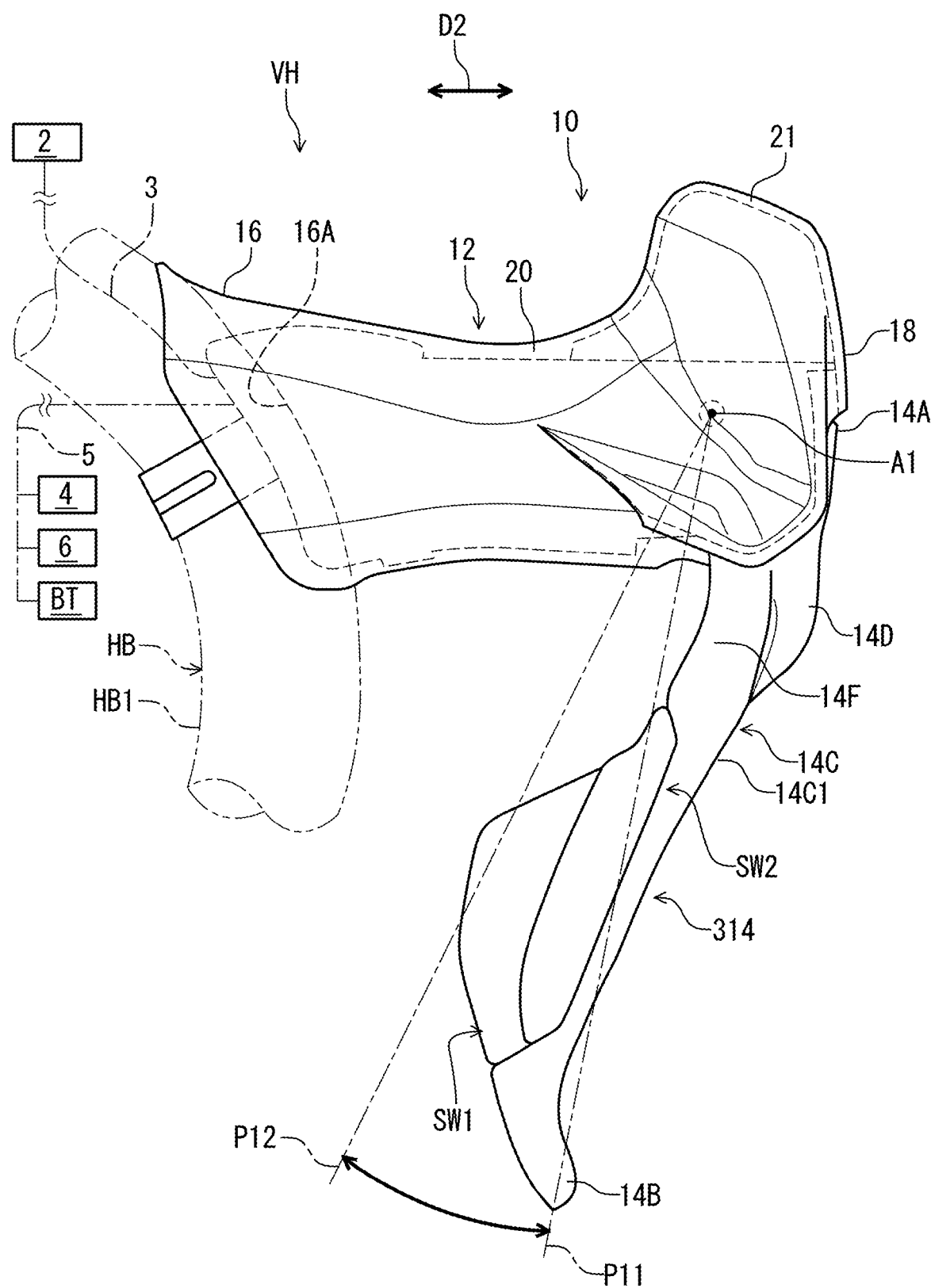
FIG. 33 is a side elevational view of the operating device illustrated in FIG. 32.

An operating device 310 in accordance with a third embodiment will be described below referring to FIGS. 32 and 33. The operating device 310 has the same structure as that of the operating device 10 except for the operating member 14. Thus, elements having substantially the same function as those in the above embodiments will be numbered the same here and will not be described and/or illustrated again in detail here for the sake of brevity.

In the first embodiment, as seen in FIG. 4, the operating member 14 substantially linearly extends from the proximal end 14A to the distal end 14B as viewed in the longitudinal direction D2 (FIG. 2) of the base member 12. As seen in FIG. 32, the operating device 310 comprises an operating member 314. The operating member 314 has substantially the same structure as that of the operating member 14 of the first embodiment. The operating member 314 extends from the proximal end 14A to the distal end 14B such that the distal end 14B is offset from the proximal end 14A in the pivot axis direction D1 as viewed along the cylinder center axis A2. As seen in FIG. 33, the operating member 314 includes lever recess 14C and the projection 14D.

Fourth Embodiment

An operating device 410 in accordance with a fourth embodiment will be described below referring to FIGS. 34 to 36. The operating device 410 has the same structure as that of the operating device 10 except for the base member 12. Thus, elements having substantially the same function as those in the above embodiments will be numbered the same here and will not be described and/or illustrated again in detail here for the sake of brevity.

Figure 34:
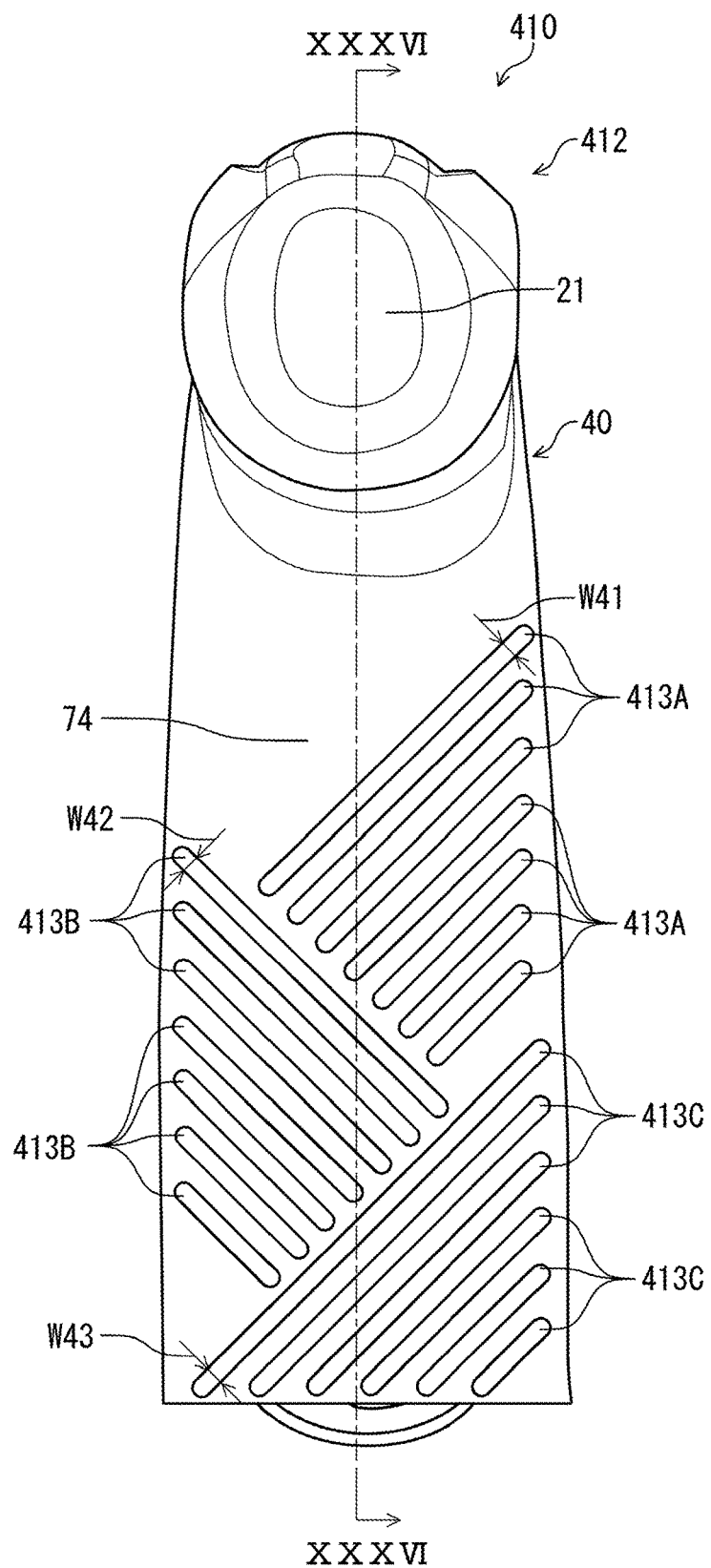
FIG. 34 is a top view of an operating device in accordance with a fourth embodiment.
Figure 35:
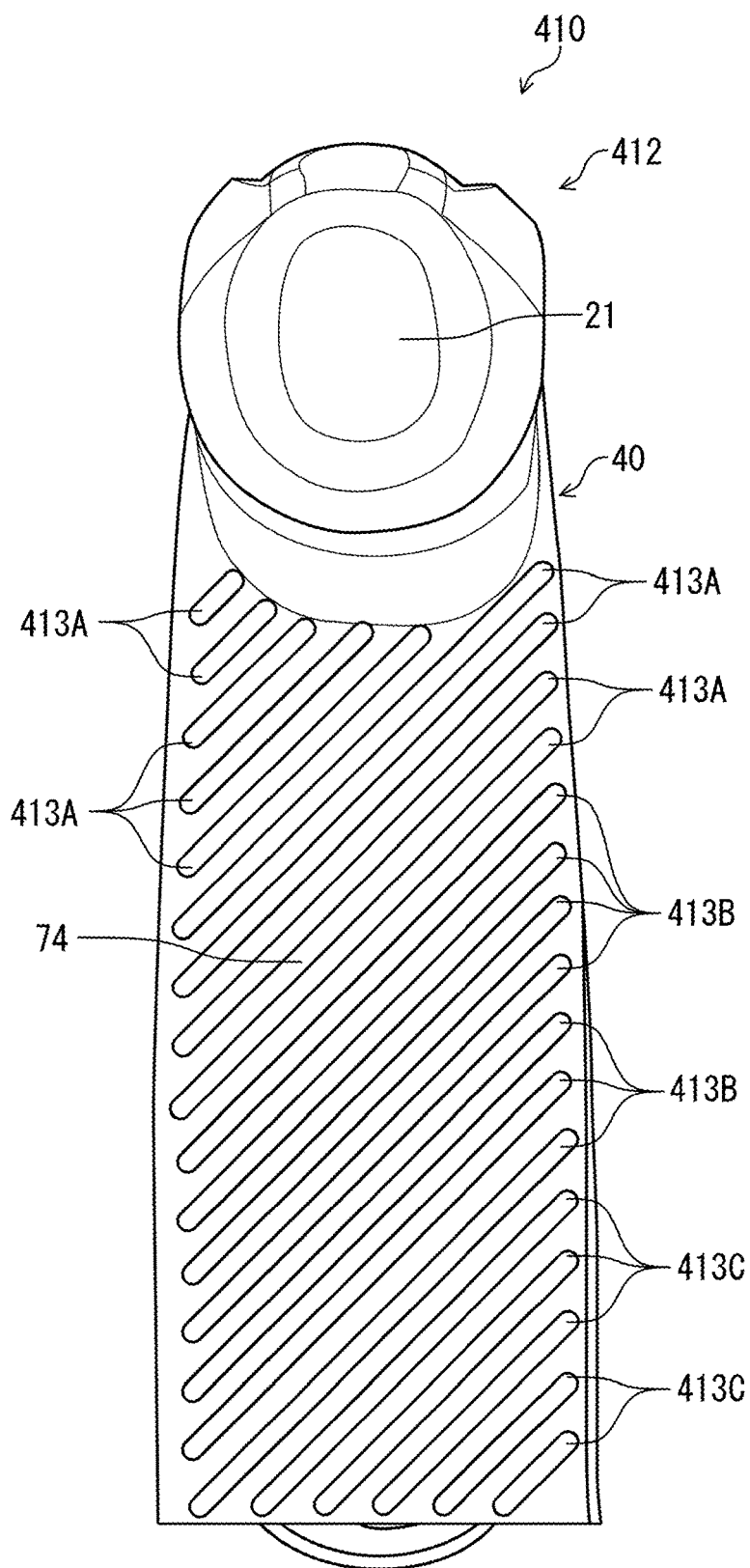
FIG. 35 is a top view of an operating device in accordance with a modification of the fourth embodiment.

As seen in FIG. 34, the operating device 410 comprises a base member 412. The base member 412 has substantially the same structure as that of the base member 12 of the first embodiment. In this embodiment, the base member 412 includes at least one projecting part provided on an outer surface of the base member 412. The base member 412 includes a first projecting part 413A, a second projecting part 413B, and a third projecting part 413C. The first projecting part 413A is provided on the grip cover 40 to improve grip of the base member 412. The second projecting part 413B is provided on the grip cover 40 to improve grip of the base member 412. The third projecting part 413C is provided on the grip cover 40 to improve grip of the base member 412.

The first projecting part 413A is provided on the reference surface 74. The second projecting part 413B is provided on the reference surface 74. The third projecting part 413C is provided on the reference surface 74. However, at least one of the first projecting part 413A, the second projecting part 413B, and the third projecting part 413C can be provided in other positions such as the first surface 78 or the curved surface 81.

In this embodiment, the first projecting part 413A, the second projecting part 413B, and the third projecting part 413C are spaced apart from each other. However, at least one of the first projecting part 413A, the second projecting part 413B, and the third projecting part 413C can be integrally provided with the other of the first projecting part 413A, the second projecting part 413B, and the third projecting part 413C as a one-piece part.

In this embodiment, the base member 412 includes a plurality of first projecting parts 413A, a plurality of second projecting parts 413B, and a plurality of third projecting parts 413C. A total number of the first projecting parts 413A is not limited to this embodiment. A total number of the second projecting parts 413B is not limited to this embodiment. A total number of the third projecting parts 413C is not limited to this embodiment.

The first projecting part 413A has a first width W41. The second projecting part 413B has a second width W42. The third projecting part 413C has a third width W43. The first width W41, the second width W42, and the third width W43 are equal to each other. However, at least one of the first width W41, the second width W42, and the third width W43 can be different from the other of the first width W41, the second width W42, and the third width W43.

The second projecting part 413B extends in a direction different from a direction in which the first projecting part 413A extends and a direction in which the third projecting part 413C extends as viewed in the perpendicular direction D3. As seen in FIG. 35, however, the direction of the second projecting part 413B can be identical to the direction of the first projecting part 413A and the direction of the third projecting part 413C as viewed in the perpendicular direction D3.

Figure 36:
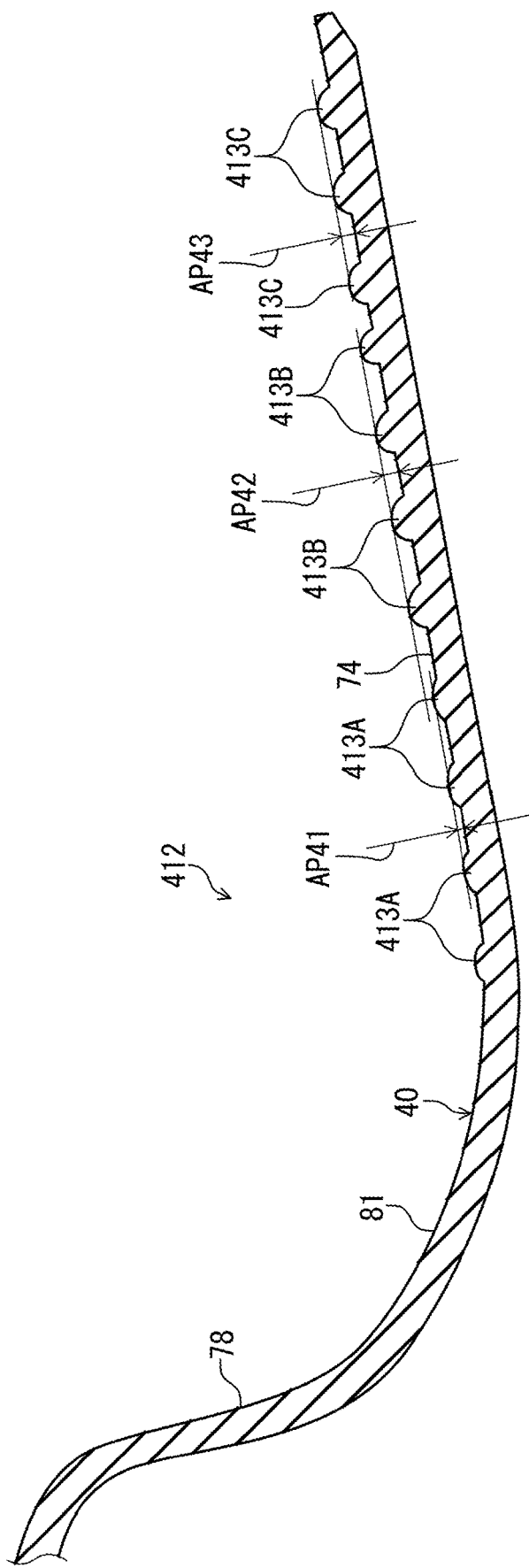
FIG. 36 is a cross-sectional view of a grip cover of the operating device taken along line XXXVI-XXXVI of FIG. 34.

As seen in FIG. 36, the first projecting part 413A has a first amount of protrusion AP41 defined from the reference surface 74. The second projecting part 413B has a second amount of protrusion AP42 defined from the reference surface 74. The third projecting part 413C has a third amount of protrusion AP43 defined from the reference surface 74. The first amount of protrusion AP41 is different from the second amount of protrusion AP42 and the third amount of protrusion AP43. The first amount of protrusion AP41 is smaller than the second amount of protrusion AP42 and the third amount of protrusion AP43. The second amount of protrusion AP42 is equal to the third amount of protrusion AP43. However, the first amount of protrusion AP41 can be equal to or larger than the second amount of protrusion AP42 and/or the third amount of protrusion AP43. The second amount of protrusion AP42 can be different from the third amount of protrusion AP43.

Fifth Embodiment

An operating device 510 in accordance with a fifth embodiment will be described below referring to FIGS. 37 and 38. The operating device 510 has the same structure as that of the operating device 410 except for the arrangement of the first projecting part 413A, the second projecting part 413B, and the third projecting part 413C. Thus, elements having substantially the same function as those in the above embodiments will be numbered the same here and will not be described and/or illustrated again in detail here for the sake of brevity.

Figure 37:
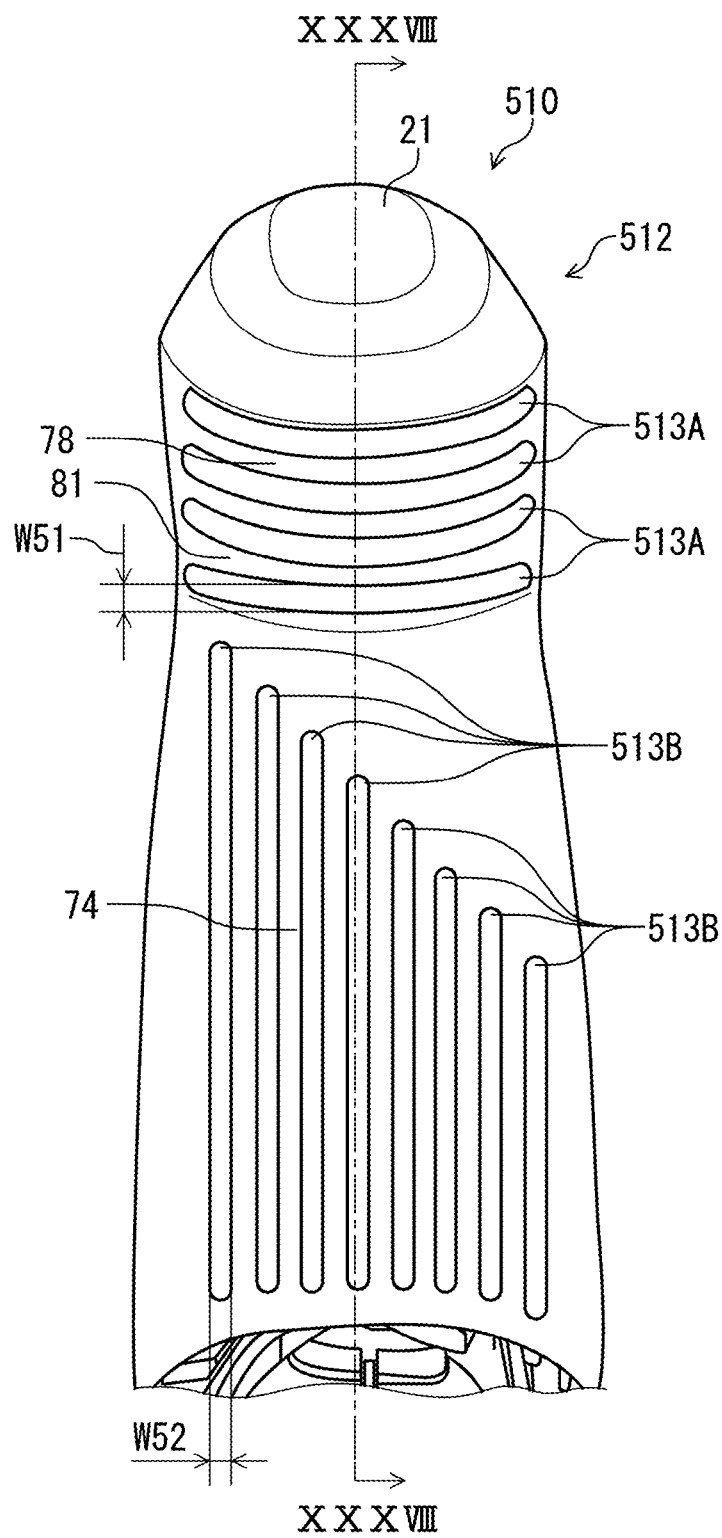
FIG. 37 is a top view of an operating device in accordance with a fifth embodiment.

As seen in FIG. 37, the operating device 510 comprises a base member 512. The base member 512 has substantially the same structure as that of the base member 412 of the fourth embodiment. In this embodiment, the base member 512 includes at least one projecting part provided on an outer surface of the base member 512. The base member 512 includes a first projecting part 513A and a second projecting part 513B. The base member 512 includes a plurality of first projecting parts 513A and a plurality of second projecting parts 513B. Parts corresponding to the third projecting part 413C are omitted from the base member 512.

At least one of the first projecting parts 513A is provided on the first surface 78. The remaining of the first projecting parts 513A is provided on the curved surface 81. The plurality of second projecting parts 513B is provided on the reference surface 74. However, the plurality of first projecting parts 513A can be provided on only the first surface 78 or only the curved surface 81. The plurality of first projecting parts 513A can be at least partly provided on the reference surface 74. The plurality of second projecting parts 513B can be at least partly provided on at least one of the first surface 78 and the curved surface 81.

The first projecting part 513A has a first width W51. The second projecting part 513B has a second width W52. The first width W51 is different from the second width W52. In this embodiment, the first width W51 is larger than the second width W52. However, the first width W51 can be equal to or smaller than the second width W52.

Figure 38:
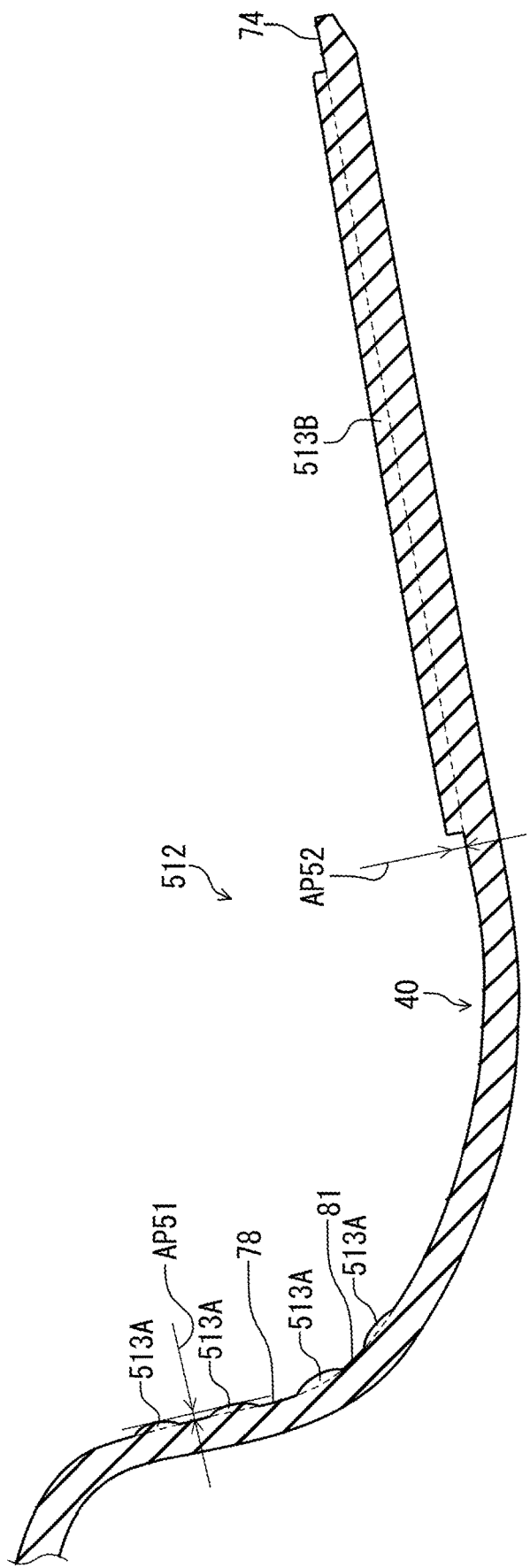
FIG. 38 is a cross-sectional view of a grip cover of the operating device taken along line XXXVIII-XXXVIII of FIG. 37.

As seen in FIG. 38, the first projecting part 513A has a first amount of protrusion AP51 defined from the first surface 78 or the curved surface 81. The second projecting part 513B has a second amount of protrusion AP52 defined from the reference surface 74. The first amount of protrusion AP51 is different from the second amount of protrusion AP52. In this embodiment, the first amount of protrusion AP51 is smaller than the second amount of protrusion AP52. However, the first amount of protrusion AP51 can be equal to or larger than the second amount of protrusion AP52.

Sixth Embodiment

An operating device 610 in accordance with a sixth embodiment will be described below referring to FIGS. 39 and 40. The operating device 610 has the same structure as that of the operating device 410 except for the arrangement of the first projecting part 413A, the second projecting part 413B, and the third projecting part 413C. Thus, elements having substantially the same function as those in the above embodiments will be numbered the same here and will not be described and/or illustrated again in detail here for the sake of brevity.

Figure 39:
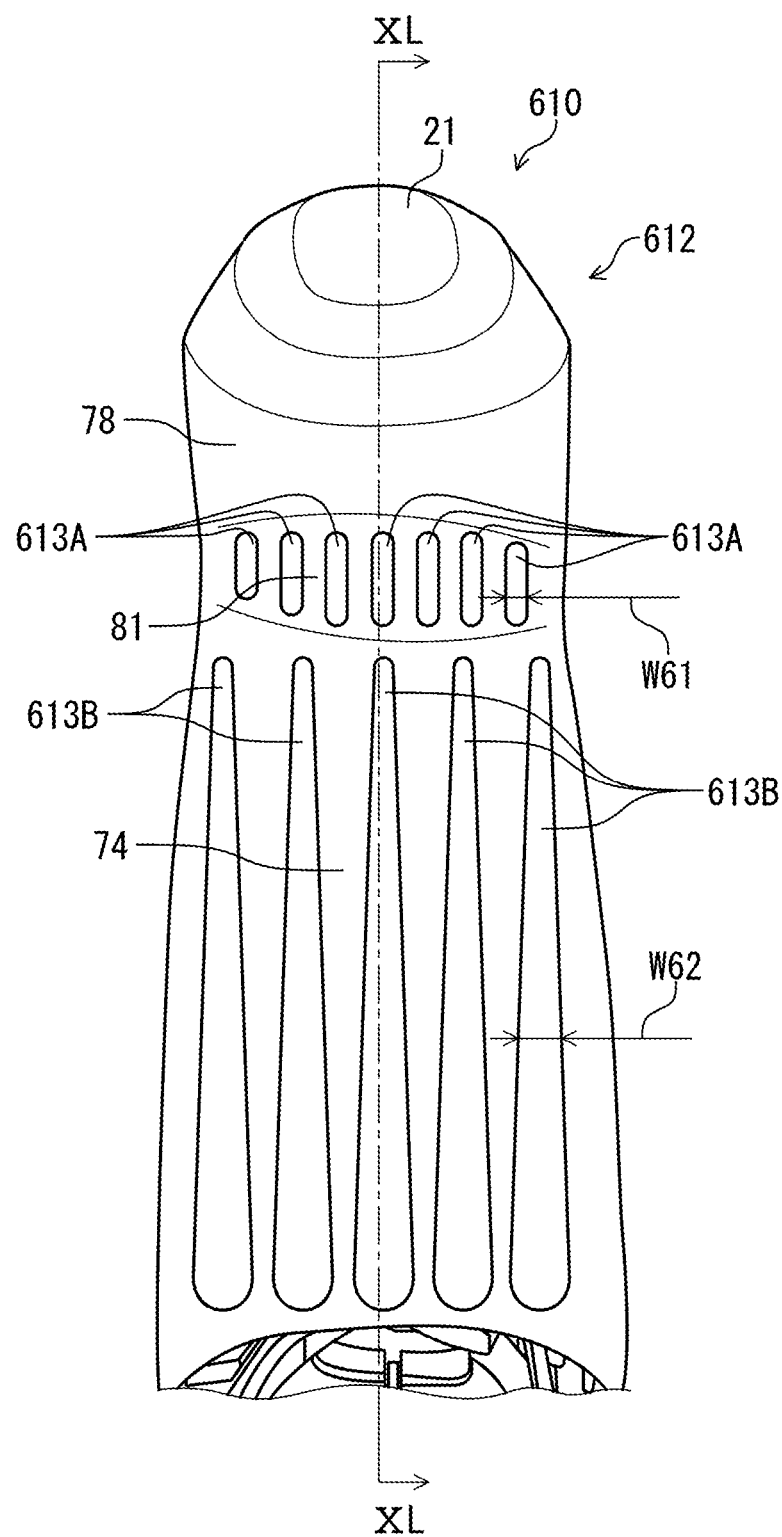
FIG. 39 is a top view of an operating device in accordance with a sixth embodiment.

As seen in FIG. 39, the operating device 610 comprises a base member 612. The base member 612 has substantially the same structure as that of the base member 412 of the fourth embodiment. In this embodiment, the base member 612 includes at least one projecting part provided on an outer surface of the base member 612. The base member 612 includes a first projecting part 613A and a second projecting part 613B. The base member 612 includes a plurality of first projecting parts 613A and a plurality of second projecting parts 613B. Parts corresponding to the third projecting part 413C are omitted from the base member 612.

The plurality of first projecting parts 613A is provided on the curved surface 81. The plurality of second projecting parts 613B is provided on the reference surface 74. However, the plurality of first projecting parts 613A can be at least partly provided on other surfaces such as the reference surface 74 and the first surface 78. The plurality of second projecting parts 613B can be at least partly provided on other surfaces such as the first surface 78 and the curved surface 81.

The first projecting part 613A has a first width W61. The second projecting part 613B has a second width W62. The first width W61 is different from the second width W62. In this embodiment, the first width W61 is constant in the first projecting part 613A. The second width W62 varies from one end of the second projecting part 613B to the other end of the second projecting part 613B. The second width W62 is equal to or larger than the first width W61. However, the first width W61 can vary from one end of the first projecting part 613A to the other end of the first projecting part 613A. The second width W62 can be constant in the second projecting part 613B.

Figure 40:
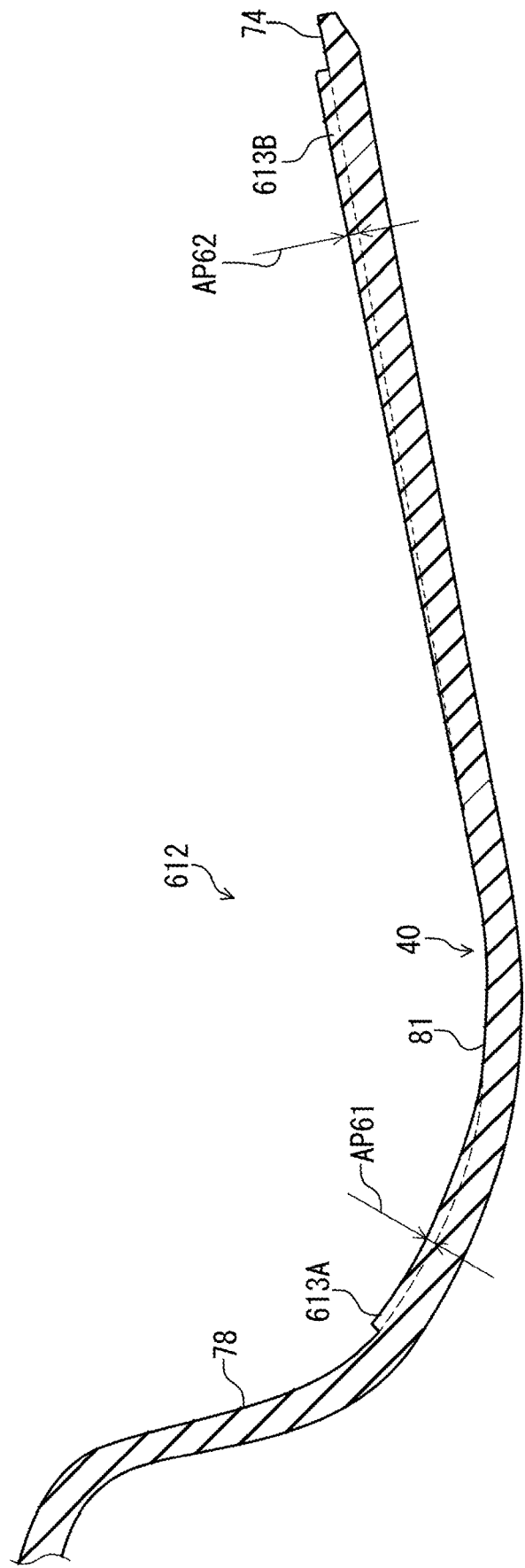
FIG. 40 is a cross-sectional view of a grip cover of the operating device taken along line XL-XL of FIG. 39.

As seen in FIG. 40, the first projecting part 613A has a first amount of protrusion AP61 defined from the curved surface 81. The second projecting part 613B has a second amount of protrusion AP62 defined from the reference surface 74. The first amount of protrusion AP61 is different from the second amount of protrusion AP62. In this embodiment, the first amount of protrusion AP61 varies from one end of the first projecting part 613A to the other end of the first projecting part 613A. The second amount of protrusion AP62 varies from one end of the second projecting part 613B to the other end of the second projecting part 613B. However, the first amount of protrusion AP61 can be constant in the first protruding part 613A. The second amount of protrusion AP62 can be constant in the second protruding part 613B.

Seventh Embodiment

An operating device 710 in accordance with a seventh embodiment will be described below referring to FIG. 41. The operating device 710 has the same structure as that of the operating device 410 except for the arrangement of the first projecting part 413A, the second projecting part 413B, and the third projecting part 413C. Thus, elements having substantially the same function as those in the above embodiments will be numbered the same here and will not be described and/or illustrated again in detail here for the sake of brevity.

Figure 41:
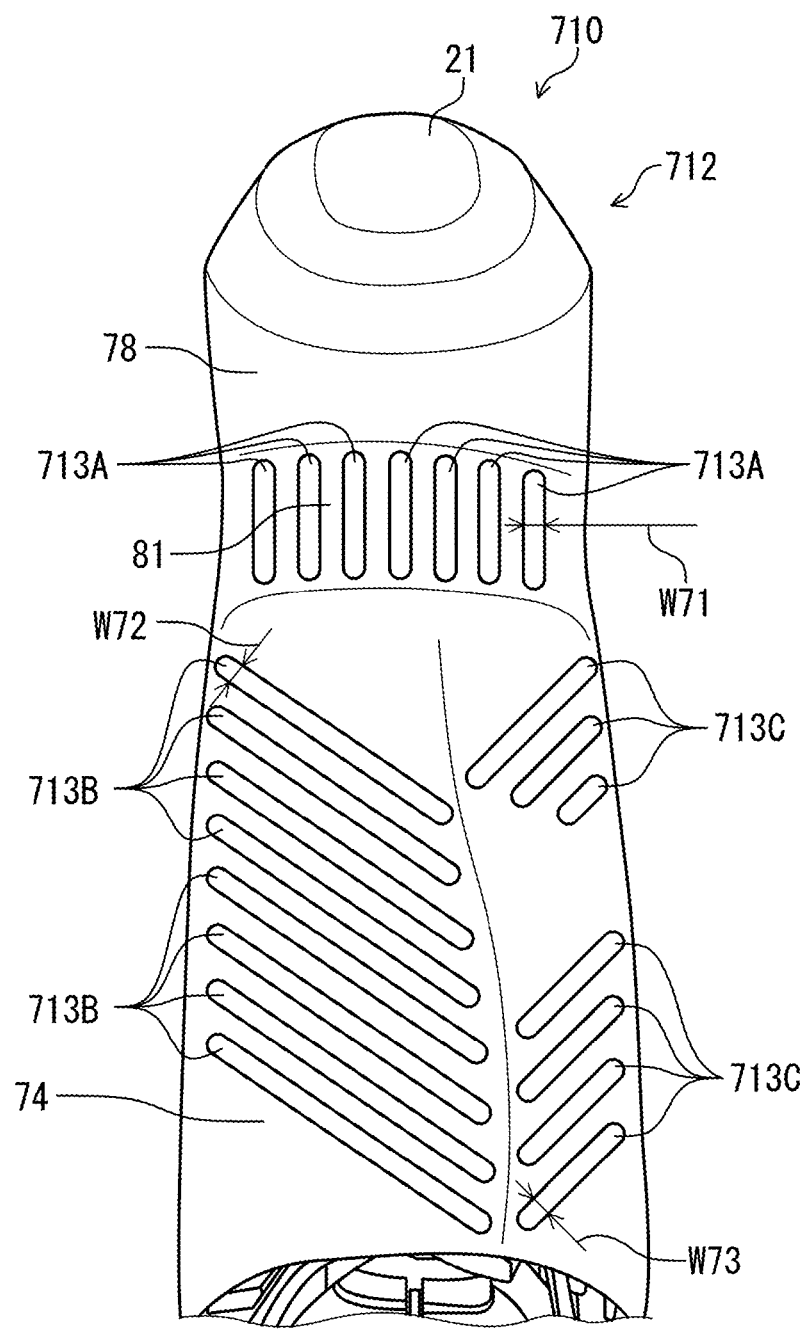
FIG. 41 is a top view of an operating device in accordance with a seventh embodiment.

As seen in FIG. 41, the operating device 710 comprises a base member 712. The base member 712 has substantially the same structure as that of the base member 412 of the fourth embodiment. In this embodiment, the base member 712 includes at least one projecting part provided on an outer surface of the base member 712. The base member 712 includes a first projecting part 713A, a second projecting part 713B, and a third projecting part 713C. The base member 712 includes a plurality of first projecting parts 713A, a plurality of second projecting parts 713B, and a plurality of third projecting parts 713C.

The plurality of first projecting parts 713A is provided on the curved surface 81. The plurality of second projecting parts 713B is provided on the reference surface 74. The plurality of third projecting parts 713C is provided on the reference surface 74. However, the plurality of first projecting parts 713A can be at least partly provided on the reference surface 74 and/or the first surface 78. The plurality of second projecting parts 713B can be at least partly provided on the first surface 78 and/or the curved surface 81.

The first projecting part 713A has a first width W71. The second projecting part 713B has a second width W72. The third projecting part 713C has a third width W73. In this embodiment, the first width W71, the second width W72, and the third width W73 are equal to each other. However, at least one of the first width W71, the second width W72, and the third width W73 can be different from the other of the first width W71, the second width W72, and the third width W73.

The first projecting part 713A has the first amount of protrusion AP41 (FIG. 36) as well as the first projecting part 413A. The second projecting part 713B has the second amount of protrusion AP42 (FIG. 36) as well as the second projecting part 413B. The third projecting part 713C has the third amount of protrusion AP43 (FIG. 36) as well as the third projecting part 413C. However, the amount of protrusion of the first projecting part 713A is not limited to this embodiment. The amount of protrusion of the second projecting part 713B is not limited to this embodiment. The amount of protrusion of the third projecting part 713C is not limited to this embodiment.

Eighth Embodiment

An operating device 810 in accordance with an eighth embodiment will be described below referring to FIG. 42. The operating device 810 has the same structure as that of the operating device 410 except for the arrangement of the first projecting part 413A, the second projecting part 413B, and the third projecting part 413C. Thus, elements having substantially the same function as those in the above embodiments will be numbered the same here and will not be described and/or illustrated again in detail here for the sake of brevity.

Figure 42:
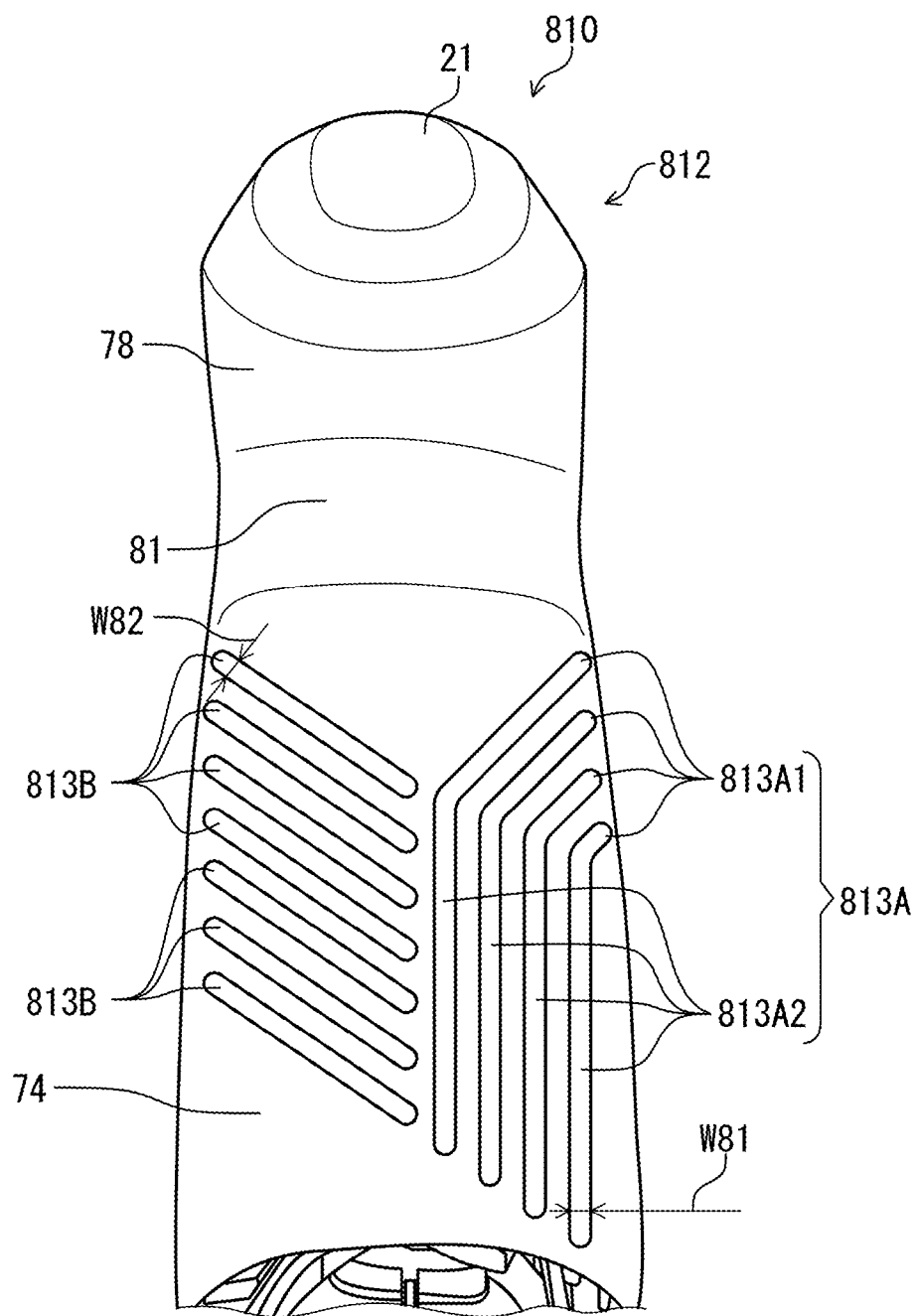
FIG. 42 is a top view of an operating device in accordance with an eighth embodiment.

As seen in FIG. 42, the operating device 810 comprises a base member 812. The base member 812 has substantially the same structure as that of the base member 412 of the fourth embodiment. In this embodiment, the base member 812 includes at least one projecting part provided on an outer surface of the base member 812. The base member 812 includes a first projecting part 813A and a second projecting part 813B. The base member 812 includes a plurality of first projecting parts 813A and a plurality of second projecting parts 813B. Parts corresponding to the third projecting part 413C are omitted from the base member 812.

The plurality of first projecting parts 813A is provided on the reference surface 74. The plurality of second projecting parts 813B is provided on the reference surface 74. However, the plurality of first projecting parts 813A can be at least partly provided on the first surface 78 and/or the curved surface 81. The plurality of second projecting parts 813B can be at least partly provided on the first surface 78 and/or the curved surface 81.

The first projecting part 813A has a first width W81. The second projecting part 813B has a second width W82. In this embodiment, the first width W81 is equal to the second width W82. However, the first width W81 can be different from the second width W82.

The first projecting part 813A has the first amount of protrusion AP41 (FIG. 36) as well as the first projecting part 413A. The second projecting part 813B has the second amount of protrusion AP42 (FIG. 36) as well as the second projecting part 413B. However, the amount of protrusion of the first projecting part 813A is not limited to this embodiment. The amount of protrusion of the second projecting part 813B is not limited to this embodiment.

The first projecting part 813A includes a first part 813A1 and a second part 813A2. The second part 813A2 extends in a direction different from a direction in which the first part 813A1 extends. The first part 813A1 is integrally provided with the second part 813A2. However, the first part 813A1 can be a separate part from the second part 813A2.

Ninth Embodiment

An operating device 910 in accordance with a ninth embodiment will be described below referring to FIG. 43. The operating device 910 has the same structure as that of the operating device 410 except for the arrangement of the first projecting part 413A, the second projecting part 413B, and the third projecting part 413C. Thus, elements having substantially the same function as those in the above embodiments will be numbered the same here and will not be described and/or illustrated again in detail here for the sake of brevity.

Figure 43:
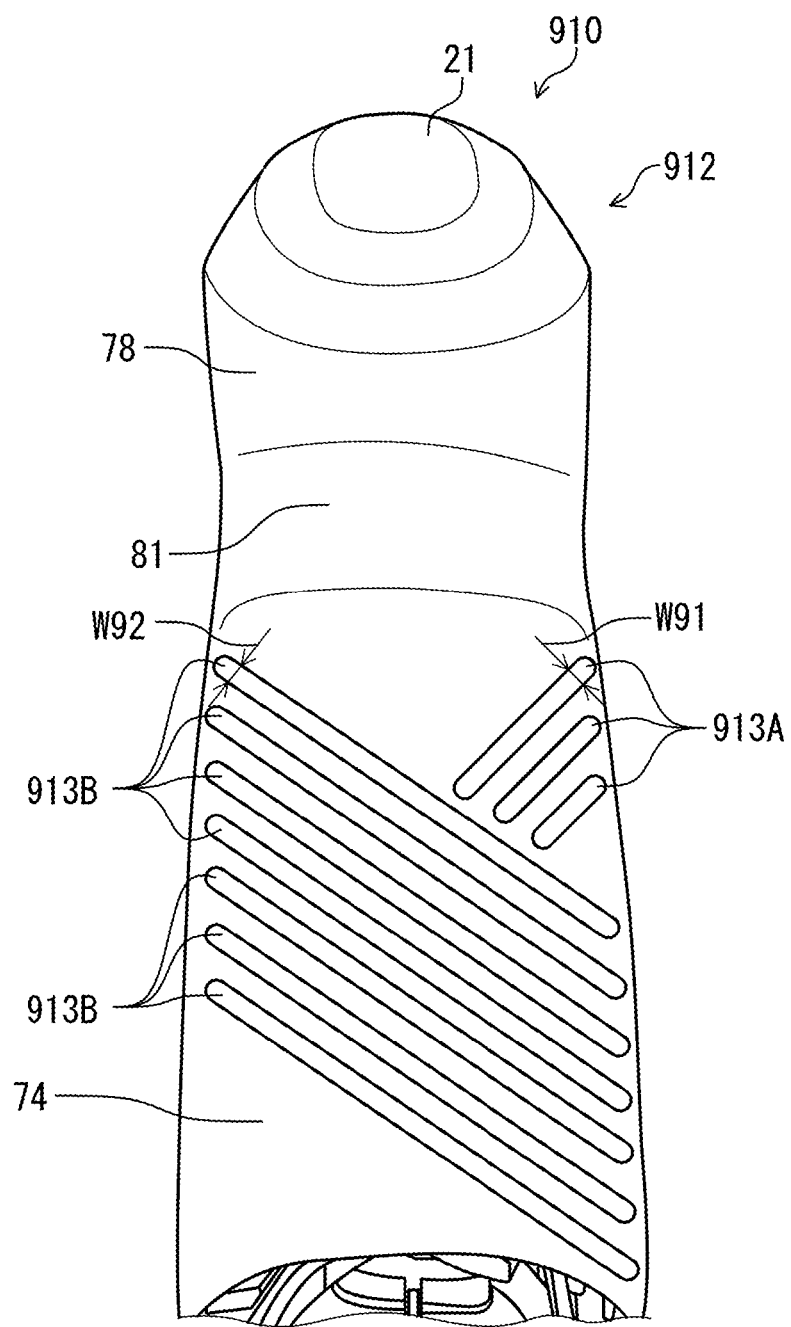
FIG. 43 is a top view of an operating device in accordance with a ninth embodiment.

As seen in FIG. 43, the operating device 910 comprises a base member 912. The base member 912 has substantially the same structure as that of the base member 412 of the fourth embodiment. In this embodiment, the base member 912 includes at least one projecting part provided on an outer surface of the base member 912. The base member 912 includes a first projecting part 913A and a second projecting part 913B. The base member 912 includes a plurality of first projecting parts 913A and a plurality of second projecting parts 913B. Parts corresponding to the third projecting part 413C are omitted from the base member 912.

The plurality of first projecting parts 913A is provided on the reference surface 74. The plurality of second projecting parts 913B is provided on the reference surface 74. However, the plurality of first projecting parts 913A can be at least partly provided on the first surface 78 and/or the curved surface 81. The plurality of second projecting parts 913B can be at least partly provided on the first surface 78 and/or the curved surface 81.

The first projecting part 913A has a first width W91. The second projecting part 913B has a second width W92. In this embodiment, the first width W91 is equal to the second width W92. However, the first width W91 can be different from the second width W82.

The first projecting part 913A has the first amount of protrusion AP41 (FIG. 36) as well as the first projecting part 413A. The second projecting part 913B has the second amount of protrusion AP42 (FIG. 36) as well as the second projecting part 413B. However, the amount of protrusion of the first projecting part 913A is not limited to this embodiment. The amount of protrusion of the second projecting part 913B is not limited to this embodiment.

Tenth Embodiment

An operating device 1010 in accordance with a tenth embodiment will be described below referring to FIGS. 44 to 59. The operating device 1010 has the same structure as that of the operating device 10 except for the base member 12. Thus, elements having substantially the same function as those in the above embodiments will be numbered the same here and will not be described and/or illustrated again in detail here for the sake of brevity.

Figure 44:
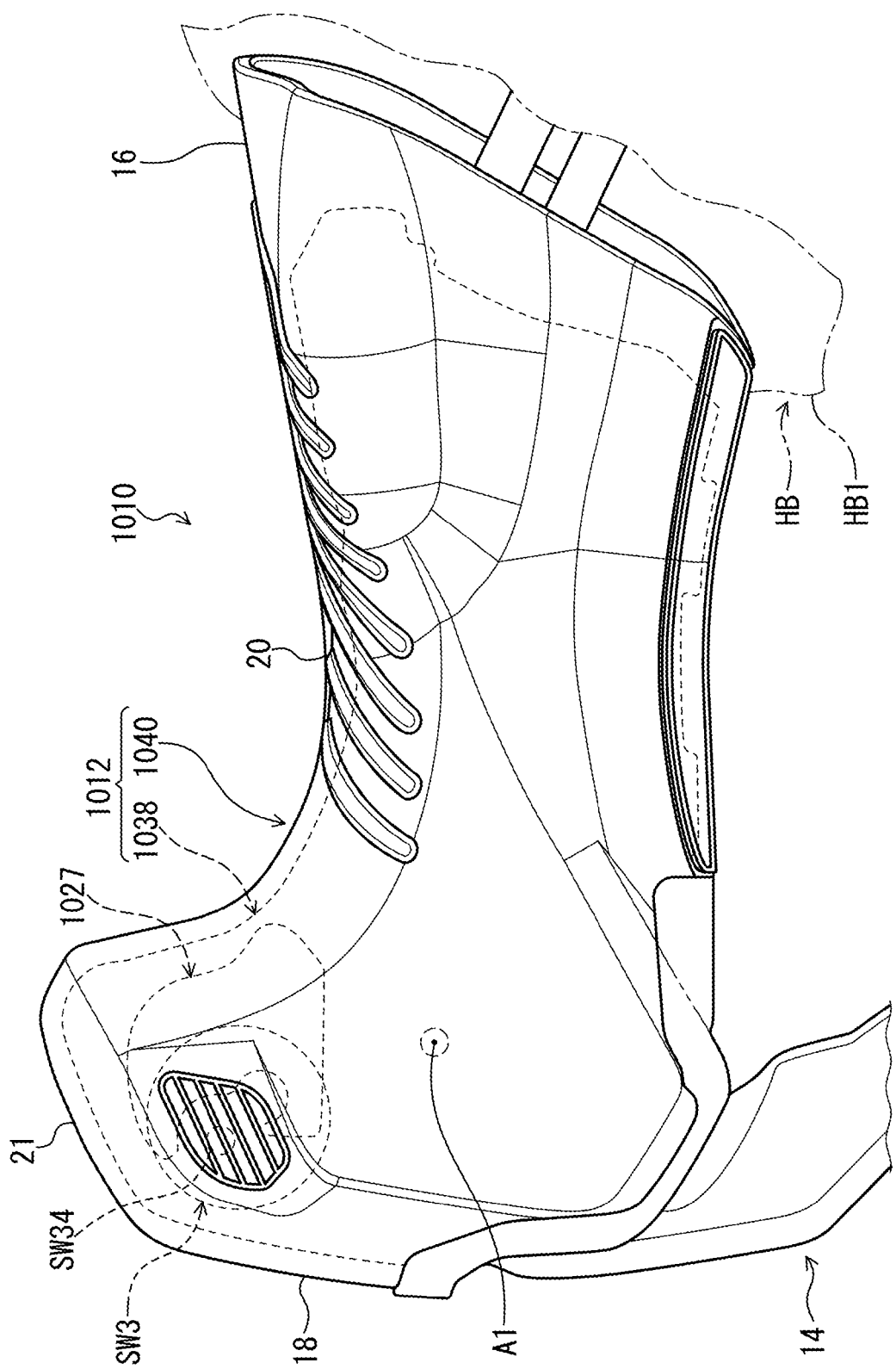
FIG. 44 is a side elevational view of an operating device in accordance with the tenth embodiment.

As seen in FIG. 44, the operating device 1010 comprises a base member 1012 and the operating member 14. The base member 1012 has substantially the same structure as the structure of the base member 12 of the first embodiment. The base member 1012 includes the first end portion 16, the second end portion 18, and the grip portion 20. The operating member 14 is pivotally coupled to the base member 1012 about the pivot axis A1. The base member 1012 for the operating device 1010 includes a base body 1038 and a grip cover 1040. The grip cover 1040 is configured to be attached to the base body 1038 to at least partly cover the base body 1038. The base body 1038 has substantially the same structure as the structure of the base body 38 of the first embodiment. The grip cover 1040 has substantially the same structure as the structure of the grip cover 40 of the first embodiment.

Figure 45:
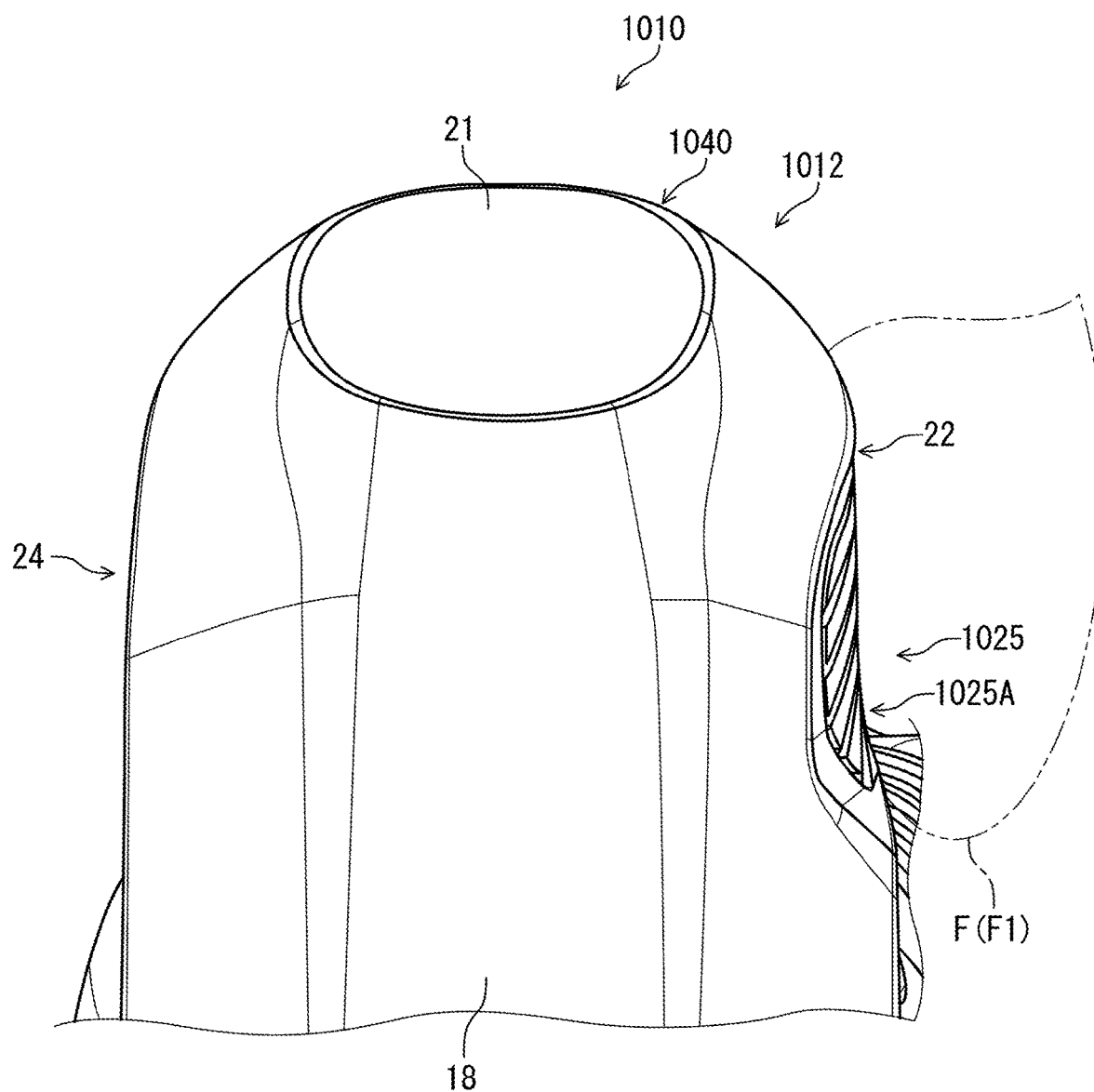
FIG. 45 is a front view of the operating device illustrated in FIG. 44.

As seen in FIG. 45, the base member 1012 includes the first lateral surface 22 and the second lateral surface 24. The base member 1012 includes a positioning portion 1025 provided at the second end portion 18. The positioning portion 1025 is provided on the first lateral surface 22. The positioning portion 1025 includes a positioning recess 1025A configured to position a rider's finger. The positioning recess 1025A is provided on the first lateral surface 22. As seen in FIG. 4, examples of the finger include a thumb, an index finger, a middle finger, a ring finger, and a little finger. Namely, the rider's finger can also be referred to as a digit of the rider's hand.

Figure 46:
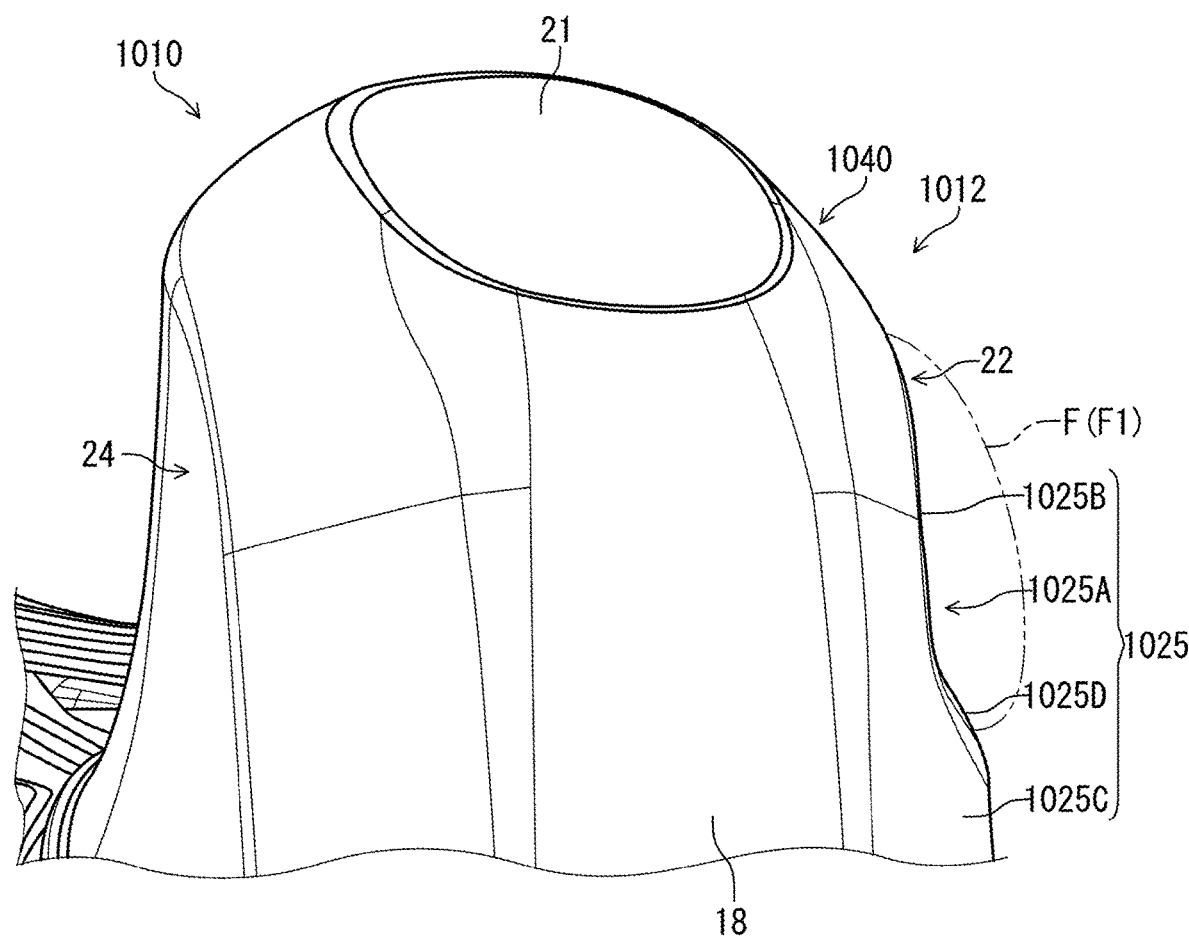
FIG. 46 is a perspective view of the operating device illustrated in FIG. 44.

As seen in FIG. 46, the positioning portion 1025 includes a positioning lateral surface 1025B and a wall portion 1025C. The wall portion 1025C protrudes from the positioning lateral surface 1025B to provide the positioning recess 1025A. The wall portion 1025C includes a receiving surface 1025D extending from the positioning lateral surface 1025B. The receiving surface 1025D is inclined relative to the positioning lateral surface 1025B. The positioning lateral surface 1025B and the receiving surface 1025D define the positioning recess 1025A. The positioning lateral surface 1025B and the receiving surface 1025D are configured to contact the rider's finger F (e.g., a thumb).

Figure 47:
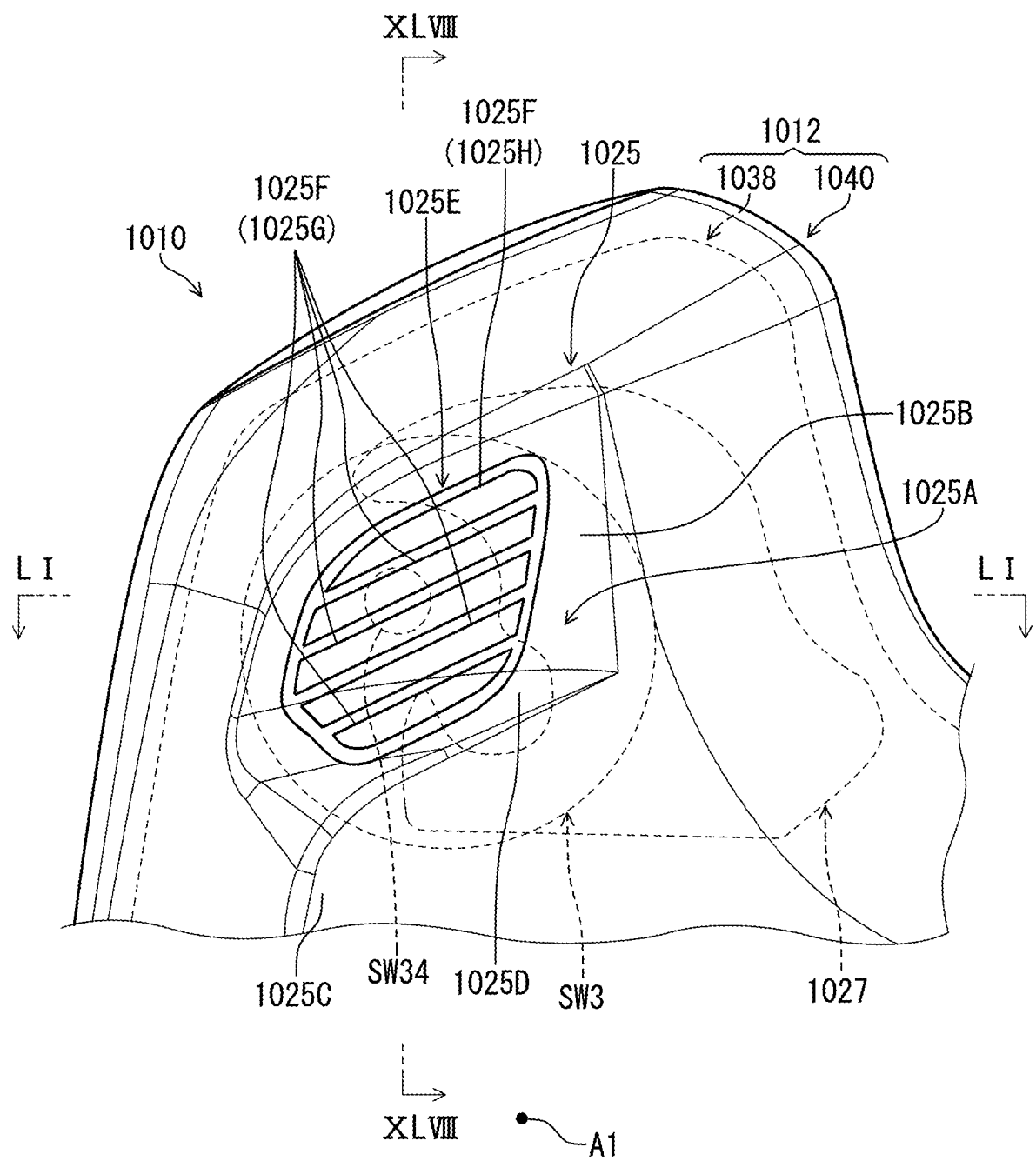
FIG. 47 is a partial side elevational view of the operating device illustrated in FIG. 44.

As seen in FIG. 47, the positioning portion 1025 includes an indicator 1025E configured to indicate a position of the positioning portion 1025. The indicator 1025E includes a pattern. In this embodiment, the indicator 1025E is provided on the positioning lateral surface 1025B and the receiving surface 1025D. However, the arrangement of the indicator 1025E is not limited to this embodiment.

Figure 48:
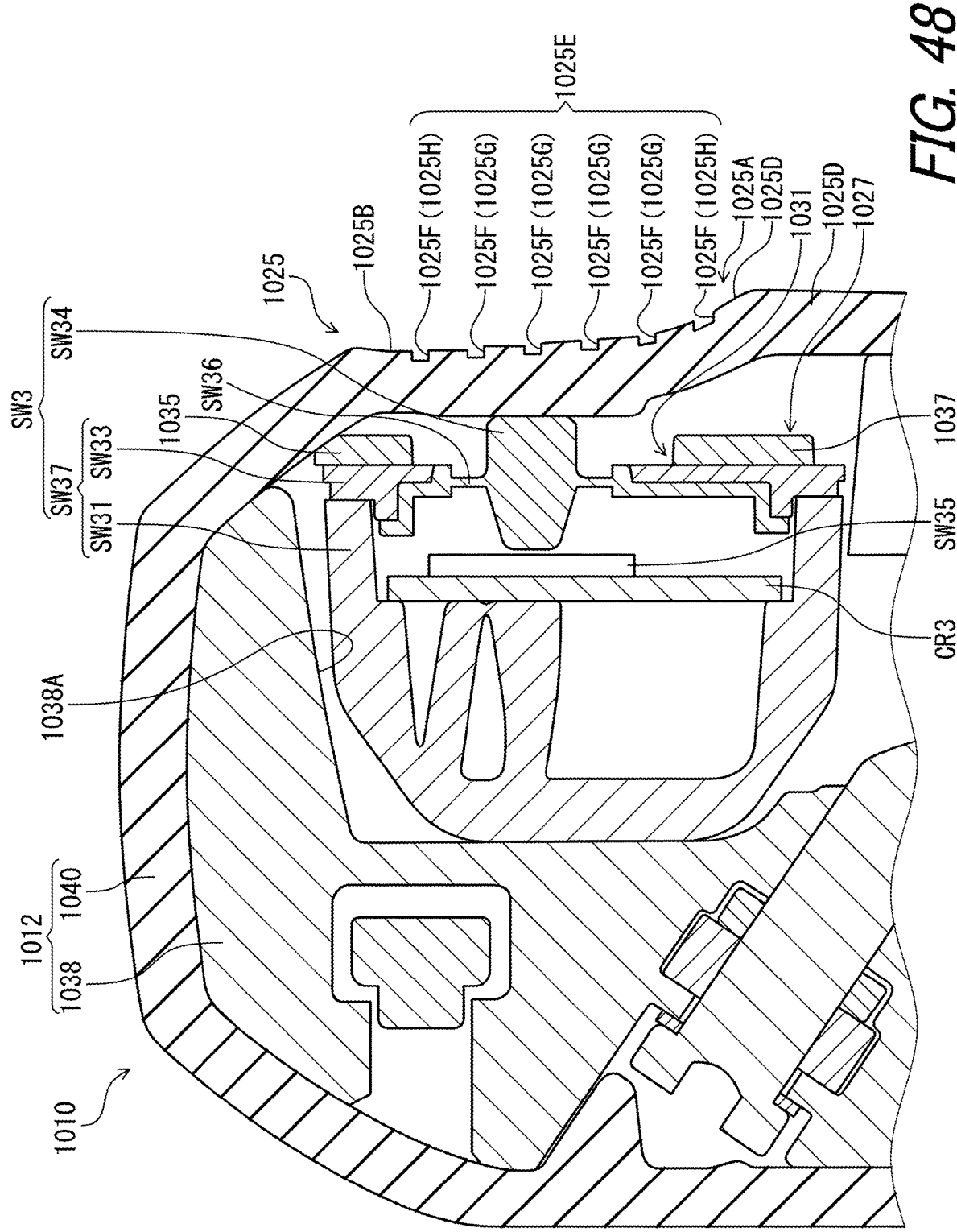
FIG. 48 is a cross-sectional view of the operating device taken along line XLVIII-XLVIII of FIG. 47.

As seen in FIG. 48, the indicator 1025E includes at least one groove. In this embodiment, the indicator 1025E includes a plurality of grooves 1025F. As seen in FIG. 47, the plurality of grooves 1025F includes a plurality of straight grooves 1025G and an annular groove 1025H. The plurality of straight grooves 1025G is provided in the annular groove 1025H. However, the structure of the indicator 1025E is not limited to this embodiment.

Figure 49:
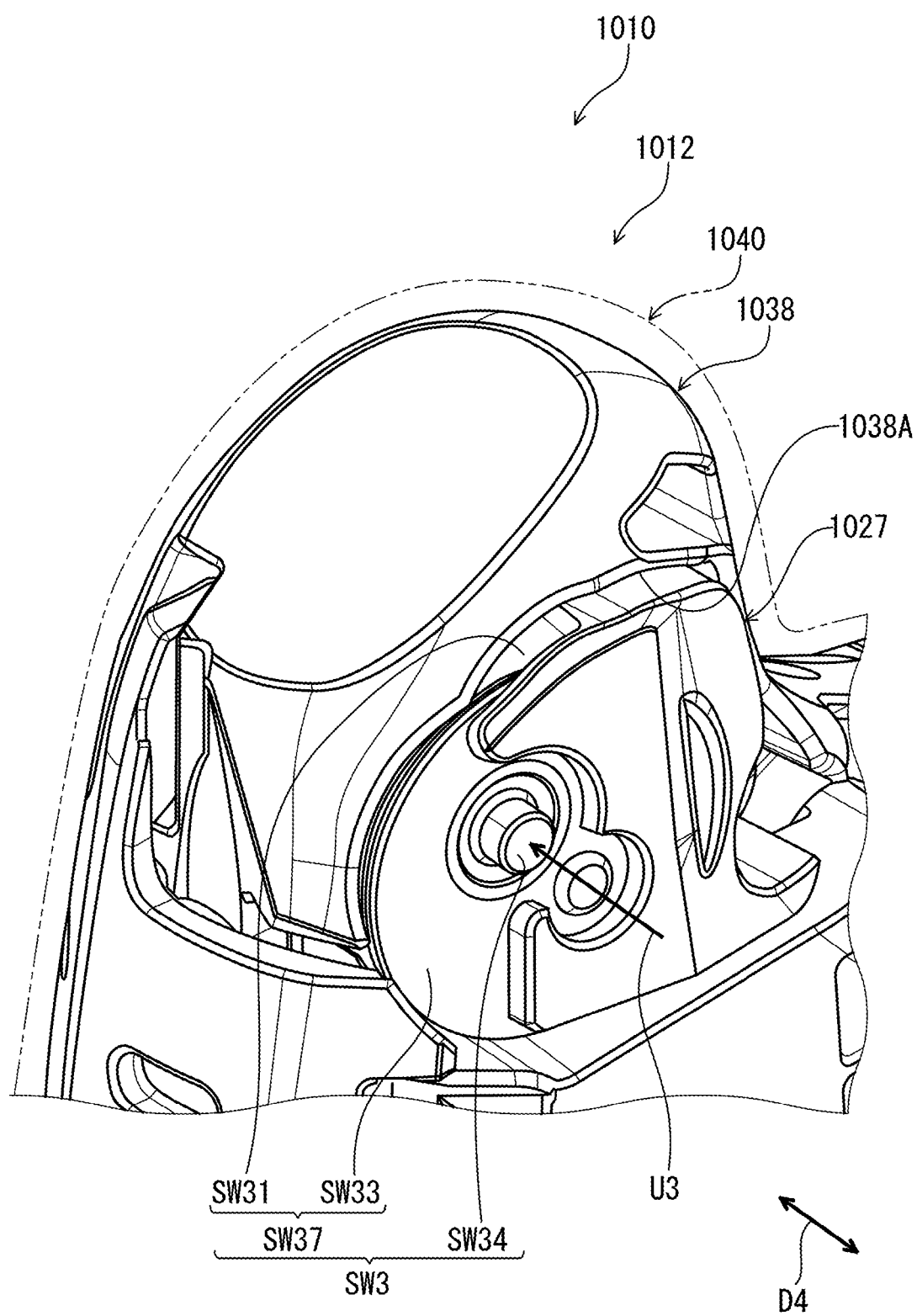
FIG. 49 is another perspective view of the operating device illustrated in FIG. 44, with a grip cover omitted.

As seen in FIG. 49, the operating device 1010 comprises the user operating portion SW34. The user operating portion SW34 is configured to receive the user input U3 and provided at the second end portion 18 of the base member 1012. The user operating portion SW34 is mounted to the base body 1038 of the base member 1012. In this embodiment, the operating device 1010 comprises the electrical switch SW3. The electrical switch SW3 includes the user operating portion SW34 and the switch base SW37 attached to the base member 1012. The switch base SW37 includes the switch holder SW31 and the base plate SW33 described in the first embodiment. The user operating portion SW34 is movable relative to the switch base SW37 in the operation direction D4. The user operating portion SW34 is configured to be operated by a user. However, the electrical switch SW3 can be omitted from the operating device 1010.

Figure 50:
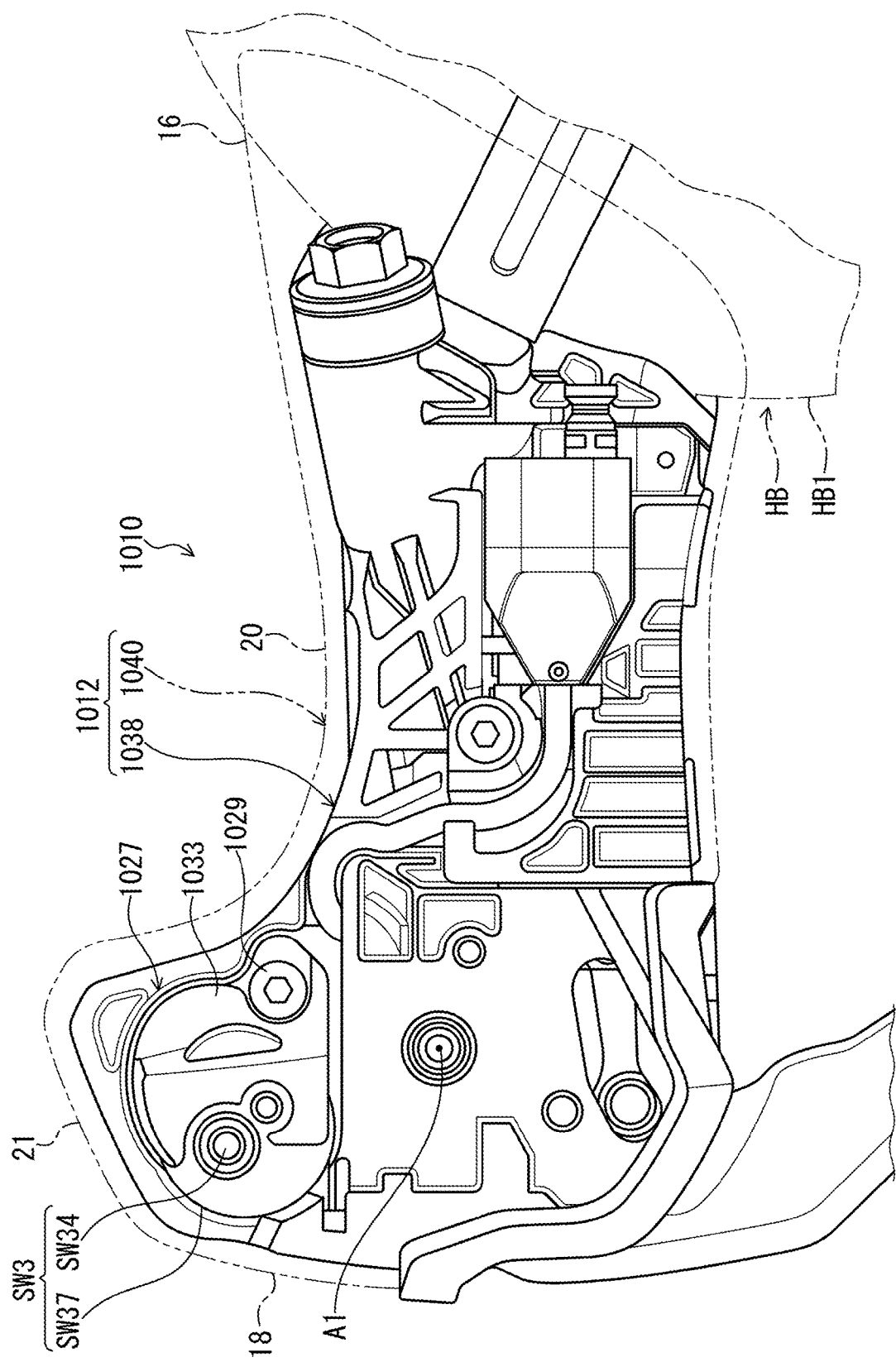
FIG. 50 is another side elevational view of the operating device illustrated in FIG. 44, with a grip cover omitted.

As seen in FIG. 50, the operating device 1010 comprises a restriction member 1027. The restriction member 1027 is at least partly provided, as viewed along the pivot axis A1, between the user operating portion SW34 and the first end portion 16 of the base member 1012 to restrict unintentional access to the user operating portion SW34. The restriction member 1027 is at least partly provided, as viewed along the pivot axis A1, between the user operating portion SW34 and the first end portion 16 of the base member 1012 to restrict a user's hand from accessing the user operating portion SW34. The restriction member 1027 is at least partly provided, as viewed along the pivot axis A1, between the user operating portion SW34 and the first end portion 16 of the base member 1012 to restrict the user's hand provided on the grip portion 20 from accessing the user operating portion SW34. The term "accessing" or "access" as used herein can encompass operating of the user operating portion SW34.

Figure 51:
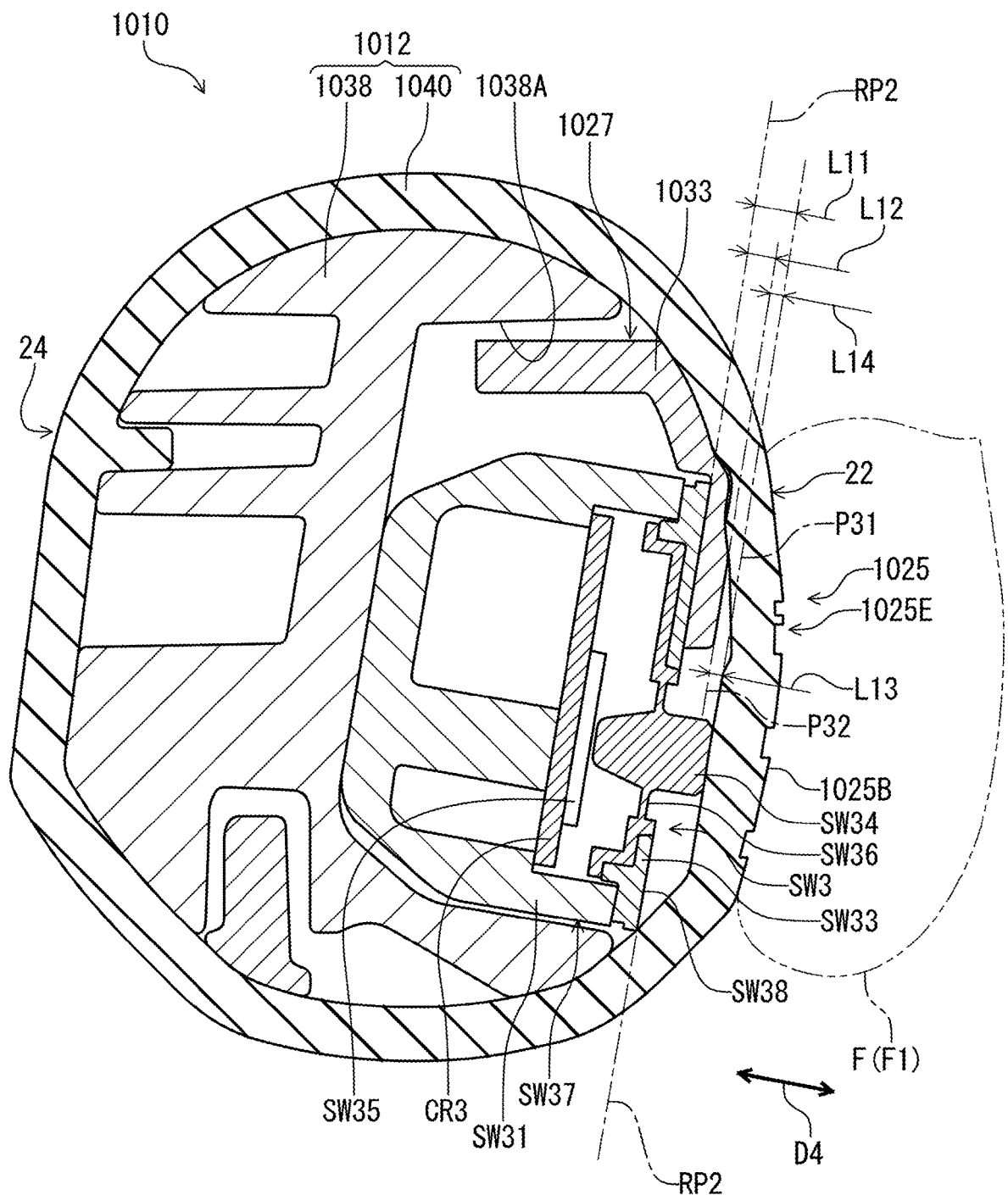
FIG. 51 is a cross-sectional view of the operating device taken along line LI-LI of FIG. 47.

As seen in FIG. 51, the user operating portion SW34 and the restriction member 1027 are provided closer to one of the first lateral surface 22 and the second lateral surface 24 than to the other of the first lateral surface 22 and the second lateral surface 24. In this embodiment, the user operating portion SW34 and the restriction member 1027 are provided closer to the first lateral surface 22 than the second lateral surface 24. However, the user operating portion SW34 and the restriction member 1027 can be provided closer to the second lateral surface 24 than to the first lateral surface 22.

Figure 52:
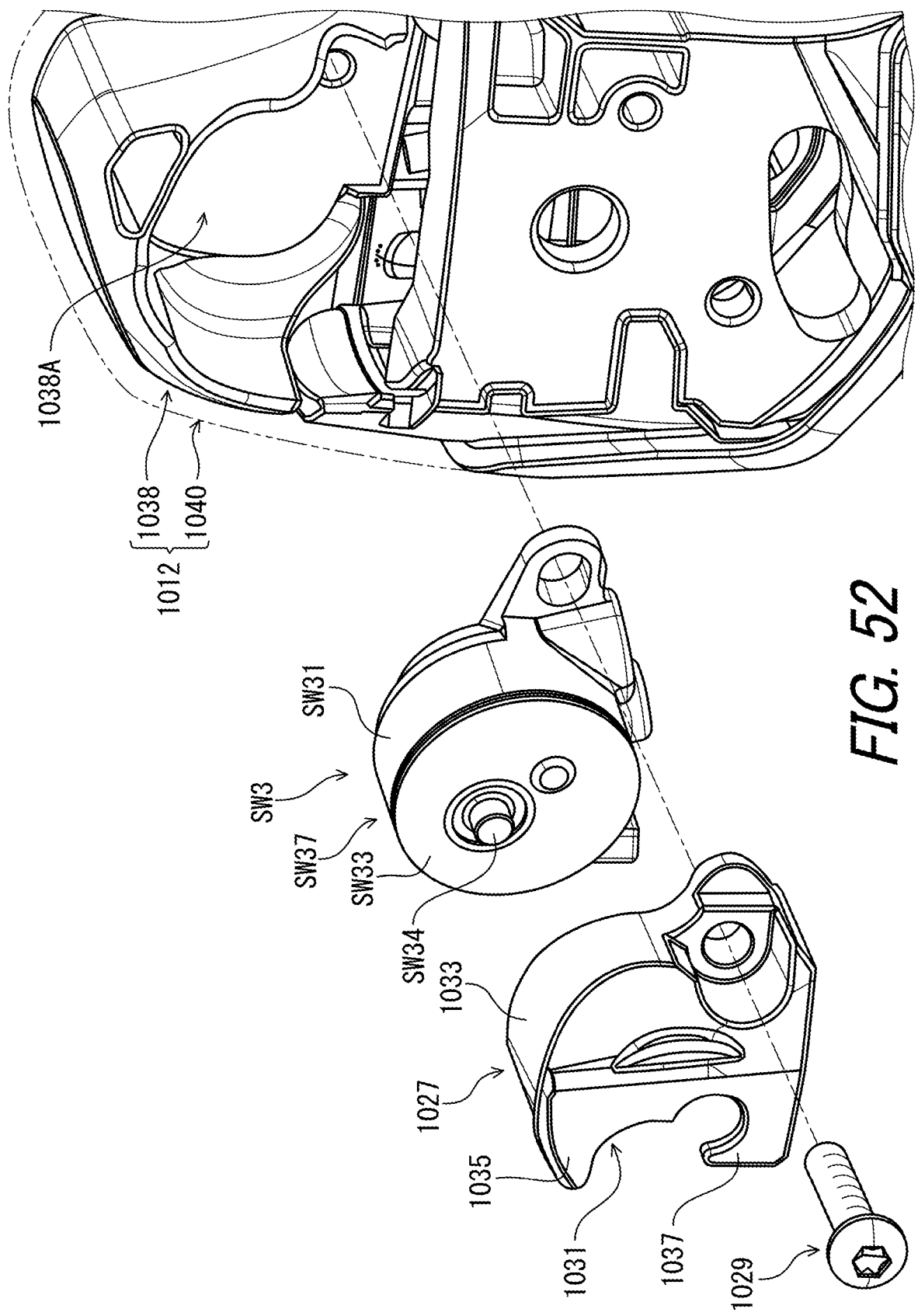
FIG. 52 is an exploded perspective view of the operating device illustrated in FIG. 44.

As seen in FIG. 52, the restriction member 1027 is detachably attached to the base member 1012. The restriction member 1027 is detachably attached to the base member 1012 without substantial damages. The restriction member 1027 is attached to the base member 1012 with a fastener 1029. However, the restriction member 1027 can be attached to the base member 1012 with other securing structures such as an adhesive agent, snap-fitting, and press-fitting.

The electrical switch SW3 is detachably attached to the base member 1012. In this embodiment, the electrical switch SW3 is detachably attached to the base member 1012 without substantial damages. The electrical switch SW3 and the restriction member 1027 are detachably attached to the base member 1012 with the fastener 1029. However, the electrical switch SW3 can be attached to the base member 1012 with securing structures such as an adhesive agent, snap-fitting, and press-fitting.

The base body 1038 includes an accommodation recess 1038A provided at the second end portion 18. The electrical switch SW3 is provided in the accommodation recess 1038A. The switch base SW37 is provided in the accommodation recess 1038A. The restriction member 1027 is provided in the accommodation recess 1038A. However, the accommodation recess 1038A can be omitted from the base body 1038.

As seen in FIG. 51, the user operating portion SW34 is movable relative to the base member 1012 in the operation direction D4 and protrudes relative to a reference plane RP2 in the operation direction D4. The restriction member 1027 protrudes relative to the reference plane RP2 in the operation direction D4. The restriction member 1027 protrudes relative to the switch base SW37 in the operation direction D4. The switch base SW37 defines the reference plane RP2. The switch base SW37 includes an outer surface SW38 facing in the operation direction D4. The outer surface SW38 defines the reference plane RP2. The reference plane RP2 is perpendicular to the operation direction D4. However, other parts of the electrical switch SW3 can define the reference plane RP2.

The user operating portion SW34 has a first length L11 defined from the reference plane RP2 in the operation direction D4. The restriction member 1027 has a second length L12 defined from the reference plane RP2 in the operation direction D4. In this embodiment, the first length L11 is larger than the second length L12. However, the first length L11 can be equal to or smaller than the second length L12.

The user operating portion SW34 is movable relative to the reference plane RP2 in the operation direction D4 by an operation stroke L13. The user operating portion SW34 is movable relative to the reference plane RP2 in the operation direction D4 from a rest position P31 to an operated position P32. The electrical switch SW3 is turned off in a state where the user operating portion SW34 is in the rest position P31. The electrical switch SW3 is turned on in a state where the user operating portion SW34 is in the operated position P32. The operation stroke L13 is defined from the rest position P31 to the operated position P32.

In this embodiment, the operation stroke L13 is equal to or larger than a difference L14 between the first length L11 and the second length L12. The operation stroke L13 is larger than the difference L14 between the first length L11 and the second length L12. However, the operation stroke L13 can be equal to or smaller than the difference L14 between the first length L11 and the second length L12.

The grip cover 1040 is configured to at least partly cover the restriction member 1027 in a state where the grip cover 1040 is attached to the base body 1038. In this embodiment, the grip cover 1040 is configured to entirely cover the restriction member 1027 in the state where the grip cover 1040 is attached to the base body 1038. However, the grip cover 1040 can be configured to partly cover the restriction member 1027 in the state where the grip cover 1040 is attached to the base body 1038.

The restriction member 1027 is a separate member from the grip cover 1040. The restriction member 1027 is a separate member from the base member 1012. The restriction member 1027 is a separate member from the switch base SW37. However, the restriction member 1027 can be integrally provided with the switch base SW37 as a one-piece unitary member. The restriction member 1027 can be integrally provided with the grip cover 1040 as a one-piece unitary member.

Figure 53:
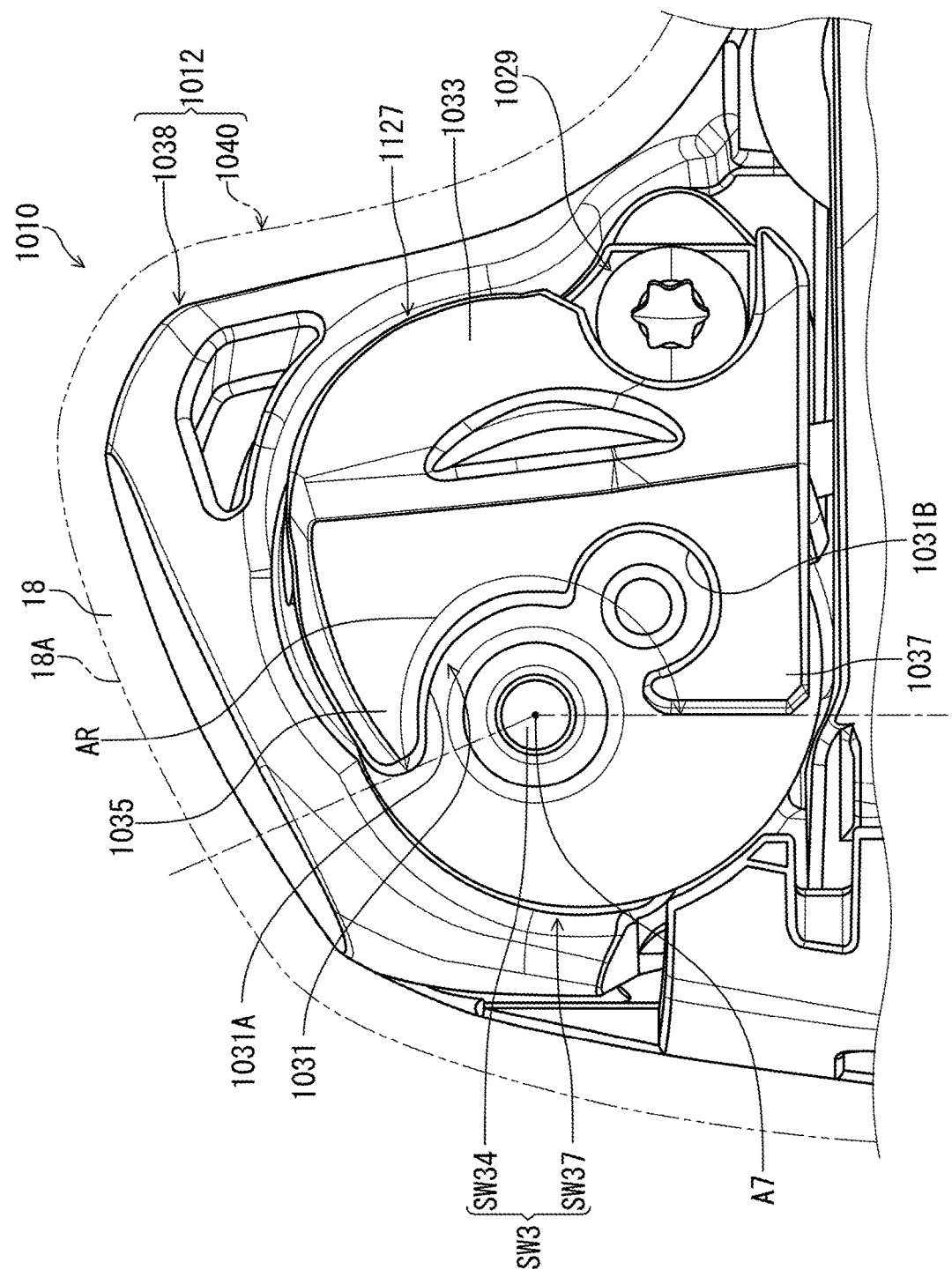
FIG. 53 is a partial side elevational view of the operating device illustrated in FIG. 44, with a grip cover omitted.

As seen in FIG. 53, the restriction member 1027 includes an opening 1031. The user operating portion SW34 is provided in the opening 1031. In this embodiment, the opening 1031 includes a notch 1031A and an additional notch 103 1B. The user operating portion SW34 is provided in the notch 1031A. However, the opening 1031 can include other structures such as a hole and a recess. The shape of the opening 1031 is not limited to this embodiment.

As seen in FIG. 52, the restriction member 1027 includes a restriction body 1033. The restriction body 1033 is attached to the base member 1012. The restriction body 1033 is attached to the base body 1038 with the fastener 1029. As seen in FIG. 50, the restriction body 1033 is provided, as viewed along the pivot axis A1, between the user operating portion SW34 and the first end portion 16 of the base member 1012.

As seen in FIG. 53, the restriction member 1027 includes a first extending portion 1035 extending from the restriction body 1033. The second end portion 18 includes a surface 18A provided at an upper side of the second end portion 18 in a mounting state where the base member 1012 is mounted to the handlebar HB (see e.g., FIG. 44). The first extending portion 1035 is provided between the surface 18A of the second end portion 18 and the user operating portion SW34 as viewed along the pivot axis A1. The restriction member 1027 includes a second extending portion 1037 extending from the restriction body 1033. The user operating portion SW34 is provided between the first extending portion 1035 and the second extending portion 1037 as viewed along the pivot axis A1. However, the positional relationship among the user operating portion SW34, the first extending portion 1035, and the second extending portion 1037 is not limited to this embodiment.

As seen in FIG. 53, the user operating portion SW34 includes a center axis A7 extending in the operation direction D4. The first extending portion 1035 and the second extending portion 1037 define an angular range AR about the center axis A7 of the user operating portion SW34 as viewed in the operation direction D4. The restriction body 1033 is provided in the angular range AR as viewed in the operation direction D4. In this embodiment, the angular range AR is larger than 90 degrees. The angular range AR is preferably larger than 120 degrees. The angular range AR is preferably larger than 180 degrees. However, the angular range AR is not limited to this embodiment and the above ranges.

As seen in FIG. 47, the user operating portion SW34 is at least partly provided in an area corresponding to the positioning portion 1025 as viewed along the pivot axis A1. The user operating portion SW34 is at least partly provided in an area corresponding to the positioning lateral surface 1025B as viewed along the pivot axis A1. The user operating portion SW34 is at least partly provided in an area corresponding to the indicator 1025E as viewed along the pivot axis A1.

The restriction member 1027 is at least partly provided in the area corresponding to the positioning portion 1025 as viewed along the pivot axis A1. The restriction member 1027 is at least partly provided in the area corresponding to the positioning lateral surface 1025B as viewed along the pivot axis A1. The restriction member 1027 is at least partly provided in the area corresponding to the indicator 1025E as viewed along the pivot axis A1.

As seen in FIG. 51, the user operating portion SW34 is operated in the operation direction D4 by the user's hand (e.g., the user's finger F such as the thumb F1) through the grip cover 1040.

Figure 54:
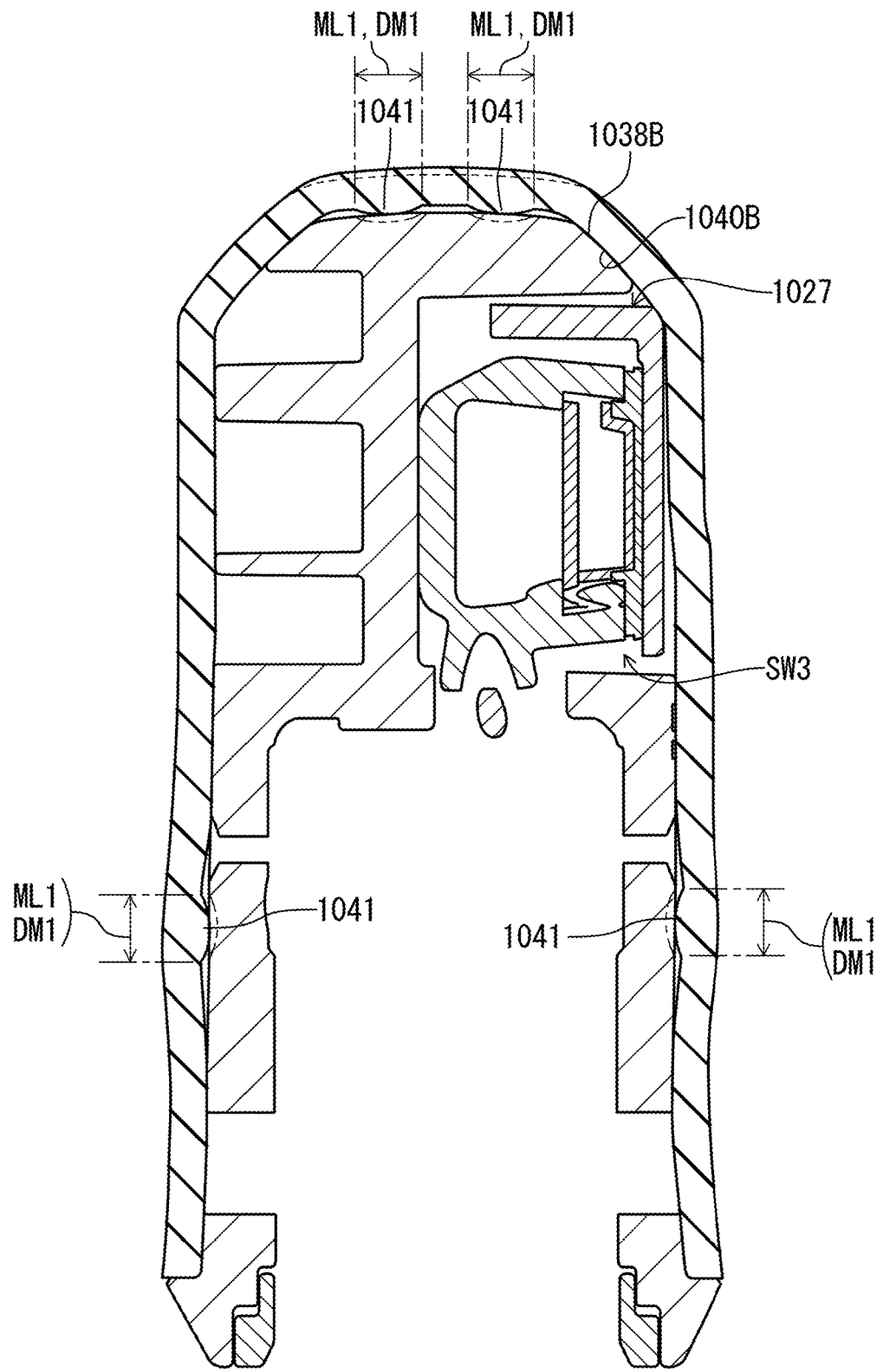
FIG. 54 is a cross-sectional view of the operating device illustrated in FIG. 44.

As seen in FIG. 54, the base body 1038 includes a base outer surface 1038B. The grip cover 1040 includes a cover inner surface 1040B. The cover inner surface 1040B is configured to face the base outer surface 1038B in the state where the grip cover 1040 is attached to the base body 1038. The base member 1012 comprises a plurality of convex parts 1041. At least two convex parts of the plurality of convex parts 1041 are provided on at least one of the base outer surface 1038B and the cover inner surface 1040B. In this embodiment, the plurality of convex parts 1041 is provided on the cover inner surface 1040B. However, the plurality of convex parts 1041 can be provided on the base outer surface 1038B. At least two convex parts 1041 of the plurality of convex parts 1041 can be provided on the cover inner surface 1040B, and the remaining of the plurality of convex parts 1041 can be provided on the base outer surface 1038B.

As seen in FIGS. 55 to 58, the at least two convex parts of the plurality of convex parts 1041 are arranged in a predetermined pattern. The plurality of convex parts 1041 is spaced apart from each other. One convex part of the plurality of convex parts 1041 has substantially the same shape as the shape of another convex part of the plurality of convex parts 1041. The cover inner surface 1040B includes a first cover inner surface 1040D, a second cover inner surface 1040E, a third cover inner surface 1040F, and a fourth cover inner surface 1040G. The plurality of convex parts 1041 includes a plurality of first convex parts 1041D, a plurality of second convex parts 1041E, a third convex parts 1041C, and a fourth convex parts 1041D. The plurality of first convex parts 1041D is provided on the first cover inner surface 1040D. The plurality of second convex parts 1041E is provided on the second cover inner surface 1040E. The plurality of third convex parts 1041F is provided on the third cover inner surface 1040F. The plurality of fourth convex parts 1041G is provided on the fourth cover inner surface 1040G.

Figure 55:
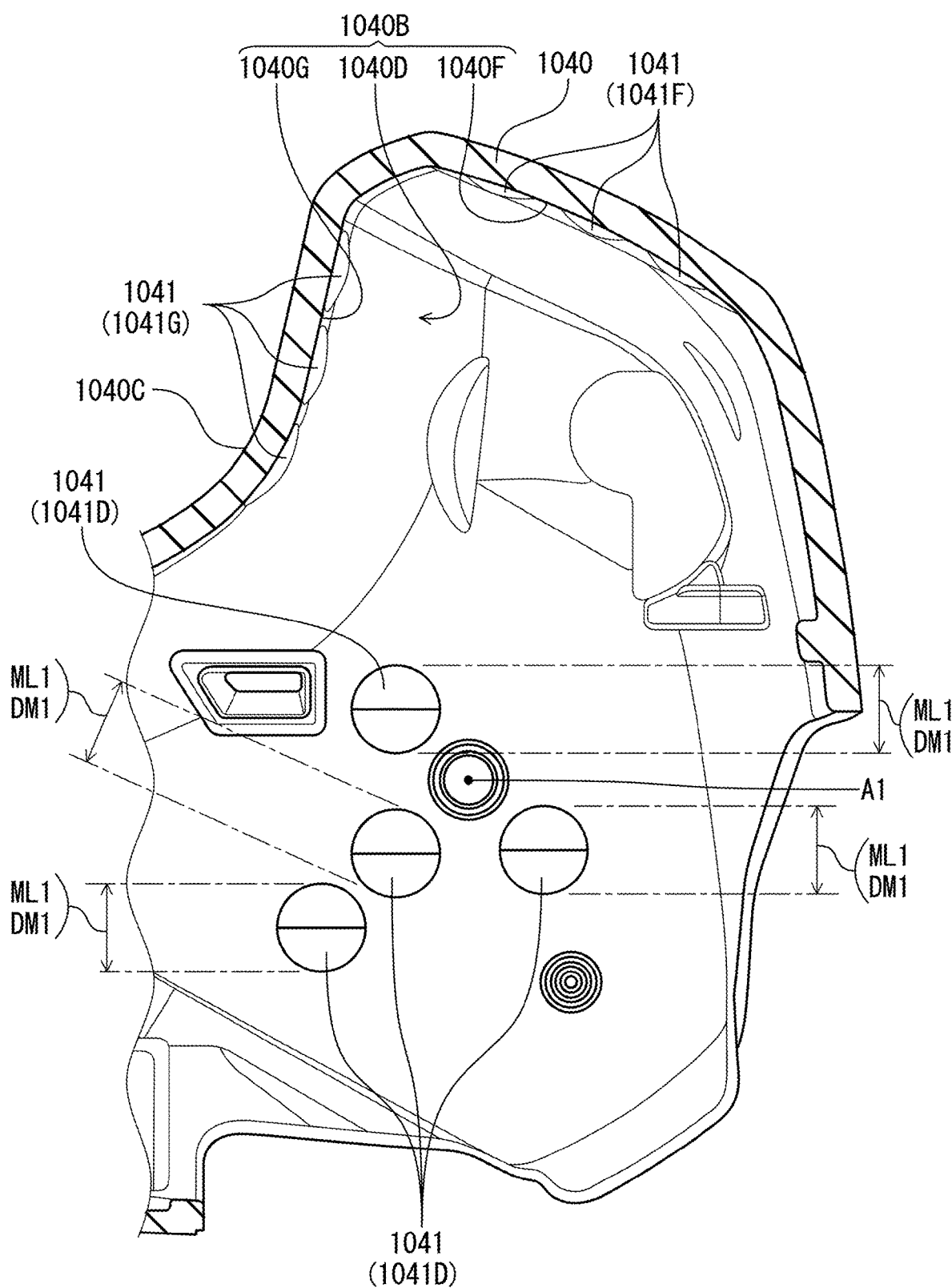
FIG. 55 is a cross-sectional view of the grip cover of the operating device illustrated in FIG. 44.
Figure 56:
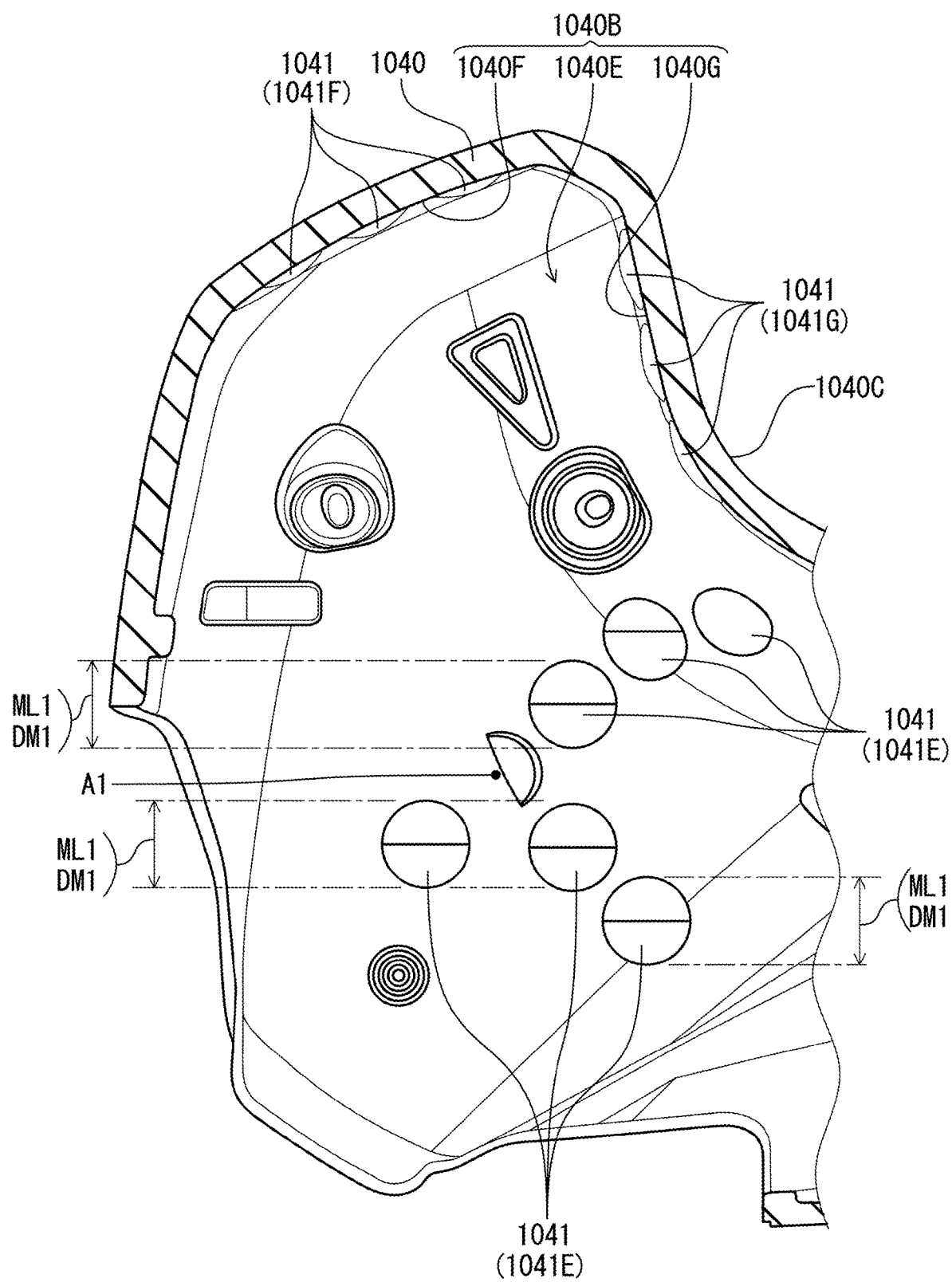
FIG. 56 is another cross-sectional view of the grip cover of the operating device illustrated in FIG. 44.
Figure 57:
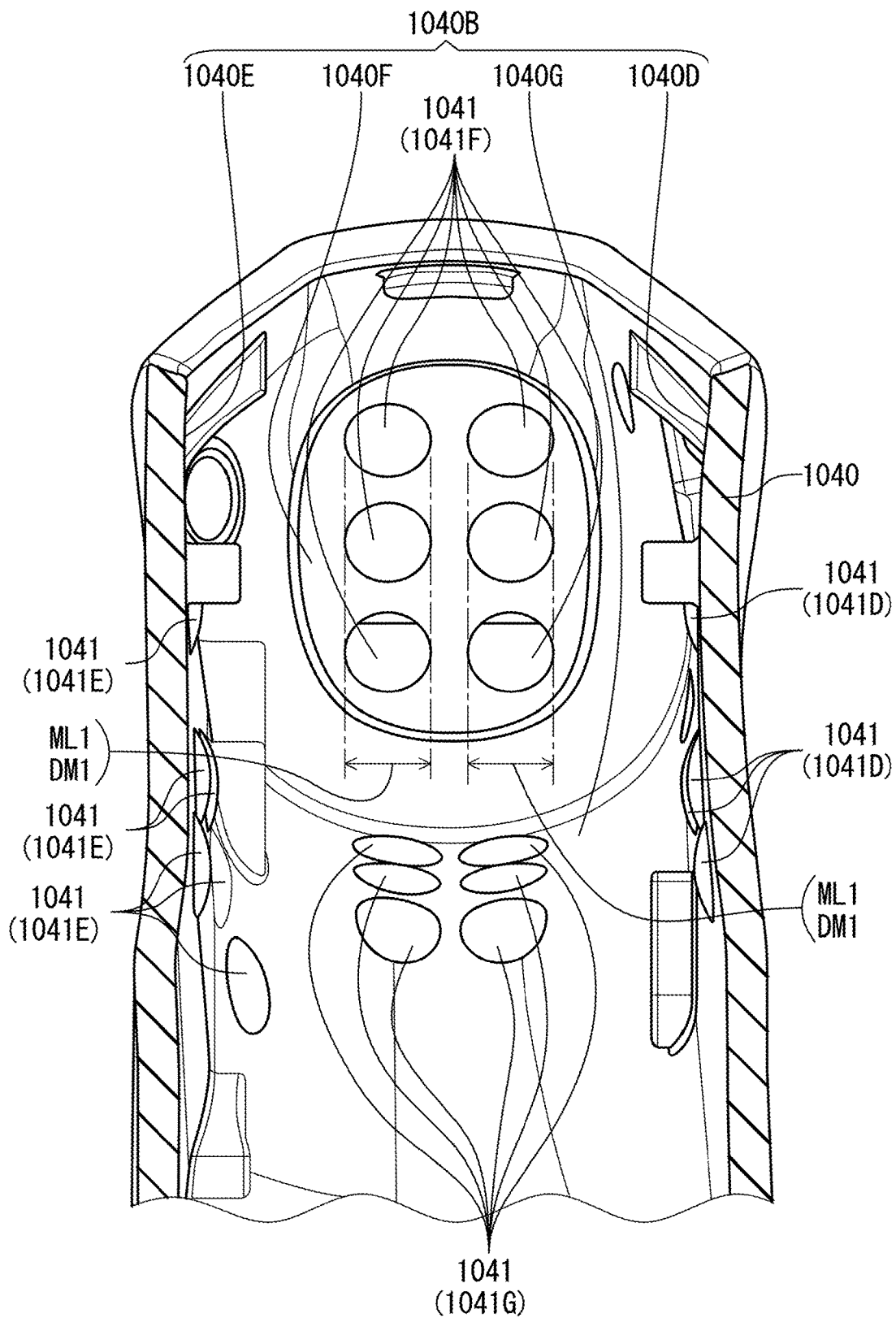
FIG. 57 is another cross-sectional view of the grip cover of the operating device illustrated in FIG. 44.
Figure 58:
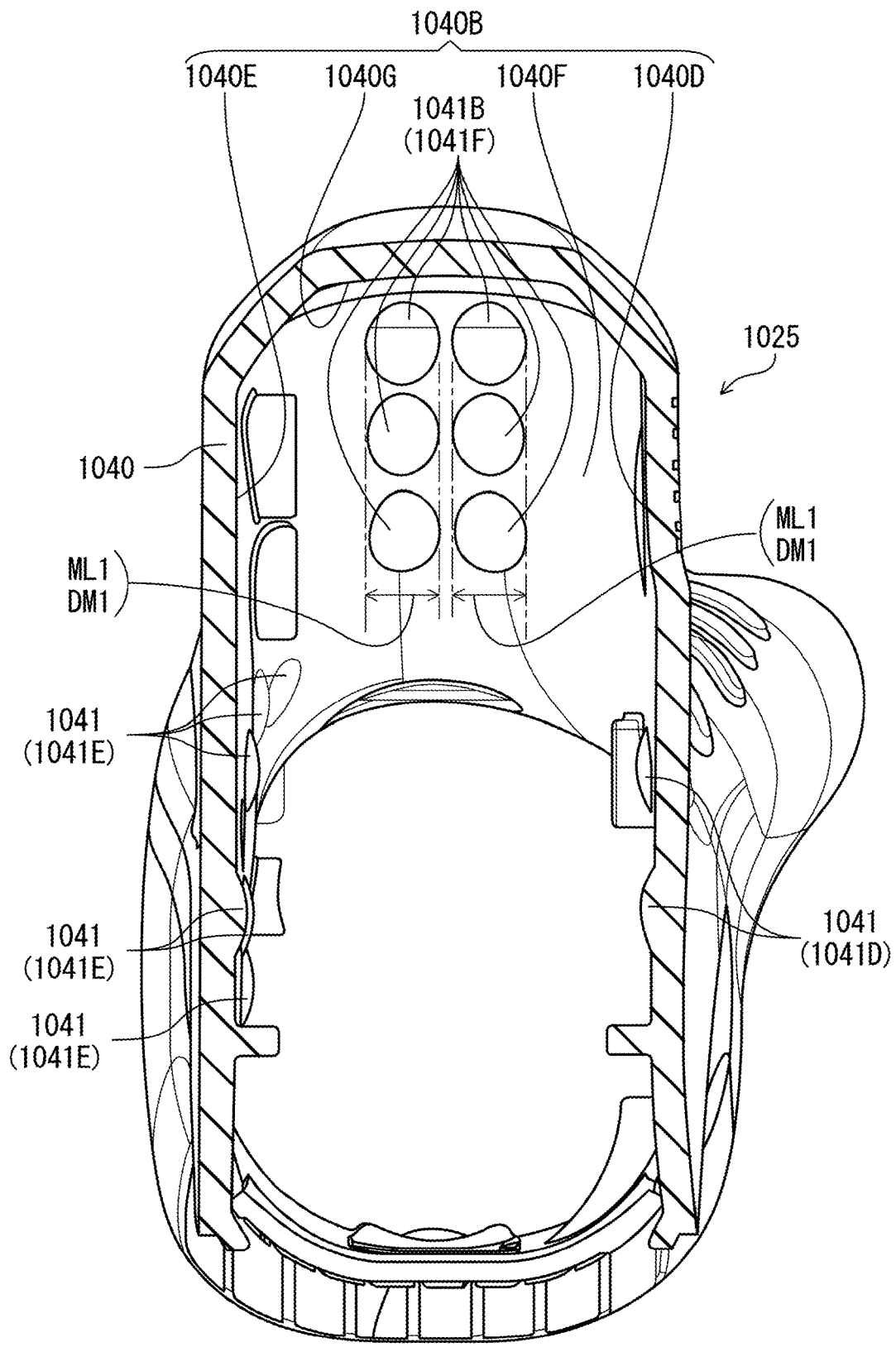
FIG. 58 is another cross-sectional view of the grip cover of the operating device illustrated in FIG. 44.

As seen in FIG. 55, at least two of the plurality of first convex parts 1041D are provided about the pivot axis A1. As seen in FIG. 56, at least two of the plurality of second convex parts 1041E are provided about the pivot axis A1. In this embodiment, the predetermined pattern includes a linear arrangement. As seen in FIG. 57, at least three convex parts of the plurality of third convex parts 1041F are arranged in a linear arrangement. As seen in FIG. 58, at least three convex parts of the plurality of fourth convex parts 1041G are arranged in a linear arrangement. However, the predetermined pattern is not limited to this embodiment.

Figure 59:
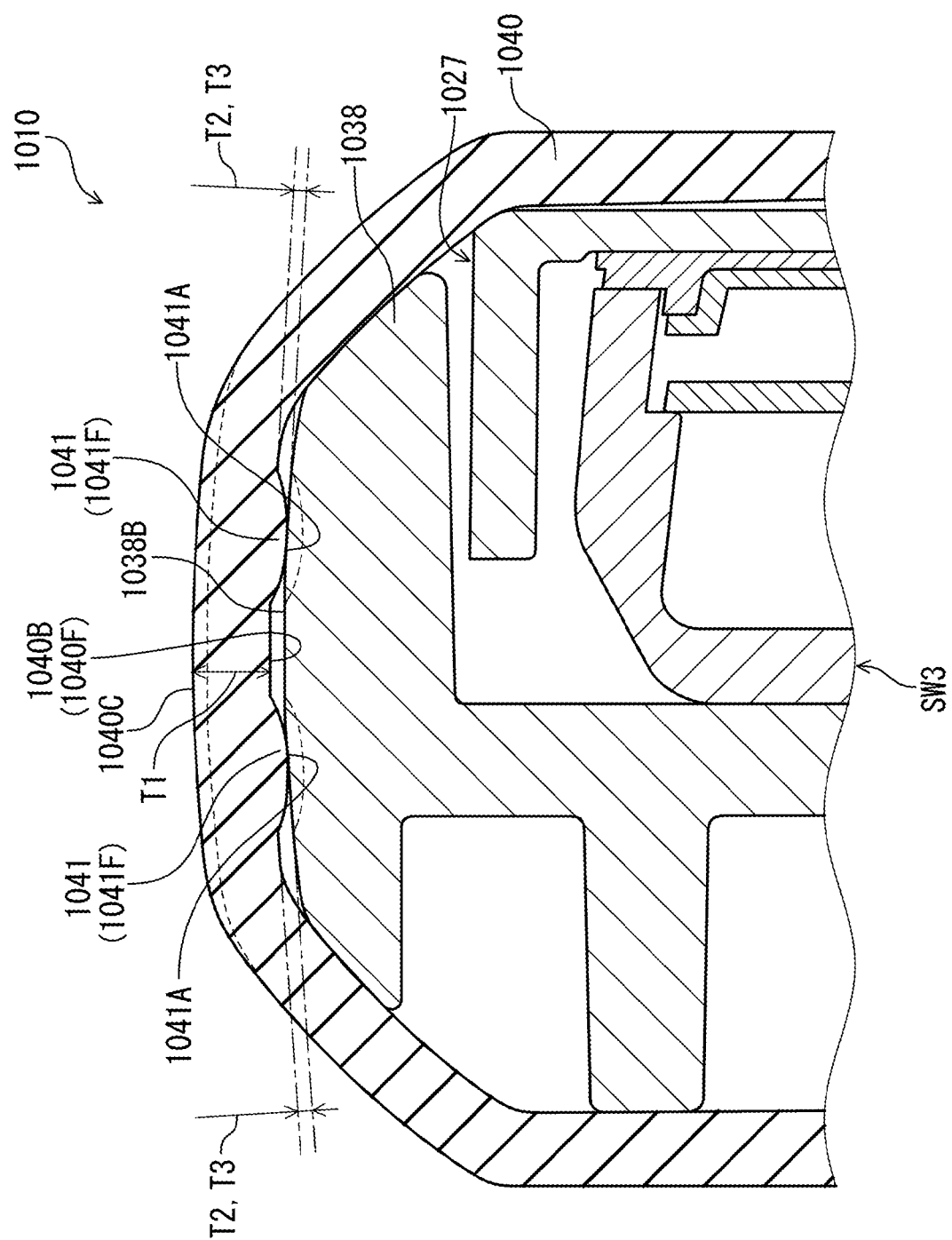
FIG. 59 is an enlarged cross-sectional view of the operating device illustrated in FIG. 44.

As seen in FIG. 59, the grip cover 1040 includes a cover outer surface 1040C. The grip cover 1040 has a thickness T1 defined from the cover inner surface 1040B to the cover outer surface 1040C. The plurality of convex parts 1041 has a height T2 defined from the cover inner surface 1040B of the grip cover 1040. The height T2 is equal to or smaller than the thickness T1 of the grip cover 1040. In this embodiment, the height T2 includes a maximum height T3. The maximum height T3 is equal to or larger than 0.5 mm. However, the maximum height T3 is not limited to this range.

As seen in FIGS. 55 to 58, each of the plurality of convex parts 1041 has a curved profile. As seen in FIG. 54, in this embodiment, the curved profile has a maximum length ML1 defined along the cover inner surface 1040B. As seen in FIGS. 55 to 58, each of the plurality of convex parts 1041 has a circular profile. The maximum length ML1 is a diameter DM1 of the curved profile or the circular profile. The height T2 is smaller than the diameter DM1 of the curved profile. The height T2 is smaller than the diameter DM1 of the circular profile. Each of the plurality of convex parts 1041 includes a curved convex surface 1041A. For example, the curved convex surface 1041A constitutes a part of a spherical surface. The height T2 is smaller than a curvature radius of the curved convex surface 1041A. However, the shape of the convex part 1041 is not limited to this embodiment.

As seen in FIGS. 54 and 59, the grip cover 1040 is elastically deformed in the state where the grip cover 1040 is attached to the base body 1038 because the plurality of convex parts 1041 are in contact with the base body 1038. Thus, the plurality of convex parts 1041 can increase tightness of the grip cover 1040 so as to fit the grip cover 1040 firmly relative to the base body 1038.

Eleventh Embodiment

An operating device 1110 in accordance with an eleventh embodiment will be described below referring to FIGS. 60 and 61. The operating device 1110 has the same structure as that of the operating device 1010 except for the electrical switch SW3 and the restriction member 1027. Thus, elements having substantially the same function as those in the above embodiments will be numbered the same here and will not be described and/or illustrated again in detail here for the sake of brevity.

Figure 60:
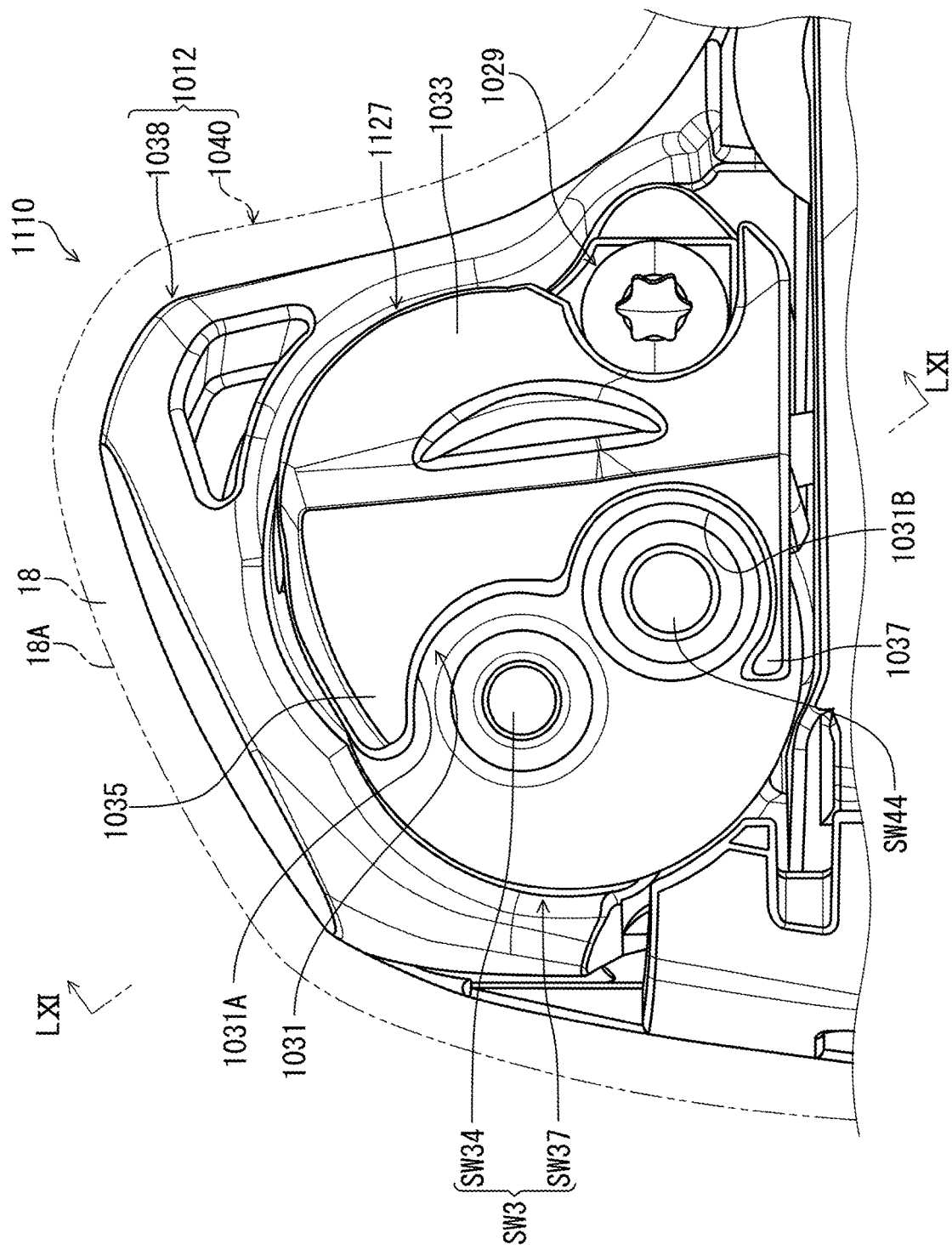
FIG. 60 is a partial side elevational view of an operating device in accordance with an eleventh embodiment, with a grip cover omitted.

As seen in FIG. 60, the operating device 1110 comprises the base member 1012. The operating device 1110 further comprises an additional user operating portion SW44. The additional user operating portion SW44 is configured to receive an additional user input and provided at the second end portion 18 of the base member 1012. The additional user operating portion SW44 is spaced apart from the user operating portion SW34.

The operating device 1010 comprises a restriction member 1127. The restriction member 1127 has substantially the same structure as the structure of the restriction member 1027 of the tenth embodiment. The restriction member 1127 is configured to restrict unintentional access to the additional user operating portion SW44. The restriction member 1127 is configured to restrict the user's hand from accessing the additional user operating portion SW44.

Figure 61:
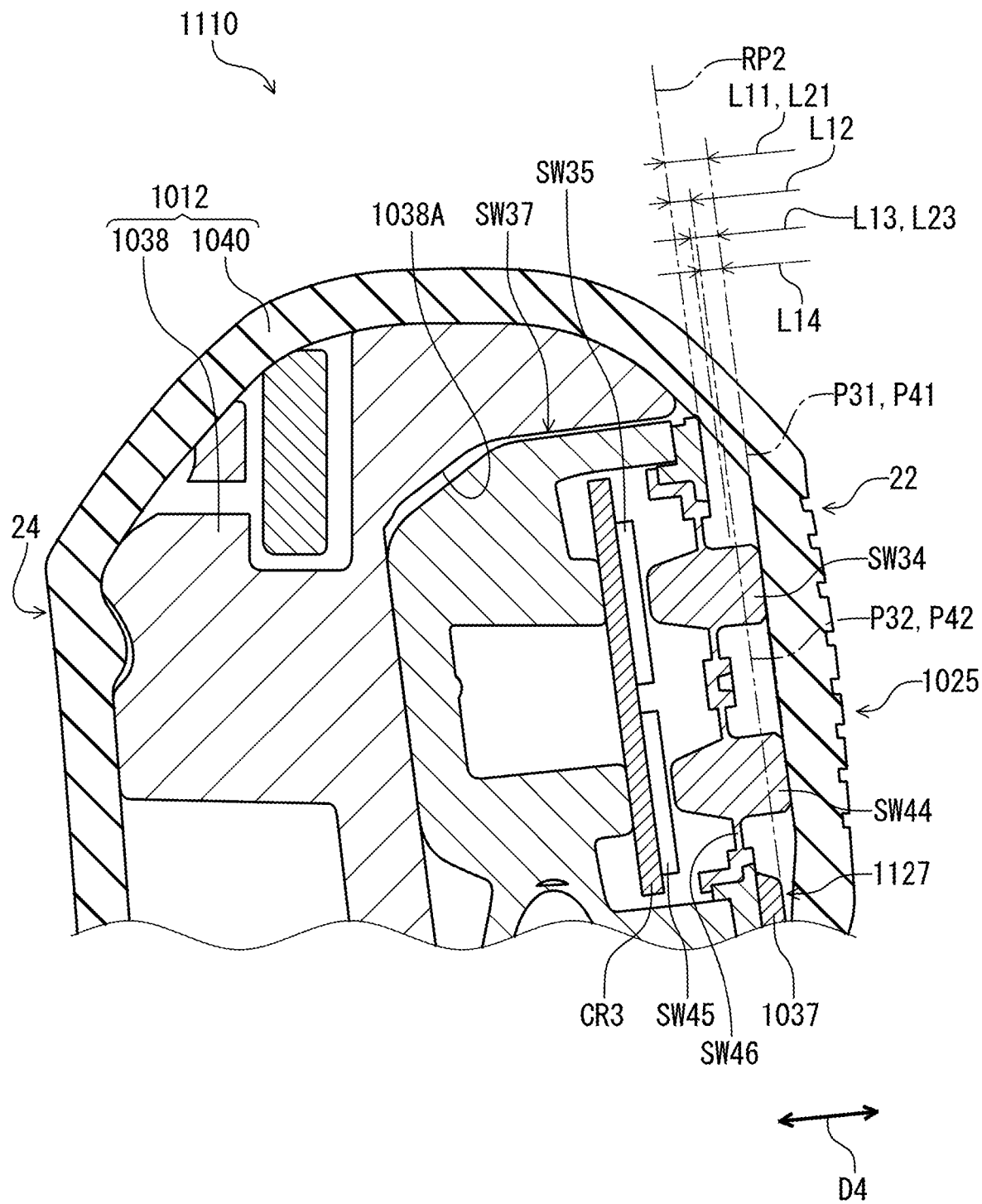
FIG. 61 is a cross-sectional view of the operating device taken along line LXI-LXI of FIG. 60.

As seen in FIG. 61, the user operating portion SW34 is movable relative to the base member in the operation direction D4 and protrudes relative to the reference plane RP2 in the operation direction D4. The additional user operating portion SW44 is movable relative to the base member 1012 in the operation direction D4 and protrudes relative to the reference plane RP2 in the operation direction D4.

The restriction member 1027 protrudes relative to the reference plane RP2 in the operation direction D4. The user operating portion SW34 has the first length L11 defined from the reference plane RP2 in the operation direction D4. The restriction member 1027 has the second length L12 defined from the reference plane RP2 in the operation direction D4. The additional user operating portion SW44 has a third length L21 defined from the reference plane RP2 in the operation direction D4. At least one of the first length L11 and the third length L21 is larger than the second length L12. In this embodiment, the first length L11 and the third length L21 are larger than the second length L12. However, at least one of the first length L11 and the third length L21 can be equal to or smaller than the second length L12.

The user operating portion SW34 is movable relative to the reference plane RP2 in the operation direction D4 by the operation stroke L13. The additional user operating portion SW44 is movable relative to the reference plane RP2 in the operation direction D4 by an additional operation stroke L23. The additional user operating portion SW44 is movable relative to the reference plane RP2 in the operation direction D4 from a rest position P41 to an operated position P42. The electrical switch SW3 is turned off in a state where the additional user operating portion SW44 is in the rest position P41. The electrical switch SW3 is turned on in a state where the additional user operating portion SW44 is in the operated position P42. The operation stroke L13 is defined from the rest position P41 to the operated position P42.

The operation stroke L13 is equal to or larger than a difference between the first length L11 and the second length L12. The additional operation stroke L23 is equal to or larger than a difference between the second length L12 and the third length L21. In this embodiment, the additional operation stroke L23 is larger than the difference between the second length L12 and the third length L21. However, the additional operation stroke L23 can be equal to or smaller than the difference between the second length L12 and the third length L21.

The electrical switch SW3 includes an additional switch circuit SW45. The additional switch circuit SW45 is electrically mounted on the circuit board CR3. For example, the additional switch circuit SW45 includes a normally-open switch. However, the additional switch circuit SW45 can include other type of switch.

The additional user operating portion SW44 is contactable with the additional switch circuit SW45. The electrical switch SW3 includes an additional flexible support SW46. The additional flexible support SW46 is attached to the base plate SW33 and movably supports the additional user operating portion SW44 in the operation direction D4 relative to the base plate SW33. In this embodiment, the additional user operating portion SW44 is integrally provided with the additional flexible support SW46 as a one-piece unitary member. However, the additional user operating portion SW44 can be a separate member from the additional flexible support SW46.

At least one of the first to eleventh embodiments can be combined with another of the first to eleventh embodiments.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device comprising:
    a base member including
        a first end portion configured to be coupled to a handlebar,
        a second end portion opposite to the first end portion, and
        a grip portion provided between the first end portion and the second end portion;
    an operating member pivotally coupled to the base member about a pivot axis;
    a user operating portion configured to receive a user input and provided at the second end portion of the base member; and
    a restriction member at least partly provided, as viewed along the pivot axis, between the user operating portion and the first end portion of the base member to restrict unintentional access to the user operating portion, wherein
    the user operating portion is movable relative to the base member in an operation direction and protrudes relative to a reference plane in the operation direction,
    the restriction member protrudes relative to the reference plane in the operation direction,
    the user operating portion has a first length defined from the reference plane in the operation direction,
    the restriction member has a second length defined from the reference plane in the operation direction,
    the first length is larger than the second length,
    the user operating portion is movable relative to the reference plane in the operation direction by an operation stroke, and
    the operation stroke is equal to or larger than a difference between the first length and the second length.

2. The operating device according to claim 1, wherein the restriction member is a separate member from the base member.

3. The operating device according to claim 1, wherein the restriction member is detachably attached to the base member.

4. The operating device according to claim 1, further comprising
    an electrical switch including the user operating portion and a switch base attached to the base member, wherein
    the switch base defines the reference plane.

5. The operating device according to claim 4, wherein
    the user operating portion is movable relative to the switch base in the operation direction, and
    the restriction member protrudes relative to the switch base in the operation direction.

6. The operating device according to claim 4, wherein the restriction member is a separate member from the switch base.

7. The operating device according to claim 1, wherein
    the restriction member includes an opening, and
    the user operating portion is provided in the opening.

8. The operating device according to claim 1, wherein the restriction member includes a restriction body provided, as viewed along the pivot axis, between the user operating portion and the first end portion of the base member and attached to the base member.

9. The operating device according to claim 1, wherein the base member includes
    a first lateral surface, and
    a second lateral surface provided on a reverse side of the first lateral surface in a pivot axis direction parallel to the pivot axis, and
    the user operating portion and the restriction member are provided closer to one of the first lateral surface and the second lateral surface than to the other of the first lateral surface and the second lateral surface.

10. The operating device according to claim 1, further comprising
    an additional user operating portion configured to receive an additional user input and provided at the second end portion of the base member, the additional user operating portion being spaced apart from the user operating portion, wherein
    the restriction member is configured to restrict unintentional access to the additional user operating portion.

11. The operating device according to claim 10, wherein
    the additional user operating portion is movable relative to the base member in the operation direction and protrudes relative to the reference plane in the operation direction,
    the additional user operating portion has a third length defined from the reference plane in the operation direction, and
    at least one of the first length and the third length is larger than the second length.

12. The operating device according to claim 11, wherein
the additional user operating portion is movable relative to the reference plane in the operation direction by an additional operation stroke, and
the additional operation stroke is equal to or larger than a difference between the second length and the third length.

13. An operating device comprising:
a base member including
   a first end portion configured to be coupled to a handlebar,
   a second end portion opposite to the first end portion, and
   a grip portion provided between the first end portion and the second end portion;
an operating member pivotally coupled to the base member about a pivot axis;
a user operating portion configured to receive a user input and provided at the second end portion of the base member; and
a restriction member at least partly provided, as viewed along the pivot axis, between the user operating portion and the first end portion of the base member to restrict unintentional access to the user operating portion, wherein
the base member includes a base body and a grip cover configured to be attached to the base body to at least partly cover the base body, and
the grip cover is configured to at least partly cover the restriction member in a state where the grip cover is attached to the base body.

14. The operating device according to claim 13, wherein the restriction member is a separate member from the grip cover.

15. The operating device according to claim 13, wherein the base body includes an accommodation recess provided at the second end portion, and
an electrical switch is provided in the accommodation recess.

16. The operating device according to claim 15, wherein the restriction member is provided in the accommodation recess.

17. An operating device comprising:
a base member including
   a first end portion configured to be coupled to a handlebar,
   a second end portion opposite to the first end portion, and
   a grip portion provided between the first end portion and the second end portion;
an operating member pivotally coupled to the base member about a pivot axis;
a user operating portion configured to receive a user input and provided at the second end portion of the base member; and
a restriction member at least partly provided, as viewed along the pivot axis, between the user operating portion and the first end portion of the base member to restrict unintentional access to the user operating portion, wherein
the restriction member includes a restriction body provided, as viewed along the pivot axis, between the user operating portion and the first end portion of the base member and attached to the base member,
the second end portion includes a surface provided at an upper side of the second end portion in a mounting state where the base member is mounted to a handlebar,
the restriction member includes a first extending portion extending from the restriction body, and
the first extending portion is provided between the surface of the second end portion and the user operating portion as viewed along the pivot axis.

18. The operating device according to claim 17, wherein
the restriction member includes a second extending portion extending from the restriction body, and
the user operating portion is provided between the first extending portion and the second extending portion as viewed along the pivot axis.

19. An operating device comprising:
a base member including
   a first end portion configured to be coupled to a handlebar,
   a second end portion opposite to the first end portion, and
   a grip portion provided between the first end portion and the second end portion; and
an operating member pivotally coupled to the base member about a pivot axis,
the base member including a positioning portion provided at the second end portion, the positioning portion including a positioning recess configured to position a rider's finger,
the positioning portion including an indicator configured to indicate a position of the positioning portion, and
the indicator including a plurality of grooves provided in the positioning recess.

20. The operating device according to claim 19, wherein the base member includes
   a first lateral surface, and
   a second lateral surface provided on a reverse side of the first lateral surface in a pivot axis direction parallel to the pivot axis, and
the positioning portion is provided on the first lateral surface.

21. The operating device according to claim 19, wherein the positioning portion includes
   a positioning lateral surface, and
   a wall portion protruding from the positioning lateral surface to provide the positioning recess.

22. The operating device according to claim 21, wherein the indicator includes a pattern including straight grooves and an annular groove.

23. A base member for an operating device including an operating member pivotally coupled to the base member about a pivot axis, the base member comprising:
a base body including a base outer surface;
a grip cover configured to be attached to the base body to at least partly cover the base body in a state where the grip cover is attached to the base body, the grip cover including a cover inner surface configured to face the base outer surface in a state where the grip cover is attached to the base body; and
a plurality of convex parts, at least two convex parts of the plurality of convex parts being provided on at least one of the base outer surface and the cover inner surface, the at least two convex parts of the plurality of convex parts being arranged in a predetermined pattern, wherein
the grip cover has a thickness defined from the cover inner surface to a cover outer surface,
the plurality of convex parts has a height defined from the cover inner surface of the grip cover,
the height is equal to or smaller than the thickness of the grip cover, each of the plurality of convex parts has a curved profile, and
the height is smaller than a diameter of the curved profile.

24. The base member according to claim 23, wherein
the plurality of convex parts is spaced apart from each other.

25. The base member according to claim 23, wherein
the height includes a maximum height, and
the maximum height is equal to or larger than 0.5 mm.

26. The base member according to claim 23, wherein
each of the plurality of convex parts includes a curved convex surface.

* * * * *

(12) SUPPLEMENTAL EXAMINATION CERTIFICATE

United States Patent
Mizutani et al.

(10) Number: US 10,994,798 F1
(45) Certificate Issued: Sep. 7, 2021

Control No.: 96/000,371

Filing Date: Aug. 23, 2021

Primary Examiner: Peter C. English

No substantial new question of patentability is raised in the request for supplemental examination. See the Reasons for Substantial New Question of Patentability Determination in the file of this proceeding.

(56) Items of Information

U.S. PATENT DOCUMENTS

| | | |
|---|---|---|
| 2015/0274252 A1 | 10/2015 | Nishino |
| 2016/0129968 A1 | 5/2016 | Meggiolan et al. |